(12) United States Patent
Xue et al.

(10) Patent No.: US 11,990,607 B2
(45) Date of Patent: May 21, 2024

(54) INTERCALATION-CONVERSION HYBRID CATHODE FOR A LI—S BATTERY

(71) Applicant: Massachusetts Institute of Technology, Cambridge, MA (US)

(72) Inventors: Weijiang Xue, Cambridge, MA (US); Liumin Suo, Cambridge, MA (US); Ju Li, Weston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1287 days.

(21) Appl. No.: 16/390,599

(22) Filed: Apr. 22, 2019

(65) Prior Publication Data
US 2019/0326584 A1 Oct. 24, 2019

Related U.S. Application Data

(60) Provisional application No. 62/810,662, filed on Feb. 26, 2019, provisional application No. 62/660,607, filed on Apr. 20, 2018.

(51) Int. Cl.
*H01M 4/36* (2006.01)
*H01M 4/04* (2006.01)
(Continued)

(52) U.S. Cl.
CPC ......... *H01M 4/364* (2013.01); *H01M 4/0459* (2013.01); *H01M 4/133* (2013.01);
(Continued)

(58) Field of Classification Search
CPC ............. H01M 50/409; H01M 50/133; H01M 4/1393; H01M 4/5815; H01M 4/583; H01M 4/0459; H01M 4/133
See application file for complete search history.

(56) References Cited

U.S. PATENT DOCUMENTS 6,302,928 B1 * 10/2001 Xu .................. H01M 4/0483
429/213
11,038,239 B2   6/2021 Xue et al.
(Continued)

OTHER PUBLICATIONS

Peng et al., Healing High-Loading Sulfur Electrodes with Unprecedented Long Cycling Life: Spatial Heterogeneity Control. J Am Chem Soc 139, 8458 (2017), 9 pages.
(Continued)

*Primary Examiner* — Ula C Ruddock
*Assistant Examiner* — Frank A Chernow
(74) *Attorney, Agent, or Firm* — Smith Baluch LLP

(57) ABSTRACT

A hybrid cathode for a Li—S battery may include an intercalation-type material and a conversion-type material. The conversion-type material, such as sulfur, may increase the gravimetric energy density, $E_g$, of the battery. The intercalation-type material may increase the electrical and ionic conductivity of the cathode and contribute to the capacity of the battery, enabling replacement of partial high-surface-area conductive carbon and increasing the volumetric energy density, $E_v$. In combination, the conversion-type material and the intercalation-type material may be used to increase $E_g$ and $E_v$ simultaneously while providing sufficient rate capability. In one example, a hybrid cathode includes an electrode and a cathode material. The cathode material includes a first concentration of an intercalation compound, a second concentration of sulfur, and a third concentration of carbon. Furthermore, the intercalation compound and sulfur contribute to the capacity of the Li—S battery within a voltage window of 1.7 V to 2.8 V.

35 Claims, 47 Drawing Sheets

(51) Int. Cl.

| | | |
|---|---|---|
| *H01M 4/13* | (2010.01) | |
| *H01M 4/133* | (2010.01) | |
| *H01M 4/1393* | (2010.01) | |
| *H01M 4/38* | (2006.01) | |
| *H01M 4/58* | (2010.01) | |
| *H01M 4/583* | (2010.01) | |
| *H01M 4/62* | (2006.01) | |
| *H01M 10/052* | (2010.01) | |
| *H01M 50/40* | (2021.01) | |
| *H01M 50/403* | (2021.01) | |
| *H01M 50/409* | (2021.01) | |
| *H01M 50/417* | (2021.01) | |
| *H01M 50/426* | (2021.01) | |
| *H01M 50/431* | (2021.01) | |
| *H01M 50/451* | (2021.01) | |
| *H01M 50/489* | (2021.01) | |

(52) U.S. Cl.
CPC ........... *H01M 4/1393* (2013.01); *H01M 4/38* (2013.01); *H01M 4/5815* (2013.01); *H01M 4/583* (2013.01); *H01M 4/625* (2013.01); *H01M 10/052* (2013.01); *H01M 50/403* (2021.01); *H01M 50/409* (2021.01); *H01M 50/417* (2021.01); *H01M 50/426* (2021.01); *H01M 50/431* (2021.01); *H01M 50/451* (2021.01); *H01M 50/489* (2021.01)

(56) References Cited

U.S. PATENT DOCUMENTS

| | | |
|---|---|---|
| 2005/0220699 A1 | 10/2005 | Gofer et al. |
| 2012/0064404 A1 | 3/2012 | Carlson |
| 2016/0082395 A1 | 3/2016 | Boulanger et al. |
| 2016/0308208 A1* | 10/2016 | He ..................... H01M 4/5815 |
| 2016/0346737 A1 | 12/2016 | Liang et al. |
| 2018/0123134 A1 | 5/2018 | Gan et al. |

OTHER PUBLICATIONS

Peng et al., Review on high-loading and high-energy lithium-sulfur batteries. Advanced Energy Materials 7, 1700260 (2017), 54 pages.
Perdew et al., Generalized gradient approximation made simple. Physical review letters 77, 3865 (1996), 4 pages.
Pope et al., Structural design of cathodes for Li—S batteries. Advanced Energy Materials 5, 1500124 (2015), 22 pages.
Qie et al., A high energy lithium-sulfur battery with ultrahigh-loading lithium polysulfide cathode and its failure mechanism. Advanced Energy Materials 6, 1502459 (2016), 7 pages.
Rajput et al., Elucidating the Solvation Structure and Dynamics of Lithium Polysulfides Resulting from Competitive Salt and Solvent Interactions. Chemistry of Materials 29, 3375-3379 (2017).
Saha et al., A convenient approach to Mo6S8 chevrel phase cathode for rechargeable magnesium battery. Journal of The Electrochemical Society 161, A593-A598 (2014), 6 pages.
Sergent et al., Sur de nouvelles phases séléniées ternaires du molybdène. Journal of Solid State Chemistry 6, 433-437 (1973), 5 pages.
Su et al., Lithium-sulphur batteries with a microporous carbon paper as a bifunctional interlayer. Nature communications 3, 1166 (2012), 6 pages.
Su et al., Sulfur/lithium-insertion compound composite cathodes for Li—S batteries. Journal of Power Sources 270, 101-105 (2014).
Sun et al., Conductive porous vanadium nitride/graphene composite as chemical anchor of polysulfides for lithium-sulfur batteries. Nature communications 8, 14627 (2017), 8 pages.
Sun et al., Entrapment of polysulfides by a black-phosphorus-modified separator for lithium-sulfur batteries. Advanced materials 28, 9797-9803 (2016).

Suo et al., "Water-in-salt" electrolyte enables high-voltage aqueous lithium-ion chemistries. Science 350, 938-943 (2015).
Tan et al., Burning lithium in CS2 for high-performing compact Li2S-graphene nanocapsules for Li—S batteries. Nature Energy 2, 17090 (2017), 10 pages.
Tao et al., Balancing surface adsorption and diffusion of lithium-polysulfides on nonconductive oxides for lithium-sulfur battery design. Nature communications 7, 11203 (2016), 9 pages.
Tao et al., Strong sulfur binding with conducting Magneli-phase Ti(n)O2(n-1) nanomaterials for improving lithium-sulfur batteries. Nano letters 14, 5288-5294 (2014).
Tarascon et al., New superconducting ternary molybdenum chalcogenides In Mo6Se8, T1Mo6S8, and T1Mo6Se8. Physical Review B 29, 172 (1984), 9 pages.
Thangavel et al., A Microstructurally Resolved Model for Li—S Batteries Assessing the Impact of the Cathode Design on the Discharge Performance. Journal of The Electrochemical Society 163, A2817-A2829 (2016), 13 pages.
Tkatchenko et al., Accurate molecular van der Waals interactions from ground-state electron density and free-atom reference data. Physical review letters 102, 073005 (2009), 4 pages.
Wan et al., Mg desolvation and intercalation mechanism at the Mo6S8 Chevrel phase surface. Chemistry of Materials 27, 5932-5940 (2015).
Wang et al., Structural and chemical synergistic encapsulation of polysulfides enables ultralong-life lithium-sulfur batteries. Energy Environ Sci 9, 2533-2538 (2016).
Wang et al., Tailored Reaction Route by Micropore Confinement for Li—S Batteries Operating under Lean Electrolyte Conditions. Advanced Energy Materials, 1800590 (2018), 9 pages.
Wei et al,. Sulphur-TiO2 yolk-shell nanoarchitecture with internal void space for long-cycle lithium-sulphur batteries. Nature communications 4, 1331 (2013), 6 pages.
Xu et al., Absorption mechanism of carbon-nanotube paper-titanium dioxide as a multifunctional barrier material for lithium-sulfur batteries. Nano Research 8, 3066-3074 (2015).
Xue et al., "Gravimetric and volumetric energy densities of lithium-sulfur batteries." Current Opinion in Electrochemistry 6.1 (2017): 92-99.
Xue et al., Double-oxide sulfur host for advanced lithium-sulfur batteries. Nano Energy 38, 12-18 (2017).
Yao et al., Improved lithium-sulfur batteries with a conductive coating on the separator to prevent the accumulation of inactive S-related species at the cathode-separator interface. Energy Environ Sci 7, 3381-3390 (2014).
Yim et al., Effective polysulfide rejection by dipole-aligned BaTiO3 coated separator in lithium-sulfur batteries. Advanced Functional Materials 26, 7817-7823 (2016).
Yoo et al., COF-Net on CNT-Net as a Molecularly Designed, Hierarchical Porous Chemical Trap for Polysulfides in Lithium-Sulfur Batteries. Nano letters 16, 3292-3300 (2016).
Yu et al., Atomic layer deposited TiO2 on a nitrogen-doped graphene/sulfur electrode for high performance lithium-sulfur batteries. Energy Environ Sci 9, 1495-1503 (2016).
Yu et al., Polymer lithium-sulfur batteries with a Nafion membrane and an advanced sulfur electrode. Journal of Materials Chemistry A 3, 15683-15691 (2015).
Yuan et al., Powering lithium-sulfur battery performance by propelling polysulfide redox at sulfiphilic hosts. Nano letters 16, 519-527 (2016).
Zang et al., Hollow-in-hollow carbon spheres with hollow foam-like cores for lithium-sulfur batteries. Nano Research 8, 2663-2675 (2015).
Zhang et al., Electrochemomechanical Degradation of High-Capacity Battery Electrode Materials. Progress in Materials Science 89, 479-521 (2017).
Zhang et al., Al2O3-coated porous separator for enhanced electrochemical performance of lithium sulfur batteries. Electrochimica Acta 129, 55-61 (2014).
Zhang et al., Sulfur encapsulated in graphitic carbon nanocages for high-rate and long-cycle lithium-sulfur batteries. Advanced materials 28, 9539-9544 (2016).

(56) References Cited

OTHER PUBLICATIONS

Zhang et al., Understanding the Anchoring Effect of Two-Dimensional Layered Materials for Lithium-Sulfur Batteries. Nano letters 15, 3780-3786 (2015).

Zhao et al., Interphases in Lithium-Sulfur Batteries: Toward Deployable Devices with Competitive Energy Density and Stability. ACS Energy Letters 3, 2104-2113 (2018).

Zhou et al., A flexible sulfur-graphene-polypropylene separator integrated electrode for advanced Li—S batteries. Advanced materials 27, 641-647 (2015).

Zhou et al., A graphene foam electrode with high sulfur loading for flexible and high energy Li—S batteries. Nano Energy 11, 356-365 (2015).

Zhou et al., A graphene-pure-sulfur sandwich structure for ultrafast, long-life lithium-sulfur batteries. Advanced materials 26, 625-631, 664 (2014).

Zhou et al., Catalytic oxidation of Li2S on the surface of metal sulfides for Li—S batteries. Proceedings of the National Academy of Sciences of the United States of America 114, 840-845 (2017).

Zhou et al., Free-standing TiO2 nanowire-embedded graphene hybrid membrane for advanced Li/dissolved polysulfide batteries. Nano Energy 12, 240-249 (2015).

Bai et al., Metal-organic framework-based separator for lithium-sulfur batteries. Nature Energy 1, 16094 (2016), 6 pages.

Balach et al., Functional mesoporous carbon-coated separator for long-life, high-energy lithium-sulfur batteries. Advanced Functional Materials 25, 5285-5291 (2015), 7 pages.

Bizuneh et al., "LaLiO2-Based Multi-Functional Interlayer for Enhanced Performance of Li—S Batteries." Journal of The Electrochemical Society 166.2 (2019): A68-A73.

Blöchl, Projector augmented-wave method. Physical review B 50, 17953 (1994), 27 pages.

Cañas et al., Experimental and theoretical analysis of products and reaction intermediates of lithium-sulfur batteries. The Journal of Physical Chemistry C 118, 12106-12114 (2014), 9 pages.

Cañas et al., Investigations of lithium-sulfur batteries using electrochemical impedance spectroscopy. Electrochimica Acta 97, 42-51 (2013).

Chang et al., Effective stabilization of a high-loading sulfur cathode and a lithium-metal anode in Li—S batteries utilizing SWCNT-modulated separators. Small 12, 174-179 (2016).

Chen et al., A new type of multifunctional polar binder: toward practical application of high energy lithium sulfur batteries. Advanced materials 29, 1605160 (2017), 7 pages.

Chung et al., A polyethylene glycol-supported microporous carbon coating as a polysulfide trap for utilizing pure sulfur cathodes in lithium-sulfur batteries. Advanced materials 26, 7352-7357 (2014).

Chung et al., Bifunctional separator with a light-weight carbon-coating for dynamically and statically stable lithium-sulfur batteries. Advanced Functional Materials 24, 5299-5306 (2014).

Chung et al., Designing Lithium-Sulfur Cells with Practically Necessary Parameters. Joule 2, 710-724 (2018).

Chung et al., Rational Design of Statically and Dynamically Stable Lithium-Sulfur Batteries with High Sulfur Loading and Low Electrolyte/Sulfur Ratio. Advanced materials 30, 1705951 (2018), 9 pages.

Eroglu et al., Critical link between materials chemistry and cell-level design for high energy density and low cost lithium-sulfur transportation battery. Journal of The Electrochemical Society 162, A982-A990 (2015), 9 pages.

Fan et al., Solvent Effects on Polysulfide Redox Kinetics and Ionic Conductivity in Lithium-Sulfur Batteries. Journal of The Electrochemical Society 163, A3111-A3116 (2016), 6 pages.

Geng et al., Reversible Electrochemical Intercalation of Aluminum in Mo6S8. Chemistry of Materials 27, 4926-4929 (2015).

Ghazi et al., Efficient polysulfide chemisorption in covalent organic frameworks for high-performance lithium-sulfur batteries. Advanced Energy Materials, 1601250 (2016), 6 pages.

Ghazi et al., MoS2/celgard separator as efficient polysulfide barrier for long-life lithium-sulfur batteries. Advanced materials, 1606817 (2017), 6 pages.

Hagen M et al., Lithium-Sulfur Cells: The Gap between the State-of-the-Art and the Requirements for High Energy Battery Cells. Advanced Energy Materials 5, 1401986 (2015), 11 pages.

Huang et al., Permselective graphene oxide membrane for highly stable and anti-self-discharge lithium-sulfur batteries. ACS Nano 9, 3002-3011 (2015).

Ji et al., Stabilizing lithium-sulphur cathodes using polysulphide reservoirs. Nature communications 2, 325 (2011), 7 pages.

Kresse et al., Efficient iterative schemes for ab initio total-energy calculations using a plane-wave basis set. Physical review B 54, 11169 (1996), 18 pages.

Lei et al., Multi-functional layered WS2 nanosheets for enhancing the performance of lithium-sulfur batteries. Advanced Energy Materials, 1601843 (2016), 8 pages.

Levi et al., Kinetic and thermodynamic studies of Mg2+ and Li+ ion insertion into the Mo6S8 chevrel phase. Journal of The Electrochemical Society 151, A1044 (2004), 8 pages.

Li et al., A sulfur host based on titanium monoxide@carbon hollow spheres for advanced lithium-sulfur batteries. Nature communications 7, 13065 (2016), 11 pages.

Li et al., Chemisorption of polysulfides through redox reactions with organic molecules for lithium-sulfur batteries. Nature communications 9, 705 (2018), 10 pages.

Li et al., Hollow Carbon Nanofibers Filled with MnO2 Nanosheets as Efficient Sulfur Hosts for Lithium-Sulfur Batteries. Angewandte Chemie 54, 12886-12890 (2015).

Li et al., Pie-like electrode design for high-energy density lithium-sulfur batteries. Nature communications 6, 8850 (2015), 8 pages.

Li et al., Rational designs and engineering of hollow micro-/nanostructures as sulfur hosts for advanced lithium-sulfur batteries. Energy Environ Sci 9, 3061-3070 (2016).

Liang et al., A highly efficient polysulfide mediator for lithium-sulfur batteries. Nature communications 6, 5682 (2015), 8 pages.

Liang et al., In situ reactive assembly of scalable core-shell sulfur-MnO2 composite cathodes. ACS Nano 10, 4192-4198 (2016).

Lin et al., Aligning academia and industry for unified battery performance metrics. Nature communications 9, 5262 (2018), 5 pages.

Liu et al., "Nanostructured metal oxides and sulfides for lithium-sulfur batteries." Advanced materials 29.20 (2017): 1601759, 25 pages.

Ma et al., Hybrid cathode architectures for lithium batteries based on TiS2 and sulfur. J Mater Chem A 3, 19857-19866 (2015).

Manthiram et al., "Rechargeable lithium-sulfur batteries." Chemical reviews 114.23 (2014): 11751-11787.

Mao et al., Foldable interpenetrated metal-organic frameworks/carbon nanotubes thin film for lithium-sulfur batteries. Nature communications 8, 14628 (2017), 8 pages.

McCloskey, Attainable gravimetric and volumetric energy density of Li—S and li ion battery cells with solid separator-protected Li metal anodes. The Journal of Physical Chemistry Letters 6, 4581-4588 (2015).

Mei et al., Chevrel Phase Mo6 T8 (T=S, Se) as Electrodes for Advanced Energy Storage. Small 13, (2017), 11 pages.

Pan et al., Addressing Passivation in Lithium-Sulfur Battery Under Lean Electrolyte Condition. Advanced Functional Materials, 1707234 (2018), 7 pages.

Pan et al., Enhanced superconductivity in restacked TaS2 nanosheets. Journal of the American Chemical Society 139, 4623-4626 (2017).

Pan et al., Non-encapsulation approach for high-performance Li—S batteries through controlled nucleation and growth. Nature Energy, (2017), 8 pages.

Pang et al., A comprehensive approach toward stable lithium-sulfur batteries with high volumetric energy density. Advanced Energy Materials 7, 1601630 (2016), 9 pages.

Pang et al., A graphene-like metallic cathode host for long-life and high-loading lithium-sulfur batteries. Mater Horiz 3, 130-136 (2016).

Pang et al., Advances in lithium-sulfur batteries based on multifunctional cathodes and electrolytes. Nature Energy 1, 16132 (2016), 11 pages.

Pang et al., Surface-enhanced redox chemistry of polysulphides on a metallic and polar host for lithium-sulphur batteries. Nature communications 5, 4759 (2014), 8 pages.

(56) References Cited

OTHER PUBLICATIONS

Park et al., Trapping lithium polysulfides of a Li—S battery by forming lithium bonds in a polymer matrix. Energy Environ Sci 8, 2389-2395 (2015).

Nagao et al., "High rate performance, wide temperature operation and long cyclability of all-solid-state rechargeable lithium batteries using Mo—S chevrel-phase compound." Journal of The Electrochemical Society 160.6 (2013): A819. 6 pages.

* cited by examiner

| S loading (mg cm⁻²) | Electrolyte (mg cm⁻²) | Cathode (mg cm⁻²) | Anode (mg cm⁻²) | Current collector+ separator (mg cm⁻²) | $E_g$ (Wh kg⁻¹) |
|---|---|---|---|---|---|
| 2 | 36 | 3.1 | 0.0016x | 3.4 | $\dfrac{4.2x}{42.5 + 0.0016x}$ |
| 5 | 90 | 7.7 | 0.004x | 3.4 | $\dfrac{10.5x}{101.1 + 0.0016x}$ |
| 8 | 144 | 12.3 | 0.0064x | 3.4 | $\dfrac{16.8x}{159.7 + 0.0016x}$ |

*Assuming specific capacity=$x$ mAh g⁻¹, S content=65%, E/AM ratio=15 μL mg⁻¹ (18 mg mg⁻¹, $\rho_{electrolyte} = 1.2\ g/cm^3$), 200% Li excess, average voltage=2.1 V

Mo₆S₈ (001)
$E_b = 4.68$ eV 3.53 eV
LiMo₆S₈ (as shown: $LiMo_6S_8$, 3.53 eV, $LiS_4^-$, Solvated $Li^+$)

$Mo_6S_8$, 3.24 eV, $LiS_4^-$, Solvated $Li^+$

Li, Mo, S
[010], [100]

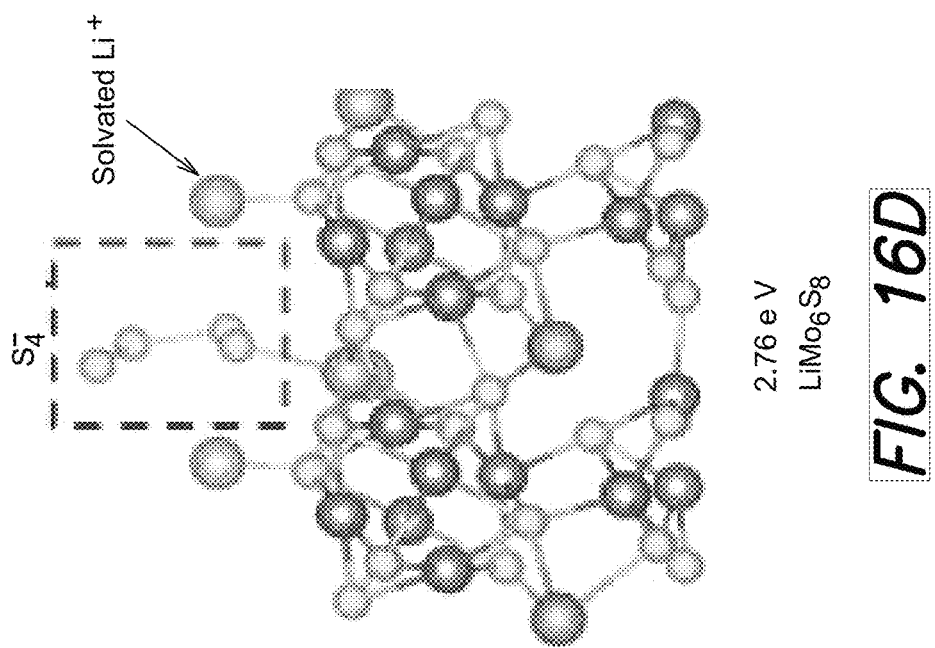
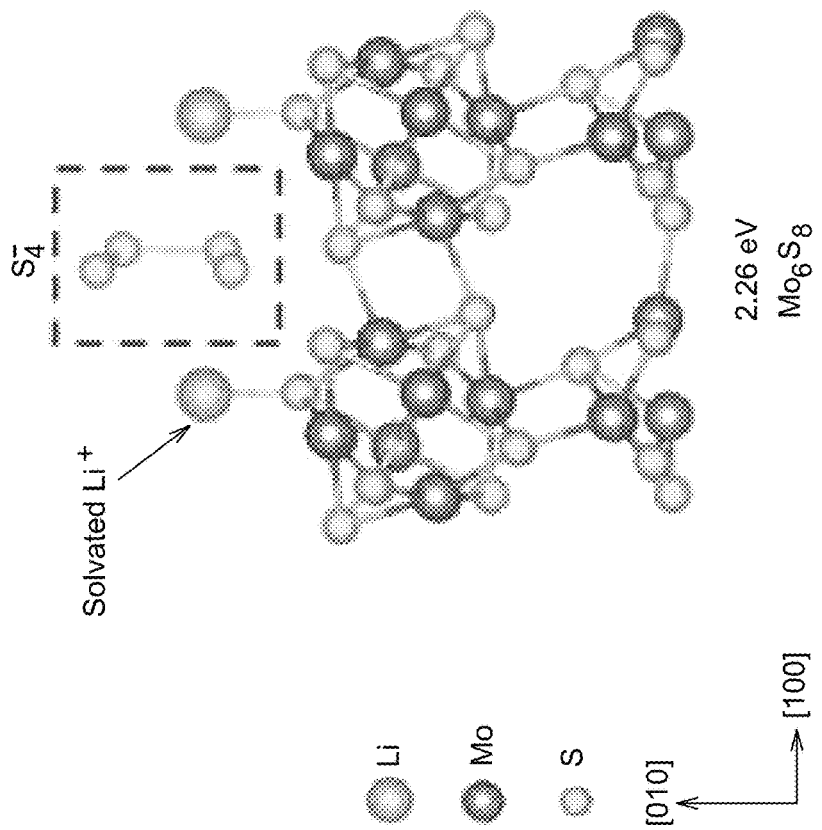
FIG. 16D
FIG. 16C

| Materials | Li | Sulfur | Carbon | Binder | Al | Separator | Electrolyte | $Mo_6S_8$ |
|---|---|---|---|---|---|---|---|---|
| Density (g cm$^{-3}$) | 0.534 | 2.07 | 2.02 | 1.76 | 2.7 | 0.946 | 1.2 | 5.04 |

FIG. 22A

| Materials | Pure S | $Mo_6S_8$:S=3:7 | $Mo_6S_8$:S=5:5 | C:S=3:7 | C:S=5:5 |
|---|---|---|---|---|---|
| $V_{solid}$ (cm$^{-3}$) | $\dfrac{a}{2.07}$ | $\dfrac{0.3a}{5.04}+\dfrac{0.7a}{2.07}$ | $\dfrac{0.5a}{5.04}+\dfrac{0.5a}{2.07}$ | $\dfrac{0.3a}{2.02}+\dfrac{0.7a}{2.07}$ | $\dfrac{0.5a}{2.02}+\dfrac{0.5a}{2.07}$ |

FIG. 22B

| Materials | Pure S | $Mo_6S_8$:S=3:7 | $Mo_6S_8$:S=5:5 | C:S=3:7 | C:S=5:5 |
|---|---|---|---|---|---|
| E (mWh) | 3511a | (0.3·269 + 0.7·3511)a=2538.4a | (0.5·269 + 0.5·3511)a=1890a | 0.7·3511a =2457.7a | 0.5·3511a =1755.5a |

FIG. 22C

INTERCALATION-CONVERSION HYBRID CATHODE FOR A LI—S BATTERY

CROSS-REFERENCE TO RELATED PATENT APPLICATION

This application claims priority, under 35 U.S.C. § 119(e), to U.S. Application No. 62/810,662, filed on Feb. 26, 2019, entitled "Intercalation-Conversion Hybrid Cathode For Li—S Battery," and U.S. Application No. 62/660,607, filed on Apr. 20, 2018, entitled "Electrochemically Active Multifunctional LixMo6S8 Interlayer for High-Performance Li—S Batteries," each of which applications is incorporated herein by reference in its entirety.

BACKGROUND

A lithium-sulfur (Li—S) battery is a type of rechargeable battery with a theoretical capacity and energy density substantially greater than that of a conventional lithium-ion battery (LIB). The anion-redox of Li—S is described by the following reaction: $S_8+16e^-+16Li^+=8Li_2S$ where $e^-$ is the free electron and $Li^+$ is the Li ion. This reaction chemistry is reversible and exhibits a theoretical cathode energy density of 2600 Wh·kg$^{-1}$ based on the weight of elemental sulfur. This energy density is nearly five times greater than a conventional LIB using a transition metal (TM) cation-redox intercalation reaction. The higher energy density of the Li—S battery is due, in part, to each sulfur atom being able to host two Li atoms (thus releasing two electrons) whereas conventional metal oxide cathodes are only able to host less than one Li atom on average (thus releasing less than one electron on average). Furthermore, sulfur is substantially cheaper than the metals use in conventional metal oxide cathodes.

SUMMARY

The Inventors have recognized and appreciated that a Li—S battery may theoretically provide a storage capacity and energy densities substantially greater than a conventional LIB at lower costs. However, the Inventors have also recognized that previous demonstrations of Li—S batteries have exhibited energy densities (i.e., gravimetric energy density, $E_g$, and volumetric energy density, $E_v$) substantially lower than theoretical predictions. The low energy densities of conventional Li—S batteries are due, in part, to the cathode having (1) a substantial amount of inactive material, such as carbon (C), to compensate for the electrically insulating nature of S, (2) a high porosity to increase the amount of electrolyte in the cathode and thus increase the reaction kinetics (e.g., faster charge and discharge), and (3) the shuttling effect, which degrades the battery lifetime.

The present disclosure is thus directed towards various inventive implementations of a hybrid conversion-intercalation cathode (also referred to herein as the "hybrid cathode") and methods of making thereof. The hybrid cathode described herein combines both a conversion-type material, such as sulfur, and an intercalation compound to (1) increase $E_g$ and $E_v$ at full-cell levels, (2) increase the rate performance, and (3) reduce the shuttling effect thus increasing the cyclability of a Li—S battery using the hybrid cathode. These attributes are obtained, in part, by the intercalation compound contributing to the capacity and energy density of the battery (unlike conventional inactive materials), providing ionically and electrically conductive intercalation pathways to increase sulfur utilization, and, in turn, reducing the amount of inactive materials and the porosity of the cathode.

In some implementations, an exemplary hybrid cathode for a battery includes an electrode and a cathode material electrically coupled to the electrode. The cathode material includes a first concentration X wt % of an intercalation compound, where X is in a range of between 10 to 75, a second concentration Y wt % of sulfur (S), where Y is in a range of between 10 to 75, and a third concentration Z wt % of carbon (C), where Z is greater than or equal to 5 and less than or equal to 20 such that the sum of X, Y, and Z equals 100. The intercalation compound also contributes to a capacity of the battery within a voltage window of 1.7 Volts to 2.8 Volts.

The first concentration of the intercalation compound may have an electrical conductivity greater than approximately $10^{-6}$ S·cm$^{-1}$ and an ionic conductivity greater than approximately $10^{-8}$ S·cm$^{-1}$. The first concentration of the intercalation compound may have an electrical conductivity greater than approximately $10^{-3}$ S·cm$^{-1}$ and an ionic conductivity greater than approximately $10^{-5}$ S·cm$^{-1}$. The intercalation compound may have a material density of greater than 5 grams per cubic centimeter (g/cm$^3$). The intercalation compound may include a Chevrel phase material, such as $Mo_6S_8$, or an olivine compound, such as $LiFePO_4$. The Chevrel phase material may have the composition $M_xM'_6X_{8-y}$, where: M is selected from the group consisting of lead (Pb), tin (Sn), barium (Ba), silver (Ag), copper (Cu), an alkali metal element and a lanthanide series element (Ln), M' is selected from the group consisting of ruthenium (Ru), molybdenum (Mo) and rhenium (Rh), X is selected from the group consisting of sulfur (S), selenium (Se), and tellurium (Te), x is greater than or equal to zero and less than or equal to 4, and y is greater than or equal to zero and less than or equal to 2. The intercalation compound may include a Chevrel-phase material including $Mo_6S_8$ such that the intercalation compound is sufficiently electrically conductive and ionically conductive so as to enable the third concentration of C to be less than approximately 20 wt %. A lithium-sulfur (Li—S) battery may include the hybrid cathode described above.

In some implementations, an exemplary hybrid cathode includes an electrode and a cathode material, electrically coupled to the electrode. The cathode material includes a first concentration of Chevrel-phase $Mo_6S_8$, a second concentration of sulfur (S), and a third concentration of carbon (C).

The first concentration of Chevrel-phase $Mo_6S_8$ is sufficiently electrically conductive and ionically conductive so as to enable the third concentration of C to be less than approximately 30 wt %. The hybrid cathode may also include a liquid electrolyte, disposed, at least in part, in the cathode material, to transport at least one of lithium ions or sulfur ions. The hybrid cathode may have an electrolyte-to-active material ratio (E/AM ratio) less than approximately 3 µL·mg$^{-1}$. The cathode material may have a porosity less than approximately 70 vol %. C may also be from at one of a carbon nanotube (CNT) or a graphene sheet. The cathode material may also have a sufficient affinity to lithium polysulfide intermediates (LiPS) to reduce unwanted transport of sulfur ions from the hybrid cathode to an anode in a lithium sulfur battery. A lithium-sulfur (Li—S) battery may include the hybrid cathode described above.

In some implementations, an exemplary hybrid cathode includes a current collector and a cathode material, electrically coupled to the current collector, configured to transport both monovalent cations and multivalent cations.

In some implementations, an exemplary cathode for a lithium sulfur battery includes a conductive foil and a slurry disposed on the conductive foil, the slurry comprising carbon, sulfur, and $Mo_6S_8$. The cathode may have a sulfur loading substantially equal to or greater than 10 mg·cm$^{-2}$. The cathode may have a $Mo_6S_8$ loading substantially equal to or greater than 10 mg·cm$^{-2}$. The carbon content may have a weight percentage substantially equal to or less than 10 wt % in the slurry.

In some implementations, an exemplary method of making a hybrid cathode includes the following steps: (1) ball-milling carbon nanotubes (CNTs), graphene (G), and $Mo_6S_8$ powder to form a first slurry, (2) dissolving sodium thiosulfate ($Na_2S_2O_3$) into the first slurry, (3) stirring 0.5 M sulfuric acid ($H_2SO_4$) into the first slurry at room temperature for 2 hours, (4) washing the first slurry with deionized water, (5) centrifuging the first slurry, (6) drying the first slurry at 60° C. for at least 8 hours, (7) forming a second slurry comprised of 95 wt % of the first slurry, 2.5 wt % of styrene butadiene rubber (SBR), and 2.5 wt % of carboxymethyl cellulose (CMC) binder, (8) drying the second slurry in a vacuum oven at 60° C. for 12 hours, and (9) coating the second slurry onto a carbon-coated aluminum foil to form the hybrid cathode.

The exemplary method may be preceded by the following steps: grinding a mixture of 99% copper sulfide (CuS), 99.99% molybdenum (Mo), and 99% molybdenum disulfide ($MoS_2$) for 0.5 hours, pressing the mixture into a pellet, heating the pellet in an argon environment to form a $Cu_2Mo_6S_8$ precursor, wherein the pellet is heated at a rate of 2° C.·min$^{-1}$ up to 900° C. for 24 hours, removing Cu from the $Cu_2Mo_6S_8$ precursor by mixing the $Cu_2Mo_6S_8$ precursor with 6 M hydrochloric acid (HCl) for 12 hours, thus forming the $Mo_6S_8$ powder, centrifuging the $Mo_6S_8$ powder, washing the $Mo_6S_8$ powder with deionized water, and drying the $Mo_6S_8$ powder at 60° C. for at least 8 hours.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 2B shows a table of parameters for calculating $E_g$.

FIG. 16C shows a chemical model of the adsorption configuration for $S_4^{2-}$ on $Mo_6S_8$ (100). This model is used for a density functional theory (DFT) calculation of the adsorption.

FIG. 16D shows a chemical model of the adsorption configuration for $S_4^{2-}$ on $LiMo_6S_8$ (100). This model is used for a density functional theory (DFT) calculation of the adsorption.

FIG. 22A shows a table of the theoretical densities of materials.

FIG. 22B shows a table of the solid volume contribution for various materials.

FIG. 22C shows a table of the energy contribution for various materials.

DETAILED DESCRIPTION

Figure 1A:
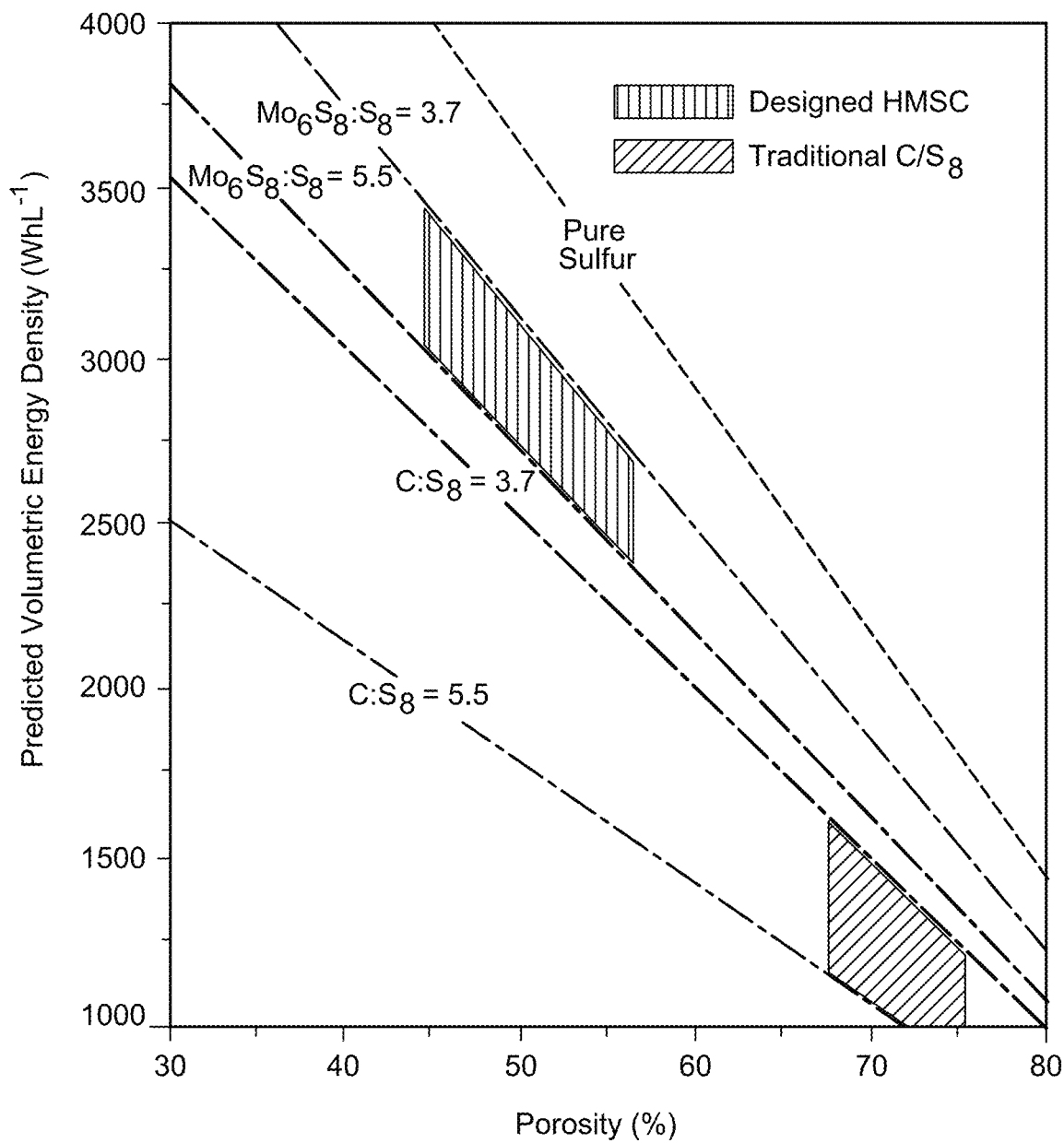
FIG. 1A shows a chart of the predicted volumetric energy density, $E_v$, as a function of the cathode porosity for the hybrid $Mo_6S_8/S_8$ cathode with carbon (HMSC) and the $C/S_8$ cathode at different $C/S_8$ and $Mo_6S_8/S_8$ ratios.

A Li—S battery is typically comprised of a S cathode, a Li anode, and a separator between the S cathode and the Li anode. The sulfur cathode (e.g., $S_8$) is a conversion-type material that undergoes a chemical reaction to produce new chemical species (e.g., $Li_2S$) when the battery discharges. The reaction chemistry is reversible, hence, the $Li_2S$ species is converted back to $S_8$ when the battery charges. Li—S batteries are theoretically predicted to exhibit a capacity and energy density substantially greater than conventional LIB's due, in part, to each sulfur atom being able to host up to two Li atoms per sulfur atom, thus releasing up to two electrons. Compared to a conventional Li-ion battery (LIB) cathode based on transition metal (TM) cation-redox reactions, sulfur is naturally abundant, low cost, and environmentally friendly.

For comparison, conventional LIB's typically use intercalation-type cathodes (e.g., metal oxide cathodes such as $Li_xCoO_2$), where Li ions are inserted into a host material in the cathode when discharging the battery and released from the host material when charging the battery. Compared to the sulfur cathode of the Li—S battery, conventional LIB cathode materials typically host less than one Li atom per atom on average, thus releasing less than one electron. This aspect typically results in conventional LIB's having a lower gravimetric energy density than Li—S batteries.

However, the $S_8$ and the $Li_2S$ phases in the Li—S reaction chemistry are both electrically and ionically insulating (as opposed to $Li_xCoO_2$, which has a high $Co^{3+} \leftrightarrow Co^{4+}$ polaron mobility), which decreases the rate performance and the sulfur utilization. For instance, when the Li—S battery discharges, Li ions from the Li anode are only able to electrochemically interact with S ions on the surface of the S cathode since transport of the Li ions into the bulk of the S cathode is limited, thus leading to poor sulfur utilization. In order for the anion-redox reaction of sulfur (i.e., $S^{\alpha-} \leftrightarrow S^{\beta-} + (\alpha-\beta)e^-$ where $0 \leq \alpha$, $\beta \leq 2$ is the average sulfur valence representing a mixture of ionic and covalent bonding, often in the physical form of $S_n^{2-}$ with $\alpha=2/n$) to proceed, the S species should physically move towards the electron source since the polarons (e.g., the free electrons, $e^-$) are unable to move towards the S species. To achieve this, the S species physically dissolve into the liquid electrolyte as $S_n^{2-}$ (electrolyte), which is then transformed into $S_m^{2-}$ (electrolyte) followed by redeposition as a solid phase preferably within the cathode.

The mobility of sulfur has profound consequences on the performance of the Li—S battery.

First, the Li—S reaction chemistry involves the formation of multiple lithium polysulfide intermediates (LiPS) during the transition between the $S_8$ and $Li_2S$ phases. The LiPS typically dissolve into the liquid electrolyte, thus facilitating the transport of the $S_n^{2-}$ (electrolyte) ionic species in the cathode. It should be appreciated while LiPS is often written as $Li_2S_n$, the solubilized form is $2Li^+$ (electrolyte) and $S_n^{2-}$ (electrolyte) with individual solvation shells. Although the mobility of the sulfur ionic species is preferable in facilitating the anion redox chemistry described above, the $S_n^{2-}$ (electrolyte) may also physically cross the separator into the Li anode in a non-blocking manner. This phenomenon is known as the "shuttling" effect of soluble redox mediators (SRMs). The shuttling effect can cause active material loss and fast capacity fading on the cathode side of the Li—S battery (the anode may be subjected to similar adverse effects).

Second, the transport of sulfur species is directly correlated to the charge/discharge rate performance of the Li—S battery. In order to increase the redox kinetics of $S_8 \leftrightarrow Li_2S$, conventional approaches have typically incorporated liquid electrolyte, as described above, and inactive, electrically conducting materials with high surface area into the cathode. For example, plain carbon black (which is neither a good electrocatalyst nor a good wetting substrate) is often integrated into the cathode to provide electrically conductive pathways to increase sulfur utilization. Conventional $C/S_8$ cathodes typically include a high fraction of conductive carbon (e.g., at least 30 wt % carbon) compared to conventional LIB cathodes (e.g., about 5 wt % carbon) in order to provide sufficient sulfur utilization. The excessive use of conductive carbon also gives rise to a greater cathode porosity (e.g., greater than 70 vol %), which further increases the amount of electrolyte used to provide a sufficient ionic conductivity.

Figure 1B:
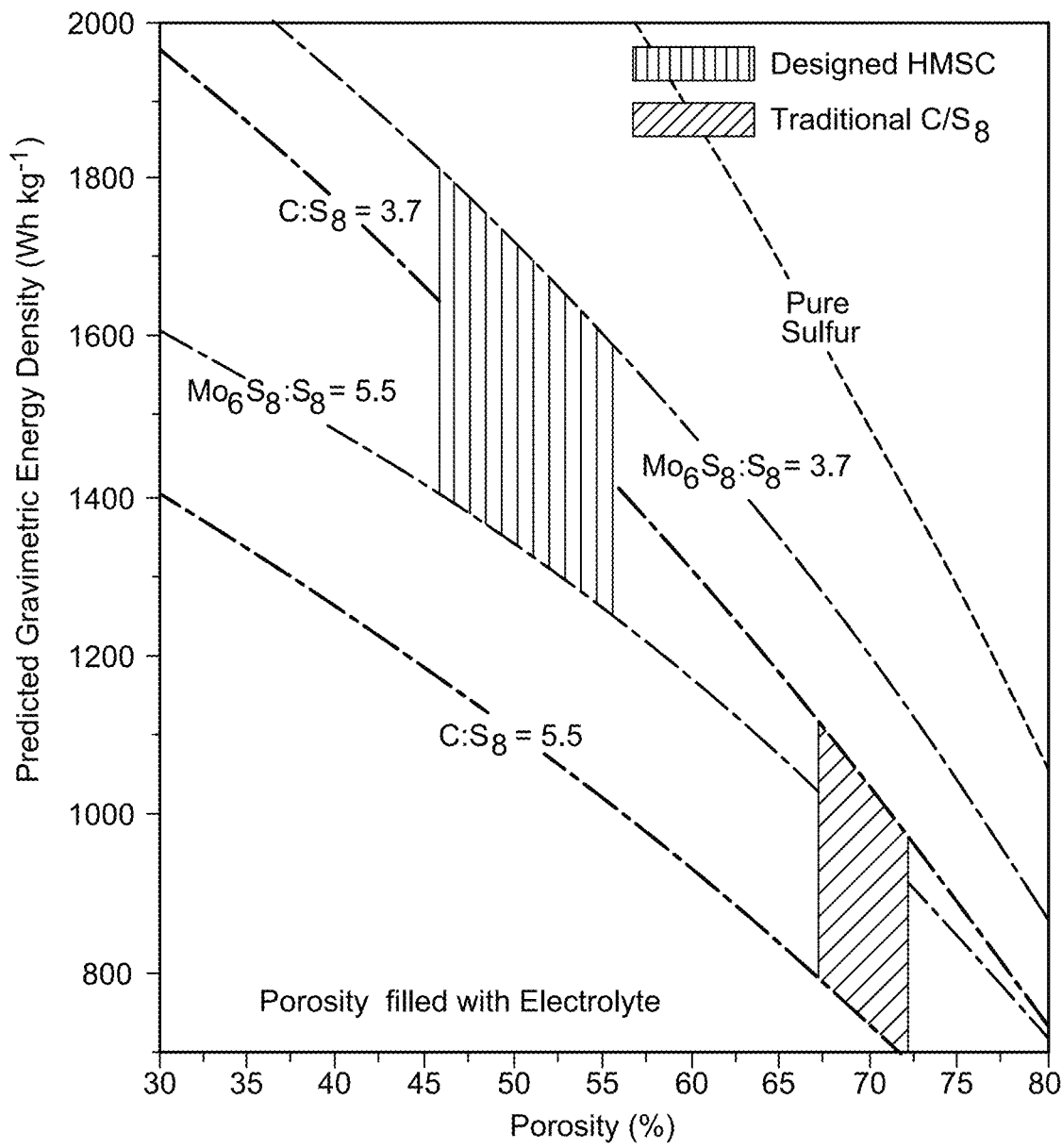
FIG. 1B shows a chart of the predicted gravimetric energy density, $E_g$, as a function of the cathode porosity for the hybrid $Mo_6S_8/S_8$ cathode with carbon (HMSC) and the $C/S_8$ cathode at different $C/S_8$ and $Mo_6S_8/S_8$ ratios.

Although the inclusion of liquid electrolyte and inactive materials, such as conductive carbon, into the cathode does increase the redox kinetics of the Li—S battery, the amount of sulfur available in the cathode to react with lithium correspondingly decreases, thus reducing the energy densities well below theoretical predictions. FIGS. 1A and 1B show the predicted volumetric energy density, $E_v$, and the predicted gravimetric energy density, $E_g$, as a function of porosity in the cathode at various weight fractions of C and $S_8$, respectively. As shown, both $E_v$ and $E_g$ decrease rapidly as the porosity and the wt % of carbon increases.

Figure 2A:
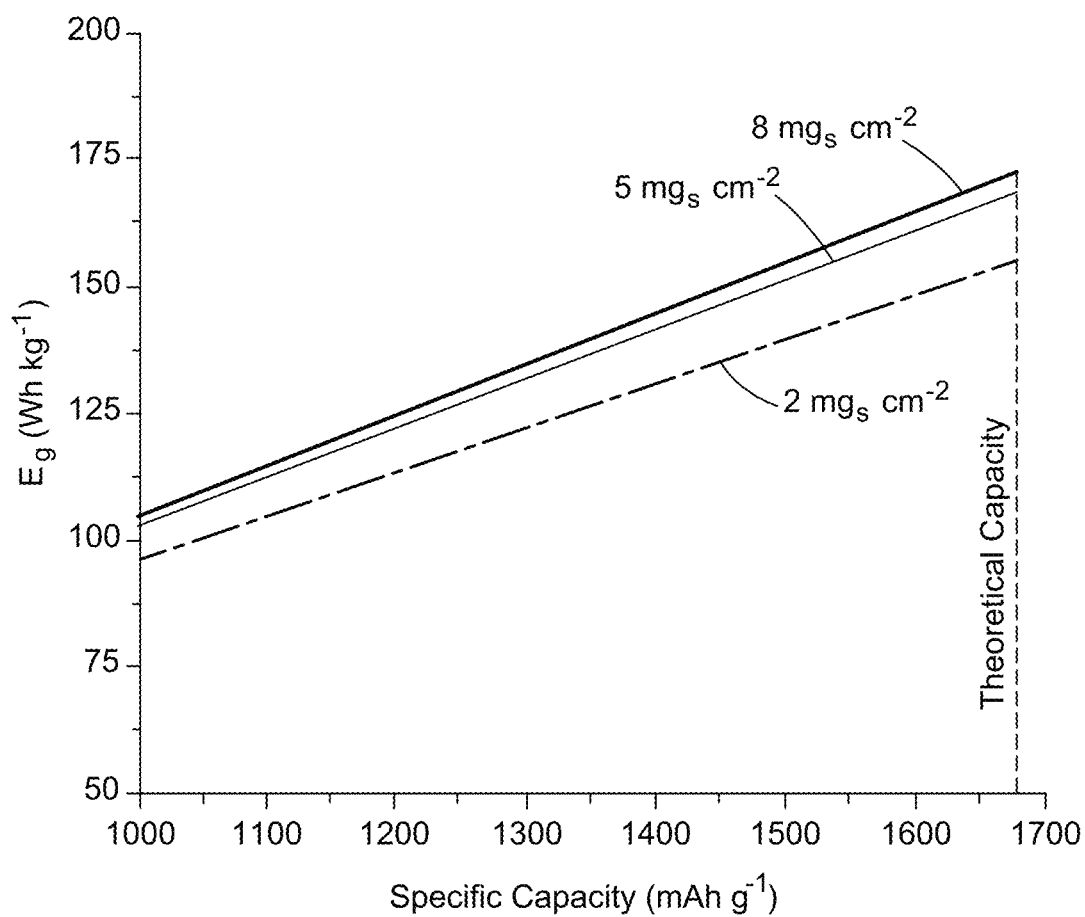
FIG. 2A shows the relationship between the estimated $E_g$ and the specific capacity of sulfur under various sulfur loading with E/AM ratio=15 μL·mg$^{-1}$.

Conventional Li—S batteries typically use an electrolyte to active material ratio (E/AM ratio) greater than 15 $\mu L \cdot mg^{-1}$, which is often regarded as the "flooded electrolyte condition." For comparison, conventional LIB cathodes have an E/AM ratio of about 0.3 $\mu L \cdot mg^{-1}$. Under these conditions, the full-cell $E_g$ and $E_v$ drops to a level that renders the Li—S battery impractical for most applications. For example, a cathode with an E/AM ratio greater 15 $\mu L \cdot mg^{-1}$ has a full-cell $E_g$ no greater than 175 $Wh \cdot kg^{-1}$ even if the sulfur utilization approaches the theoretical capacity of 1675 $mAh \cdot g^{-1}$ as shown in FIG. 2A. The full-cell $E_v$, which is an especially relevant parameter for portable applications such as electric vehicles or portable electronic devices, is also typically ~400 $Wh \cdot L^{-1}$ in conventional Li—S batteries, which is lower than a $LiFePO_4$/graphite battery (~540 $Wh \cdot L^{-1}$). The formulas to calculate $E_g$ and $E_v$ are shown below in Eqs. (8) and (9). The parameters for calculating $E_g$ are given in FIG. 2B.

Over the years, the development of cathode materials for Li—S batteries have primarily focused on reducing the shuttling effect described above. To this end, various structured sulfur cathodes were developed including sulfur-metal oxides or chalcogenide composites, for example, $SiO_2$, $TiO_2$, $MnO_2$, $TiS_2$, and $VS_2$. However, these developments still relied upon excessive use of additives and carbon in the cathode material. Additionally, these past developments failed to address the poor full-cell $E_g$ and $E_v$, which is of greater relevance to the commercialization and practical use of Li—S battery technology. Furthermore, past demonstrations of Li—S batteries were primarily based to coin cell type batteries, which are simple in design, but limited in terms of space efficiency. For practical applications, Li—S batteries should exhibit the following characteristics including, but not limited to, high active material loading, lean electrolyte use, and low cathode porosity. Additionally, Li—S batteries should be flexible in terms of battery design and should be compatible in various form factors including, but not limited to, coin cells, prismatic cells, and pouch cells.

However, limited studies have focused on improving the joint $E_g$-$E_v$ energy densities by decreasing the proportion of inactive components in the sulfur cathode. One study developed a compact sulfur cathode using an in-situ cross-linked elastomeric binder and achieved a low E/AM ratio of 3.5 $\mu L \cdot mg^{-1}$. Another study utilized a polyethylene-oxide (PEO)-based polymer that acts as both a Li conducting binder and a LiPS reservoir to further decrease the E/AM ratio to 3.3 $\mu L \cdot mg^{-1}$. Other studies developed designs for the electrolyte and the pore structure of hosts to improve the performances of Li—S batteries under lean electrolyte conditions. Another study showed a 3D free-standing electrode architecture for use as a compact electrode under low E/AM ratio conditions.

However, these studies failed to report sulfur cathodes that perform better than commercial LIB's in terms of the joint $E_g$-$E_v$.

In order to surpass the energy densities of conventional LIB's, it is preferable to reduce the proportion of inactive components in Li—S batteries without compromising the rate performance. In other words, a Li—S battery cathode should preferably provide both a high $E_g$ and $E_v$ by reducing the cathode porosity and E/AM ratio simultaneously, while maintaining acceptable rate capability.

A Hybrid Conversion-Intercalation Cathode

The present disclosure is thus directed towards various inventive implementations of a hybrid conversion-intercalation cathode (also referred to herein as the "hybrid cathode") and methods of making thereof. The hybrid cathode described herein is formed using both a conversion-type material and an intercalation-type material. As described above, conversion-type materials, such as sulfur, theoretically exhibit a high gravimetric energy density, $E_g$, but are limited by poor ionic and electrical transport properties. On the other hand, intercalation-type materials (also referred to herein as "intercalation compounds") are ionically and electrically conducting and may have a theoretical density higher than elemental sulfur, which allows cathodes formed of intercalation compounds to use less inactive materials and thus attain a higher volumetric energy density, $E_v$. By using both conversion-type and intercalation-type materials, the hybrid cathode may leverage characteristics of both materials in order to enhance $E_g$ and $E_v$.

Specifically, the intercalation compound provides a similar function to conventional inactive materials by providing electrical pathways to transport polarons, Li ions, and/or S ions within the cathode, thus increasing sulfur utilization. However, unlike conventional inactive materials, the intercalation compound is also electrochemically active and thus contributes to the overall capacity and energy density of the cathode. The intercalation compound may replace, at least in part, the inactive materials conventionally used in sulfur cathodes without adversely affecting sulfur utilization and/or rate performance, thus increasing the fraction of active material used in the cathode. Furthermore, the reduction in inactive material used may also lead to a corresponding reduction in the porosity of the cathode, thus increasing the density of the cathode. In this manner, the hybrid cathode may exhibit a high full-cell $E_g$ and $E_v$ simultaneously while providing rate capability comparable, if not greater than conventional LIB's.

Figure 3:
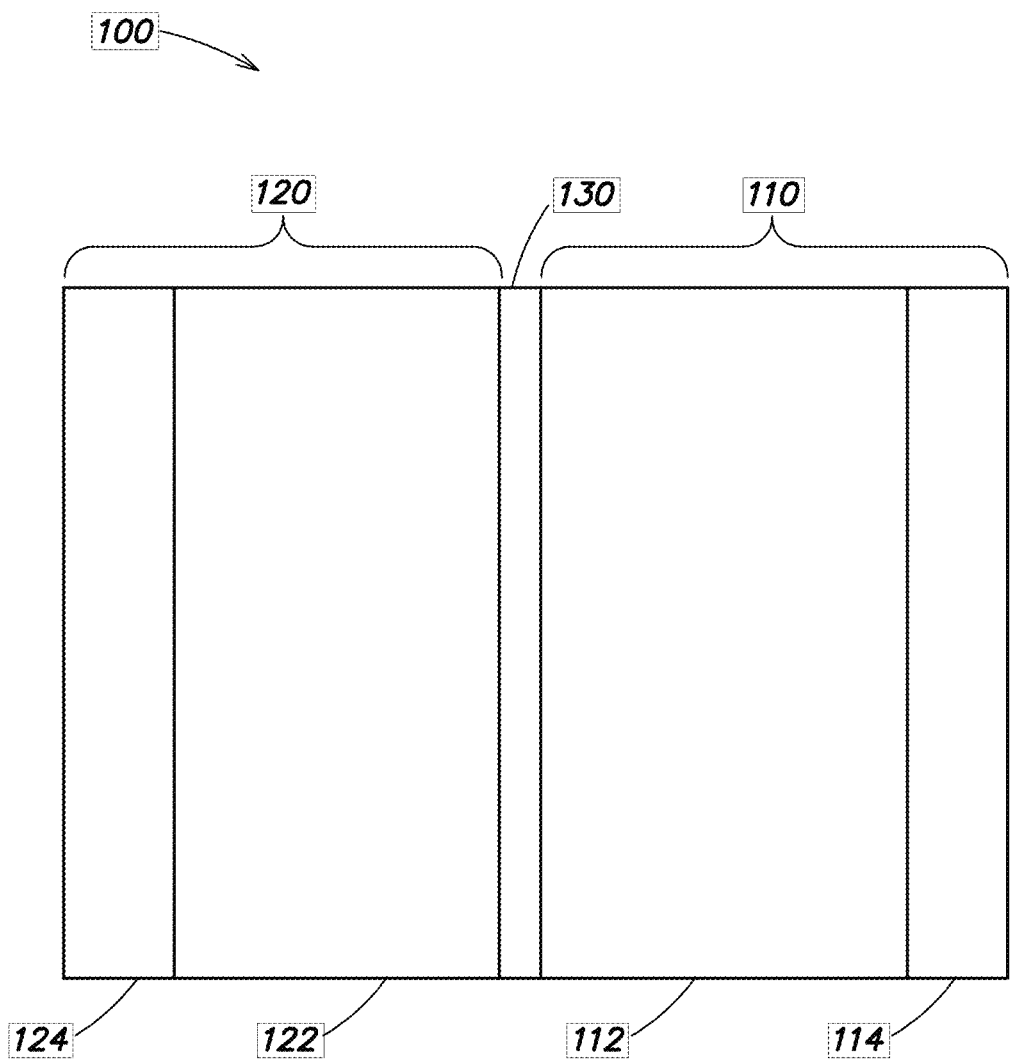
FIG. 3 shows an exemplary Li—S battery with a hybrid cathode.

FIG. 3 shows an exemplary implementation of a Li—S battery 100 with a hybrid cathode 110 (also referred to herein as "electrode 110"). As shown, the hybrid cathode 110 is coupled to an anode 120. In some implementations, the battery 100 may include a separator 130 to electrically separate the anode 120 from the cathode 110 while providing ionic transport of Li species to facilitate the reaction chemistry of the battery 100. The hybrid cathode 110 may include a cathode material 112 and a current collector 114. The anode 120 may include an anode material 122 and a current collector 124.

The anode 120 may include the anode material 122 electrically coupled to the current collector 124. The anode material 122 may be formed of lithium. In some implementations, the anode material 122 has an excess amount of lithium, e.g., 2× excess Li. The current collector 124 may receive and supply electric current to the anode 120 depending on whether the battery 100 is being charged or discharged. The current collector 124 may be various electrical conductors including, but not limited to, aluminum, copper, gold, graphite, and conductive carbon.

The separator 130 may be formed of various materials including, but not limited to, polypropylene, polyethylene, and Celgard separators.

As shown in FIG. 3, the hybrid cathode 110 may include the cathode material 112 electrically coupled to the current collector 114. The current collector 114 may receive and supply electric current to the cathode 110 depending on whether the battery 100 is being charged or discharged. The current collector 114 may be various electrical conductors including, but not limited to, aluminum, copper, gold, graphite, and conductive carbon.

The cathode material 112 includes both a conversion-type material, such as sulfur (e.g., $S_8$), and an intercalation compound. It should be appreciated that multiple types of intercalation compounds may be employed in the cathode material 112 to provide a hybrid cathode 110 that effectively functions within the battery 100 (e.g., charges or discharges electricity). However, the performance of the battery 100 and the cathode 110 may depend on various factors including, but not limited to, the particular intercalation compound used, the relative proportion of the intercalation compound relative to the conversion-type material, the properties of the intercalation compound, and the resultant microstructure of the hybrid cathode 110.

The intercalation compound may be various types of intercalated materials including, but not limited to, a Chevrel-phase compound (e.g., $Mo_6S_8$), a layered compound (e.g., $Li_xCoO_2$), and an olivine compound (e.g., $LiFePO_4$). In some implementations, the intercalation compound may be a Chevrel-phase compound with a composition of $M_xM'_6X_{8-y}$, where: M may be lead (Pb), tin ($S_n$), barium (Ba), silver (Ag), copper (Cu), an alkali metal element, or a lanthanide series element; M' may be ruthenium (Ru), molybdenum (Mo), or rhenium (Rh); X may be sulfur (S), selenium (Se), or tellurium (Te); x may be an integer with a value of 0, 1, 2, 3, or 4; and y may be an integer with a value of 0, 1, or 2 (i.e., $0 \leq x \leq 4$, $0 \leq y \leq 2$).

In some implementations, the combination of the conversion-type material and the intercalation compound may constitute the active material in the cathode material 112. With respect to the active material, the conversion-type material may have a concentration ranging from about 10 wt % to about 90 wt % and the intercalation compound may have a corresponding concentration ranging from about 90 wt % to about 10 wt %, respectively.

In some implementations, the cathode material 112 may also include an inactive material and a binder in addition to the active material. The inactive material may be various types of electrochemically inactive, conducting materials including, but not limited to, conductive carbon, carbon black, carbon nanotubes, and graphene. The binder may be various materials including, but not limited to, styrene butadiene rubber (SBR), carboxymethyl cellulose (CMC), and polyvinylidene fluoride (PVDF). In some implementations, the active material in the cathode material 112 may have a concentration ranging between about 70 wt % to about 95 wt %. The inactive material may have a concentration less than about 30 wt % (e.g., less than conventional $C/S_8$ cathodes). The binder may constitute the remainder of the cathode material 112, e.g., binder concentration=(100 wt %—active material concentration—inactive material concentration).

As described above, the intercalation compound in the cathode material 112 may be electrically and ionically conducting, to compensate, at least in part the insulating nature of elemental sulfur. In some implementations, the intercalation compound may have an electrical conductivity greater than approximately $10^{-6}$ S·cm$^{-1}$ and preferably greater than approximately $10^{-3}$ S·cm$^{-1}$. In some implementations, the intercalation compound may have an ionic conductivity greater than approximately $10^{-8}$ S·cm$^{-1}$ and preferably greater than approximately $10^{-5}$ S·cm$^{-1}$. The intercalation compound may also transport monovalent cations (e.g., Li$^{1+}$) and/or multivalent cations (e.g., Li$^{x+}$ where x is greater than 1), which may manifest as a higher ionic conductivity. The transport of multiple cation species may further contribute to increasing sulfur utilization, thereby reducing the amount of inactive material used in the cathode material 112.

The cathode material 112 may also include electrolyte to transport Li ions, LiPS and/or S ions. The electrolyte may be conventional ether-based electrolyte or any other electrolyte that is compatible with the desired operating voltage window of the battery 100. By reducing the amount of inactive material in the cathode material 112, the intercalation compound may also reduce the porosity and the amount of electrolyte in the cathode material 112 used to achieve sufficient rate capability, thus increasing $E_g$ and $E_v$ even further. In some implementations, the cathode material 112 may have a porosity less than approximately 70 vol % (e.g., less than conventional C/S$_8$ cathodes). In some implementations, the cathode material 112 may have an E/AM ratio less than approximately 3 μL·mg$^{-1}$, which is substantially less than the flooded electrolyte condition described above.

In some implementations, the intercalation compound may also exhibit mechanical properties conducive to producing a dense hybrid cathode 110 with high active material loading. For instance, the intercalation compound may also have a material density preferably comparable to or greater than the density of sulfur (2.07 g/cm$^3$) in order to increase the density of the hybrid cathode 110, thereby increasing the $E_v$. The material density may be an intrinsic density with respect the material and/or the tap density of the material (e.g., the packing density when the intercalation compound is in the form of a powder). For example, the intercalation compound may have a density preferably greater than approximately 5 g/cm$^3$.

The use of a higher density intercalation compound may also reduce the likelihood of cracks forming in the hybrid cathode 110, particularly when the cathode material 112 is cast using a slurry mixture containing the active materials described above. The reduction in the formation of cracks may be attributed, in part, to a higher packing density of the cathode material 112, which results in a smaller change in volume when the slurry is dried. In some implementations, the sulfur in the cathode material 112 may have a mass loading greater than or equal to approximately 10 mg·cm$^{-2}$. In some implementations, the intercalation compound in the cathode material 112 may have a mass loading greater than or equal to approximately 10 mg·cm$^{-2}$. Additionally, the intercalation compound may also be a mechanically hard material such that the volume of the cathode material 112 also doesn't substantially change during the charge and discharge cycles of the battery 100.

As described above, the shuttling effect in Li—S batteries may be attributed, in part, to the loss of LiPS species during the transition between the S$_8$ and the Li$_2$S phases. In order to reduce the shuttling effect, the cathode material 112 should be configured to have a greater affinity towards the various LiPS species. In other words, the cathode material 112 should more readily bind to the various LiPS species in order to prevent the LiPS species from crossing over the separator 130 into the anode 120. However, conventional inactive materials typically have a fixed, weak affinity to LiPS. Unlike conventional inactive materials, the intercalation compound in the cathode material 112 may be configured to undergo lithiation during the charge/discharge process of the battery 100. In some implementations, the lithiated intercalation compound may exhibit a substantially greater affinity to LiPS compared to conventional inactive materials, thus reducing the shuttling effect and increasing the cyclability of the battery 100.

In some implementations, the intercalation compound may also be configured to increase the capacity of the battery 100 within a voltage window similar to sulfur. For example, the intercalation compound may contribute capacity to the battery within a voltage window ranging between about 1.7 V and about 2.8 V.

Various methods may be used to form the cathode material 112. In one exemplary approach, the cathode material 112 may be formed by first ball-milling at least one of the inactive materials and the intercalation compound. In some implementations, the inactive materials may include various carbon materials (e.g., carbon nanotubes (CNT's), graphene) to facilitate formation of a 3D interconnected network of conductive pathways to increase the electrical and ionic conductivity of the cathode material 112. Sulfur may then be introduced into the mixture using, for example, a wet-method or as a powder with a solvent to form a slurry. In some implementations, a binder may be introduced into the slurry. Once the desired rheological properties are attained, the slurry may then be coated onto the current collector 114 and dried to form the hybrid cathode 110. It should be appreciated this is one exemplary method of forming the cathode material 112. Other steps, processes, and methods may be used by one of ordinary skill in the art to produce a cathode material 112 with the desired composition and microstructure.

Various methods may be used to form the battery 100 using the hybrid cathode 110. In one exemplary approach, the hybrid cathode 110 may be cut to a desired shape prior to assembly. Once cut, the battery 100 may be assembled by stacking layer-by-layer the hybrid cathode 110, the separator 130, and the anode 120. In some implementations, the battery 100 may include multiple sets of hybrid cathodes 110, separators 130, anodes 120 forming a jellyroll cell as will be discussed in more detail below. Once assembled, the battery 100 may then be injected with electrolyte and vacuum sealed. It should be appreciated the methods of forming the battery 100 using the hybrid cathode 110 may depend on the type of battery (e.g., a prismatic cell, a coin cell, a pouch cell).

The following sections describe various exemplary implementations of the hybrid cathode 110 using specific intercalation compounds, namely, Chevrel-phase Mo$_6$S$_8$ (Section I) and LiFePO$_4$ (Section II). However, it should be appreciated that other intercalation compounds described above may also be applied using similar manufacturing techniques described herein.

I. An Exemplary Hybrid Cathode Using Chevrel-Phase Mo$_6$S$_8$

Figure 4A:
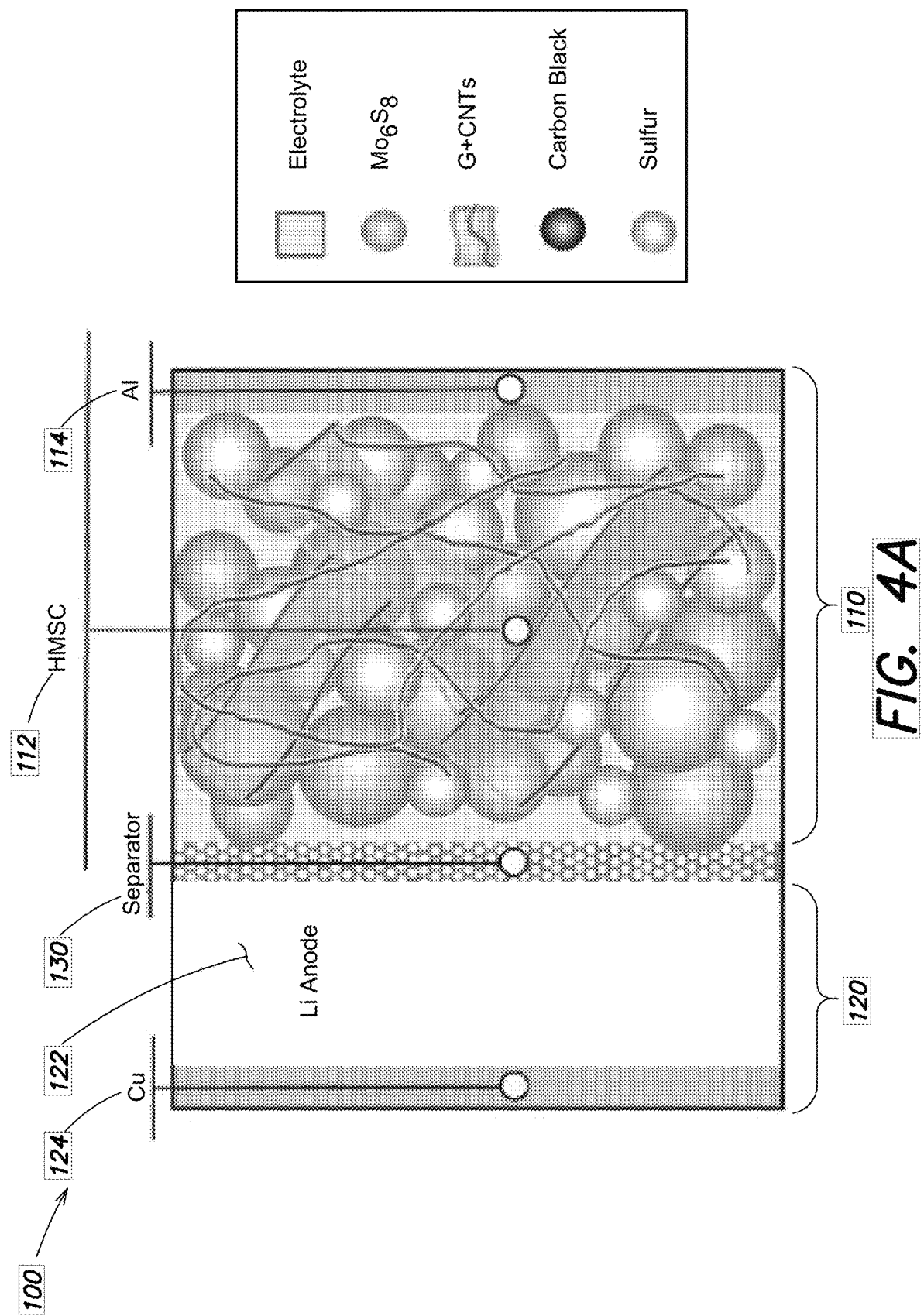
FIG. 4A shows an exemplary Li—S battery where an HMSC material is used in the hybrid cathode.
Figure 4B:
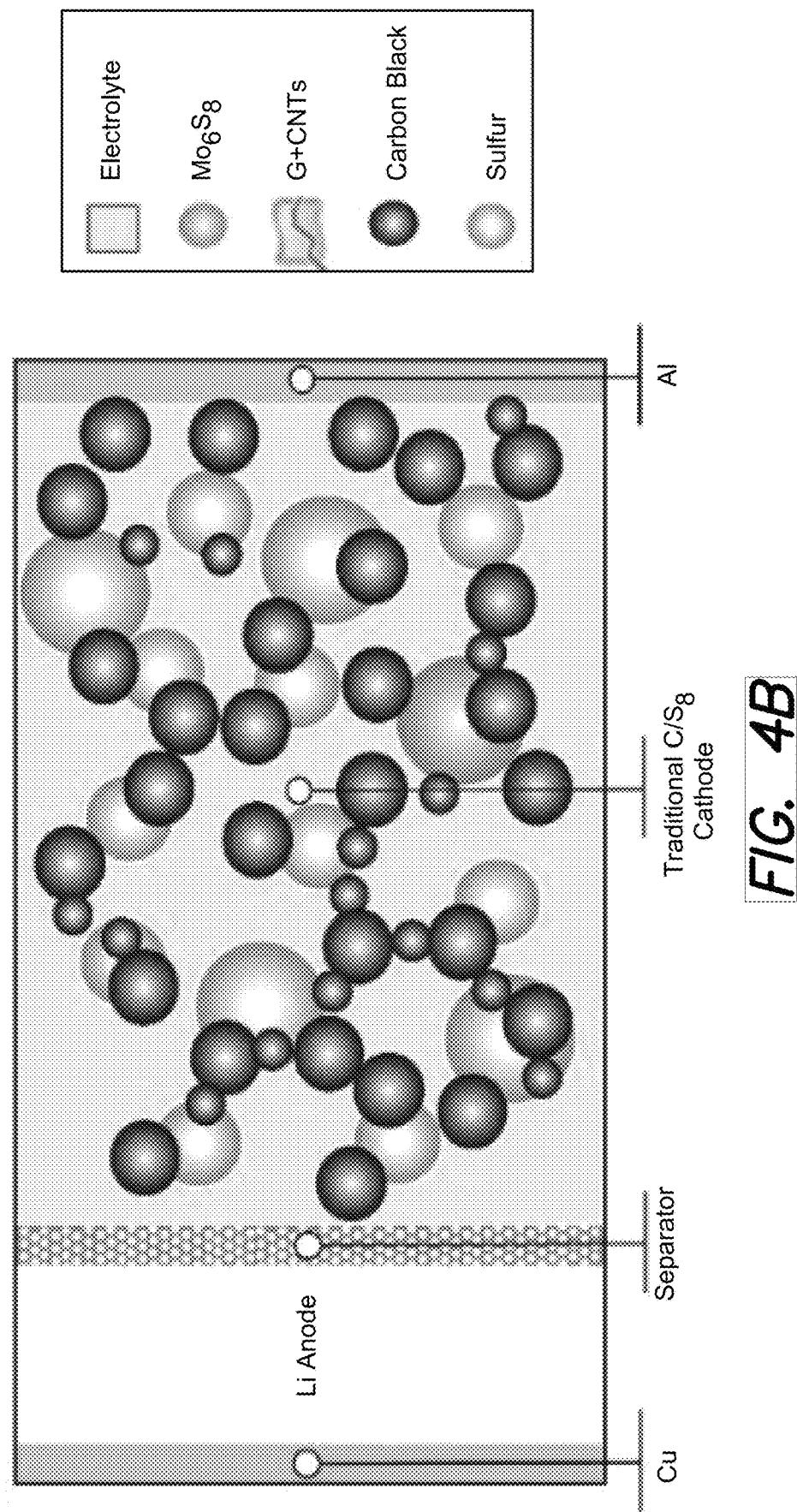
FIG. 4B shows a schematic of a Li—S battery with the $C/S_8$ cathode.

In one exemplary implementation of the hybrid cathode 110, the intercalation compound in the cathode material 112 may include Chevrel-phase Mo$_6$S$_8$. Chevrel-phase Mo$_6$S$_8$ is an electrochemically-active material with fast lithium intercalation reactions and high tap density. The cathode material 112 may thus be hybridized with S$_8$. For reference, a cathode material 112 formed using a hybrid Mo$_6$S$_8$/S$_8$ with carbon is hereinafter referred to as the "HMSC material". FIG. 4A shows an exemplary Li—S battery 100 with an HMSC cathode material 112. For comparison, FIG. 4B shows a conventional C/S$_8$ cathode used in conventional Li—S batteries.

The electrically conducting and electrochemically active Mo$_6$S$_8$ may decrease the use of high surface-area carbon due to the material's low electrical resistance (measured to be 0.102 $\Omega \cdot sq^{-1}$ using a standard four-point probe resistivity measurement system) leading to the reduction in cathode porosity from ~70 vol % to ~55 vol %. The hybrid cathode 110 using the HMSC material 112 should enable much higher $E_g$ and $E_v$ than traditional C/S$_8$ cathodes as shown in FIGS. 1A and 1B. As shown, the amount of electrolyte is correlated to porosity under the assumption that the electrolyte fills the pores in the cathode. By reducing the cathode porosity from ~70 vol % to ~55 vol %, $E_g$ and $E_v$ may be substantially increased compared to conventional C/S$_8$ cathodes.

Chevrel-phase Mo$_6$S$_8$ also exhibits several unique properties beneficial to the Li—S battery 100:

(1) Unlike conventional inactive materials typically used in a sulfur cathode, Chevrel-phase Mo$_6$S$_8$ is able to contribute to the capacity of the battery 100 in an ether-based electrolyte within the same voltage window as sulfur (1.7-2.8 V) using the following reaction chemistry: $4Li^+ + 4e^- + Mo_6S_8 \leftrightarrow Li_4Mo_6S_8$.

(2) The reaction above is topotactic/intercalative and therefore has fast kinetics since Li$_x$Mo$_6$S$_8$ has high polaron mobility (Mo$^{2+} \leftrightarrow$ Mo$^{3+}$).

(3) The theoretical density of Chevrel-phase Mo$_6$S$_8$ (5.04 g·cm$^3$) is theoretically much higher than sulfur (2.07 g·cm$^{-3}$), thus the volumetric energy density of Mo$_6$S$_8$ is 1400 Wh·L$^{-1}$, which is comparable to the intrinsic rate capability of other cathode materials, such as LiFePO$_4$.

(4) The affinity of Chevrel-phase Mo$_6$S$_8$ for LiPS can be greatly enhanced via in-situ electrochemical lithiation of Mo$_6$S$_8$ to form Li$_x$Mo$_6$S$_8$, thereby suppressing the shuttling effect and resulting in stable cyclability of the battery 100.

(5) Chevrel-phase Mo$_6$S$_8$ may also improve the rheological properties of a slurry used to manufacture the hybrid cathode 110. In particular, the HMSC slurry may exhibit a similar "feel" and flow characteristics as a conventional LIB slurry when coated on the current collector 114. Furthermore, the slurry may be hard-pressed and is less prone to cracking even with thicker coatings, allowing high mass loading such as 6.2 mg cm$^{-2}$ S$_8$+6.1 mg cm$^{-2}$ Mo$_6$S$_8$.

(6) After drying the slurry coated current collector 114, the HMSC material 112 may exhibit reduced porosity. However, the electrolyte may still readily wet the cathode material 112. The mechanically hard Mo$_6$S$_8$ with fast Li-ion transport and nearly zero volume change during charging-discharging is a preferred backbone to immobilize "soft" sulfur species, thus "unlocking" their high gravimetric capacity. This material combination of Chevrel-phase Mo$_6$S$_8$ and S$_8$ may be viewed as an analog to the relationship between primer and TNT in explosives, i.e., the Chevrel-phase Mo$_6$S$_8$ is fast acting and the S$_8$ provides high gravimetric energy content.

The HMSC material 112 described herein contains low carbon content (e.g., ~10 wt %) and a dense electrode 110. For example, the HMSC material 112 may include 95 wt % HMSC+5 wt % binder, which are similar proportions to conventional LIB cathodes. The HMSC 112 shows good rate capability of 6 mA·cm$^{-2}$ and stable long-term cycling performance. The cathode porosity is reduced tremendously to ~55 vol % (compared to >70 vol % for traditional sulfur cathodes), and a low E/AM ratio of 1.2 μL mg$^{-1}$ may be realized. In particular, Ah-level pouch cells delivering high joint $E_g$ and $E_v$ of 366 Wh·kg$^{-1}$ and 581 Wh·L$^{-1}$, respectively, were fabricated, which outperform both conventional Li—S cathodes and commercial LIB in terms of the joint energy densities $E_g$ and $E_v$.

Fabrication and Characterization of an Exemplary Mo$_6$S$_8$/S$_8$Cathode

Chevrel-phase Mo$_6$S$_8$ is a unique class of compounds that may accommodate both multivalent and monovalent cations. The lattice structure includes clusters of distorted Mo$_6$-octahedra surrounded by S$_8$ cubes. Due to the open and stable structure, Chevrel phase Mo$_6$S$_8$ exhibits fast ion transport and good structural stability during lithiation/delithiation with a theoretical specific capacity of 128 mAh·g$^{-1}$. Although Mo$_6$S$_8$ has received attention as potential cathode/anode materials for Mg batteries and high-voltage aqueous Li-ion batteries, Mo$_6$S$_8$ has not been applied to Li—S batteries. Within the operating voltage window of Li—S batteries (i.e., from 1.7 V to 2.8 V), the stoichiometry of Li insertion into Mo$_6$S$_8$ involves three stages, $$Li^+ + e^- + Mo_6S_8 \leftrightarrow Li_1Mo_6S_8 \qquad (1)$$

$$2Li^+ + 2e^- + Li_1Mo_6S_8 \leftrightarrow Li_3Mo_6S_8 \qquad (2)$$

$$Li^+ + e^- + Li_3Mo_6S_8 \leftrightarrow Li_4Mo_6S_8 \qquad (3)$$

Figure 5:
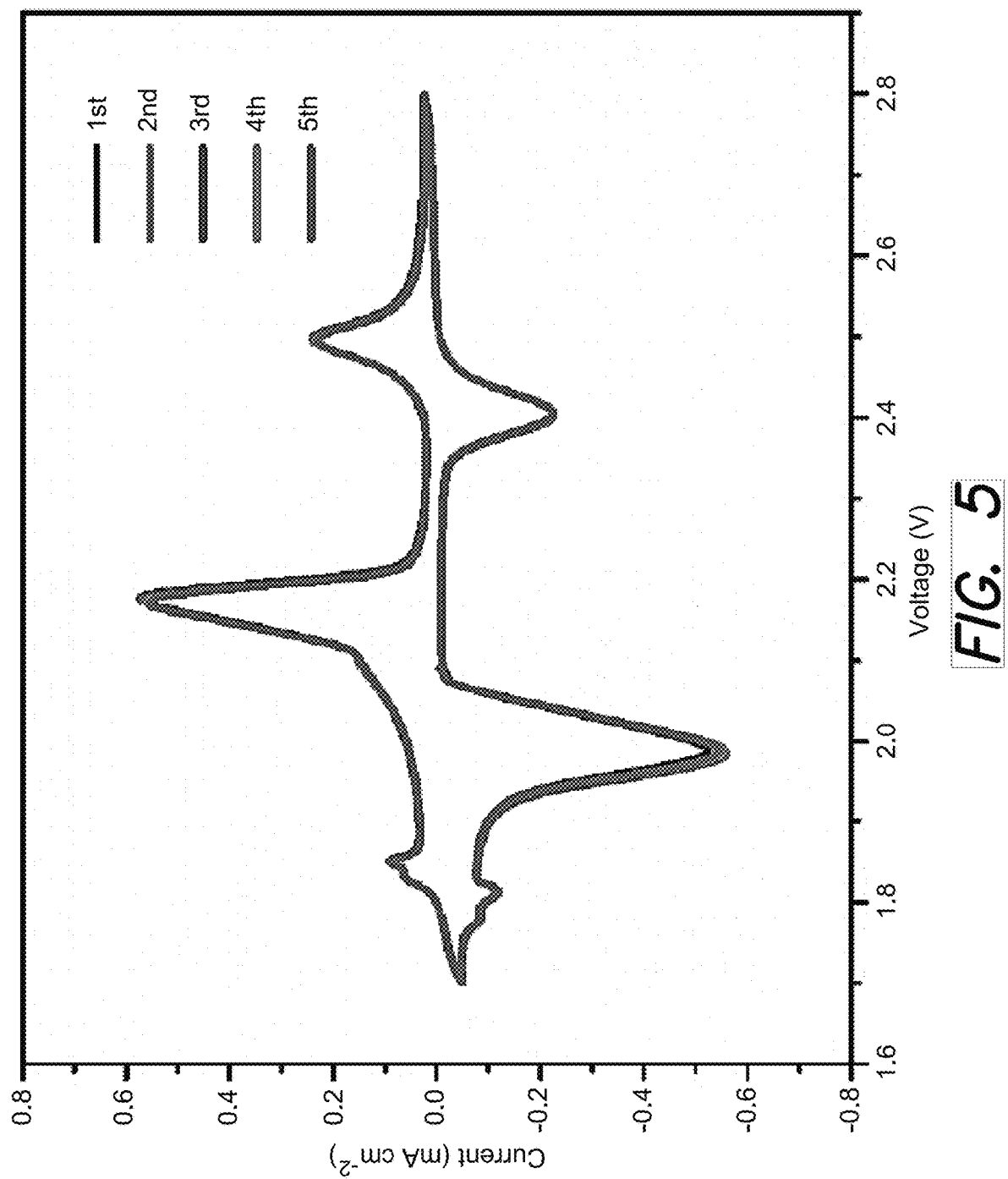
FIG. 5 shows the 1$^{st}$ through 5$^{th}$ CV profiles of the $Mo_6S_8$ in the ether-based electrolyte.
Figure 6A:
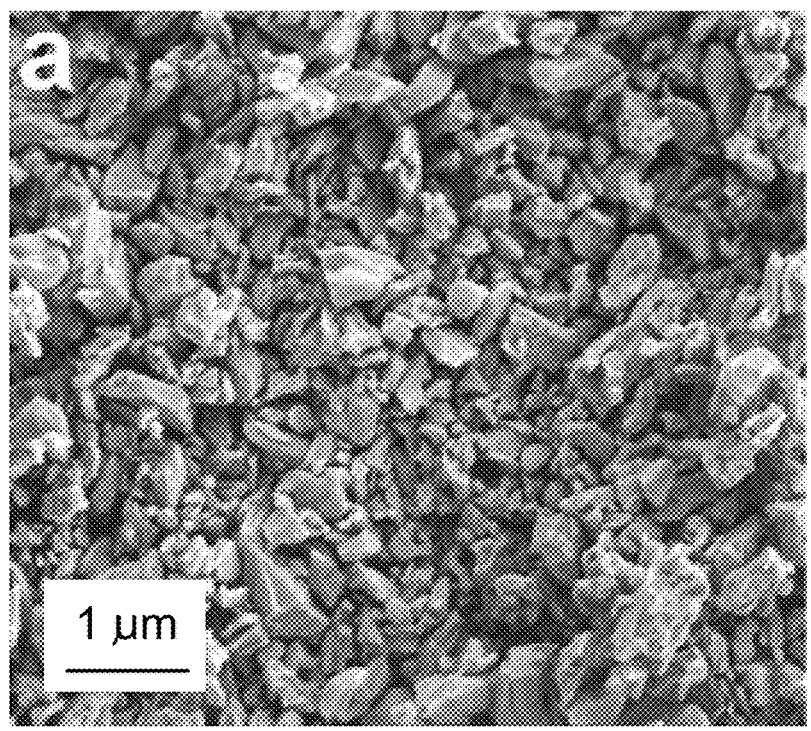
FIG. 6A shows a scanning electron microscope (SEM) image of the microstructure of the as-prepared $Mo_6S_8$ powder.
Figure 6B:
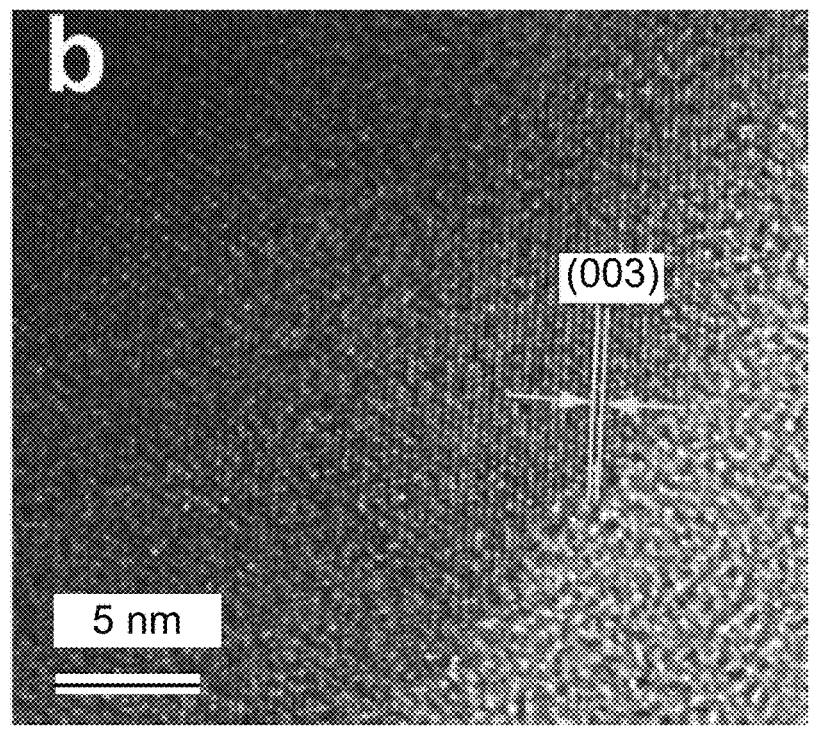
FIG. 6B shows a high resolution transmission electron microscope (HR TEM) image of the as-prepared $Mo_6S_8$ powder of FIG. 6A.

As illustrated by the cyclic voltammetry (CV) plots in FIG. 5, the typical CV profile shows three cathodic peaks and three anodic peaks corresponding to Eqs. (1), (2), and (3). The lack of a decay in the peak intensities indicates both good reversibility and stability of Mo$_6$S$_8$ in the ether-based electrolyte used for Li—S batteries. The scanning electron microscopy (SEM) micrograph in FIG. 6A reveals irregular-shaped particles ranging from several hundred nanometers to several microns. A representative high-resolution TEM (HRTEM) image in FIG. 6B shows lattice fringes with a spacing of 0.36 nm, corresponding to plane of rhombohedral Mo$_6$S$_8$. The morphologies and microstructures were characterized by scanning electron microscope (Zeiss Merlin High-resolution SEM) with EDX and Transmission Electron Microscopy (TEM, JOEL 2010F).

Figure 7:
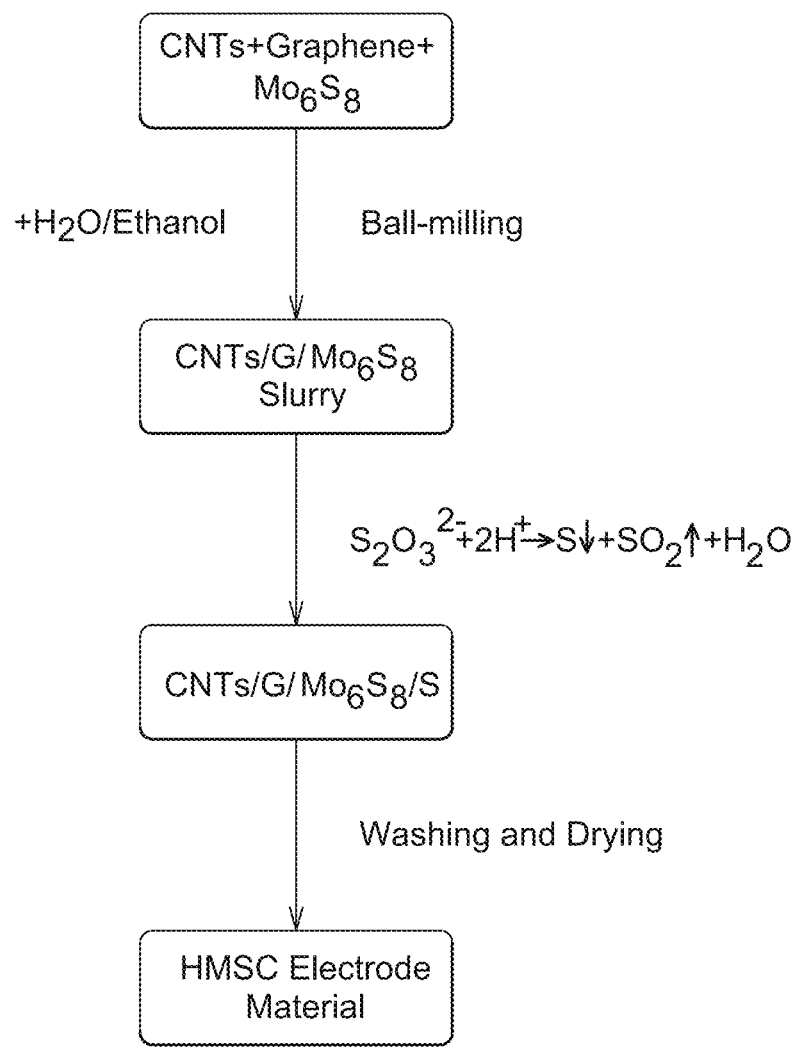
FIG. 7 shows an exemplary fabrication process of the HMSC electrode material.

The synthesis procedure of the HMSC material 112 is shown in FIG. 7. Chevrel phase Mo$_6$S$_8$ was fabricated by a solid-state synthesis method. First, CuS (99% Sigma-Aldrich), Mo (99.99% Sigma-Aldrich), and MoS$_2$ (99% Sigma-Aldrich) were ground for 0.5 h, and then the mixtures were pressed into a pellet by a 14 mm-diameter mold. The pellet was then sealed in a Swagelok stainless steel tube, which was gradually heated to 900° C. for 24 h at 2° C. min$^{-1}$ in argon. Subsequently, the as-received Cu$_2$Mo$_6$S$_8$ precursors were added into a 6 M HCl solution for 12 h with oxygen bubbling to leach out Cu. After the reaction, the obtained Mo$_6$S$_8$ powder was centrifuged and washed with deionized (DI) water three times followed by drying at 60° C. overnight under vacuum.

Figure 8A:
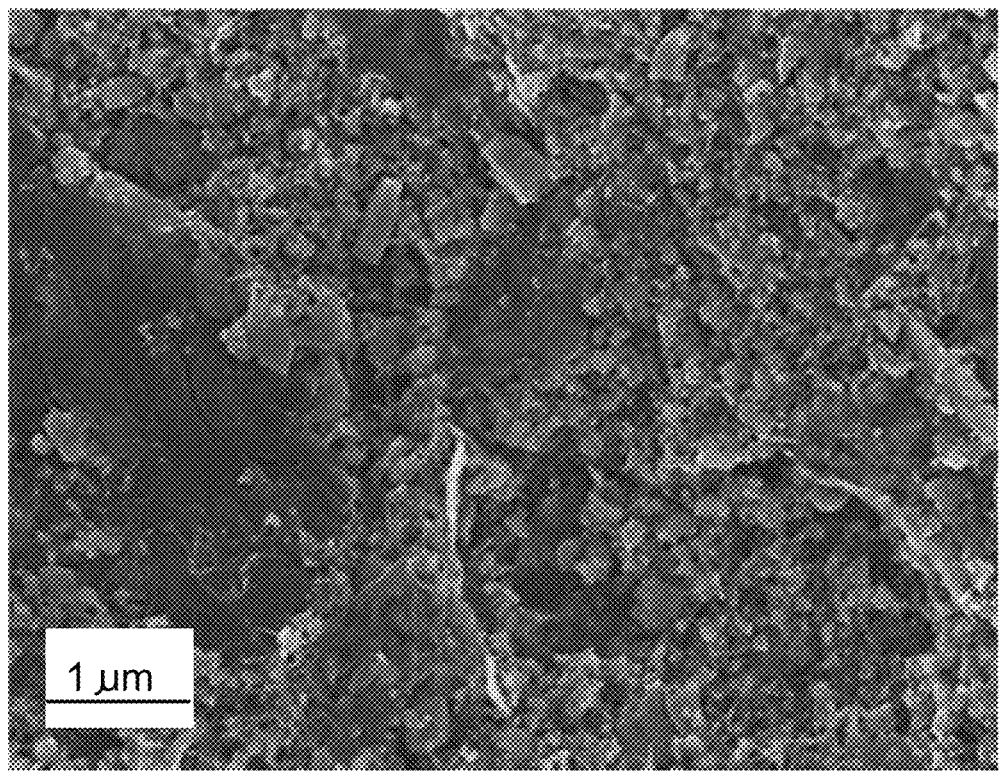
FIG. 8A shows an SEM image of the CNTs/G/$Mo_6S_8$ mixture after ball-milling.

Sulfur was synthesized and deposited using a wet-method based on the reaction between Na$_2$S$_2$O$_3$ and H$_2$SO$_4$. First, carbon nanotubes (CNTs), graphene (G) and Mo$_6$S$_8$ were ball-milled to obtain a uniform slurry (see FIG. 8A). Second, Na$_2$S$_2$O$_3$ was then dissolved into the uniform slurry. Third, 0.5 M H$_2$SO$_4$ was slowly added into the CNTs/G/Mo$_6$S$_8$/Na$_2$S$_2$O$_3$ mixture and stirred at room temperature for 2 hr. Fourth, the HMSC material 112 was then obtained after the mixture was washed, centrifuged, and dried at 60° C. overnight. The resulting HMSC material 112 contained 10 wt % carbonaceous materials (CNT/G) and 90 wt % S$_8$+Mo$_6$S$_8$.

Figure 8B:
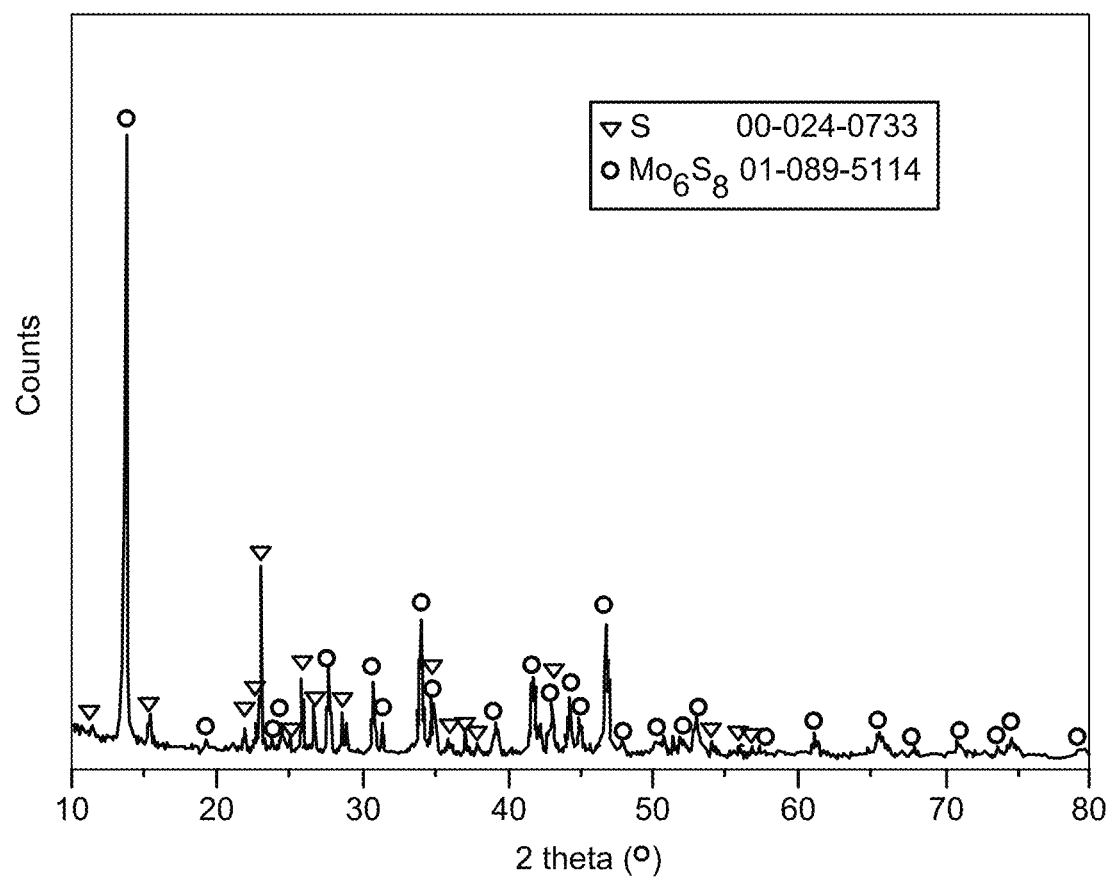
FIG. 8B shows XRD pattern data of the HMSC material.
Figure 9A:
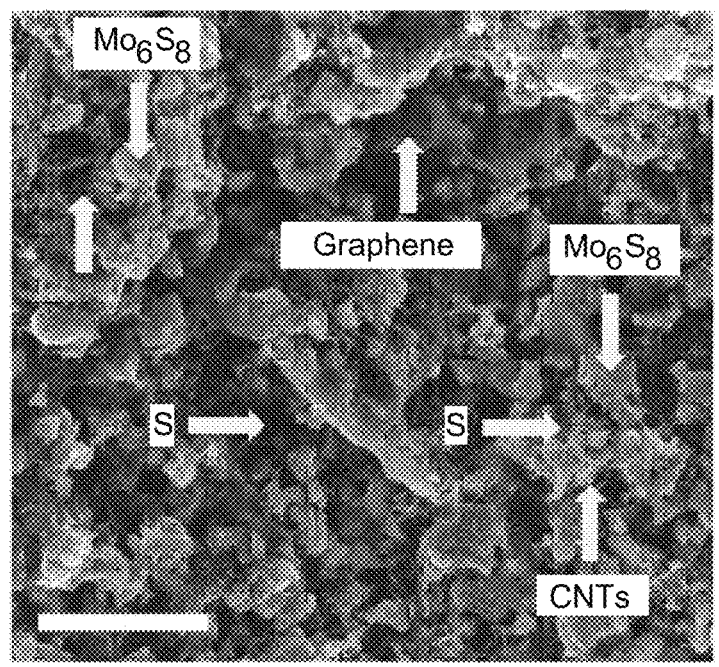
FIG. 9A shows an image of the surface of the exemplary Li—S battery of FIG. 4A. The scale bar is 1 μm.
Figure 9B:
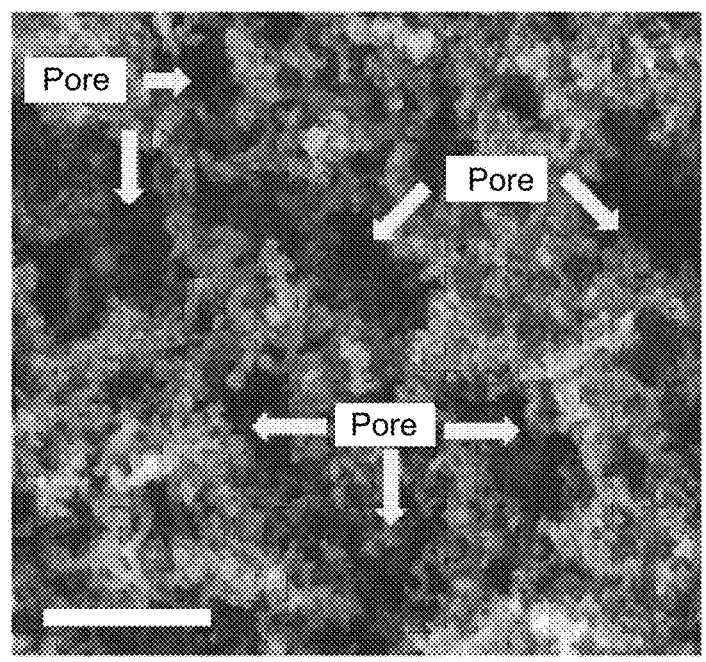
FIG. 9B shows an image of the surface of the Li—S battery of FIG. 4B. The scale bar is 1 μm.

FIG. 8B shows x-ray diffraction (XRD) data that indicates the $Mo_6S_8$ and $S_8$ are the dominant components of the HMSC material 112. In the dried cathode 110, the binder to HMSC weight ratio is 5:95 with no other source of carbon added. The binder used is an SBR/CMC mixture. FIG. 9A shows an SEM image showing a dense morphology and uniform dispersion of CNTs, G, $Mo_6S_8$ and S in the cathode material 112 where CNTs and G support a 3D interconnected conductive network. The uniformly dispersed $Mo_6S_8$ offers an electrically conductive matrix comparable to carbon due to the high electrical conductivity and high tap density. The carbon content also decreases from more than 30 wt % in traditional $C/S_8$ cathodes to ~10 wt %, which is comparable to traditional LIB cathodes. For comparison, FIG. 9B shows an SEM image of a conventional $C/S_8$ cathode with a porous morphology due to the large carbon content (36 wt %).

Figure 9C:
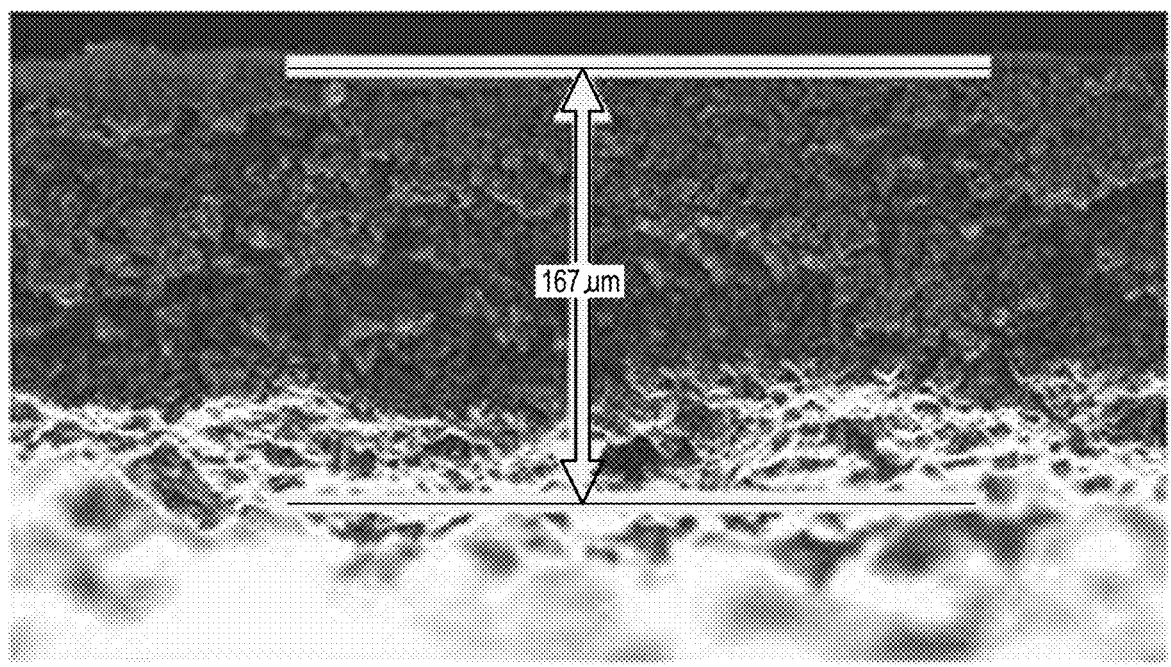
FIG. 9C shows a cross-sectional image of the Li—S battery of FIG. 9B.
Figure 9D:
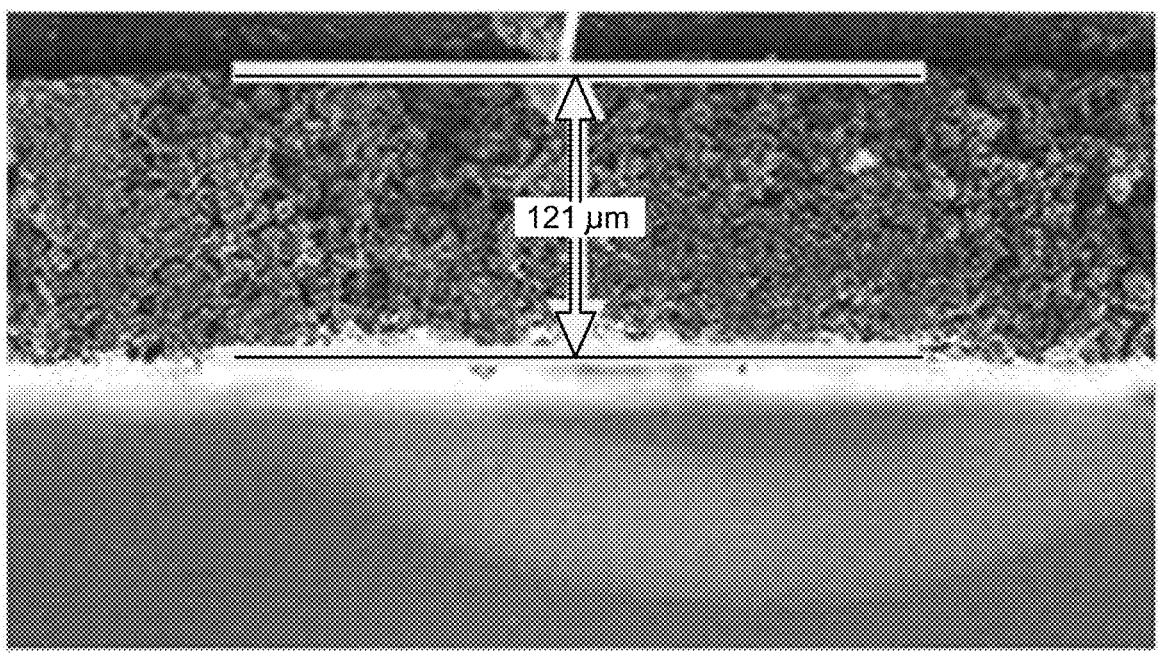
FIG. 9D shows a cross-sectional image of the exemplary Li—S battery of FIG. 9A.
Figure 10:
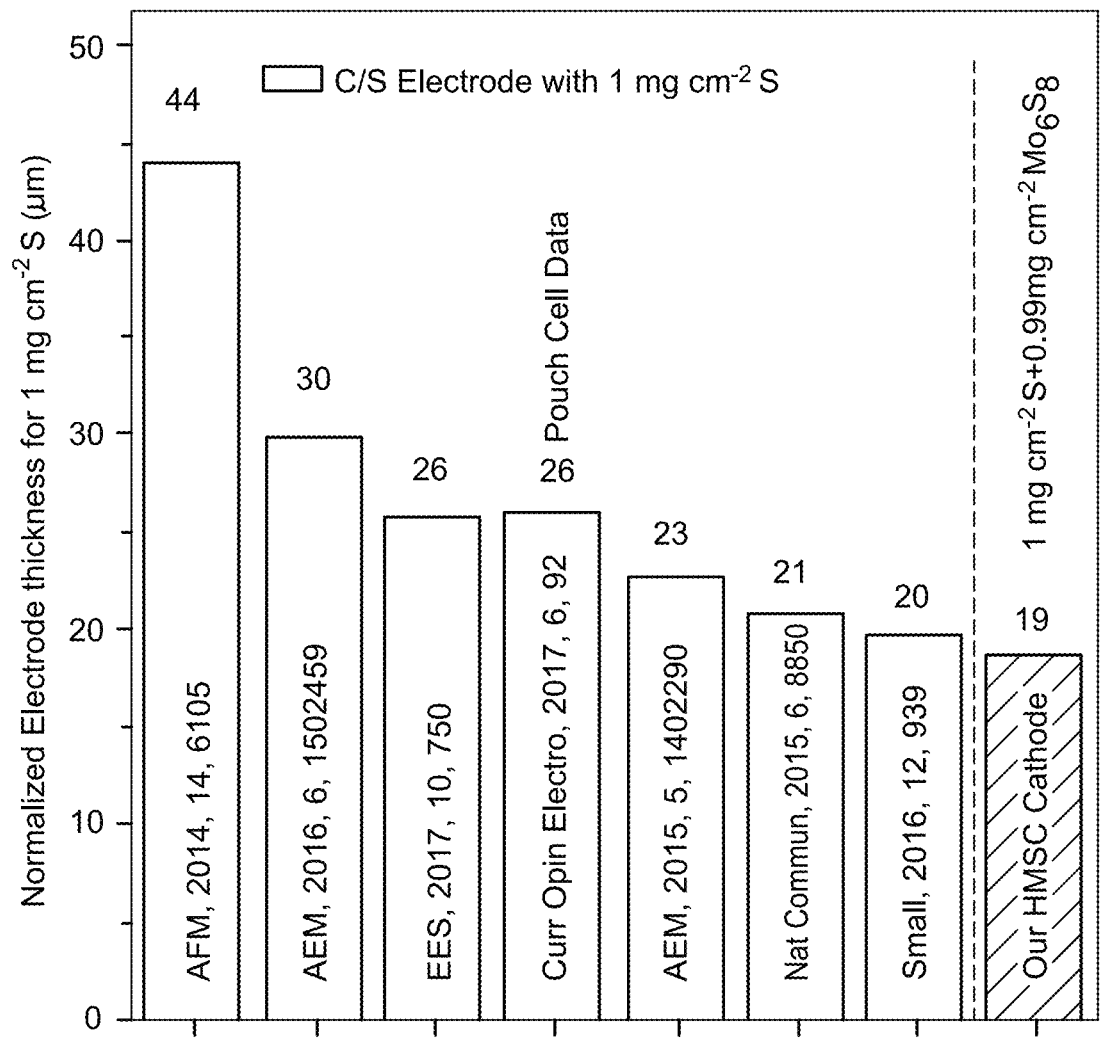
FIG. 10 shows a chart of the normalized electrode thickness (NET) per 1 mg·cm$^{-2}$ sulfur loading of the HMSC and traditional C/S cathodes.

The substitution of low-tap-density inactive components, such as carbon, by high-tap-density electrochemically active components, such as Chevrel-phase $Mo_6S_8$, yields three distinct advantages over conventional $C/S_8$ cathodes:

(1) The packing density of active materials may be increased. The electrode thickness with 6.2 mg·cm$^{-2}$ $S_8$ for the conventional $C/S_8$ cathode is 167 m as shown in FIG. 9C. In contrast, the hybrid cathode 110 disclosed herein with 6.2 mg·cm$^{-2}$ $S_8$ plus 6.1 mg cm$^{-2}$ $Mo_6S_8$ is only 121 m as shown in FIG. 9D. FIG. 10 shows the normalized electrode thickness (NET), which is defined on a per 1 mg·cm$^{-2}$ $S_8$ basis for previous studies on conventional $C/S_8$ electrodes and the HMSC material 112 described herein. The packing density of the active materials in the HMSC material 112, which according to FIG. 10 exhibits a NET of 19 μm for 1 mg·cm$^{-2}$ S and 0.99 mg cm$^{-2}$$Mo_6S_8$, may be calculated as follows:

$$S: \frac{1 \text{ mg cm}^{-2}}{19 \text{ μm}} = 526 \text{ g L}^{-1} \quad (4)$$

$$Mo_6S_8: \frac{0.99 \text{ mg cm}^{-2}}{19 \text{ μm}} = 521 \text{ g L}^{-1} \quad (5)$$

Following a similar calculation, conventional $C/S_8$ electrodes exhibit an overall packing density of active material (i.e. only sulfur) less than 500 g·L$^{-1}$. However, the overall packing density of active materials in the HMSC material 112 doubles to 1047 g·L$^{-1}$, which includes 526 g·L$^{-1}$ ($S_8$) plus 521 g·L$^{-1}$ ($Mo_6S_8$).

Figure 11A:
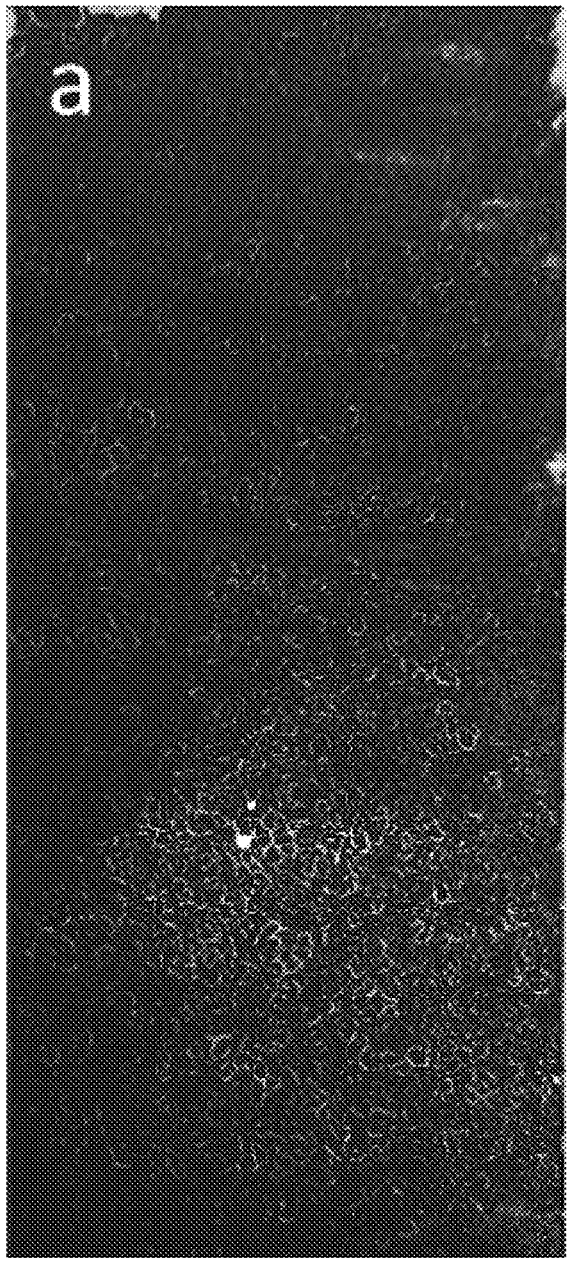
FIG. 11A shows an image of a 36% C/54% S slurry coated onto a carbon-coated aluminum (Al) foil.
Figure 11B:
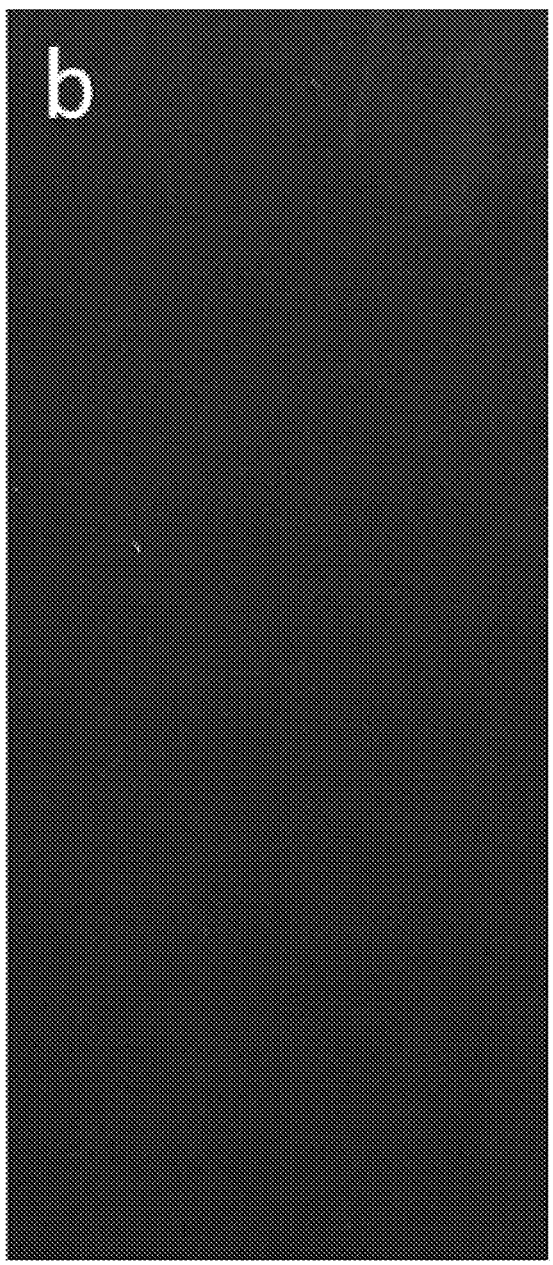
FIG. 11B shows an image of a 10% C/42.3% $Mo_6S_8$/ 42.8% S slurry coated onto a carbon-coated Al foil.

(2) Hybrid cathodes 110 formed using the HMSC material 112 may be more readily crack-free and allows higher sulfur loading, which is preferable for practical applications of the Li—S battery 100. For comparison, traditional $C/S_8$ cathodes having a high fraction of carbonaceous materials are typically cast using solvent in the slurry that is diluted to a preferred viscosity due to the large volume of solid material in the slurry. For such $C/S_8$ slurries, particle segregation and cracks typically form due to excessive shrinkage during drying. For example, FIG. 11A shows a surface image of a conventional $C/S_8$ cathode containing 36 wt % carbon with large cracks and morphological inhomogeneities. In contrast, FIG. 11B shows an exemplary HMSC material 112 with 10% C/42.3% $Mo_6S_8$/42.8% S with a smooth and crack-free surface.

Figure 12A:
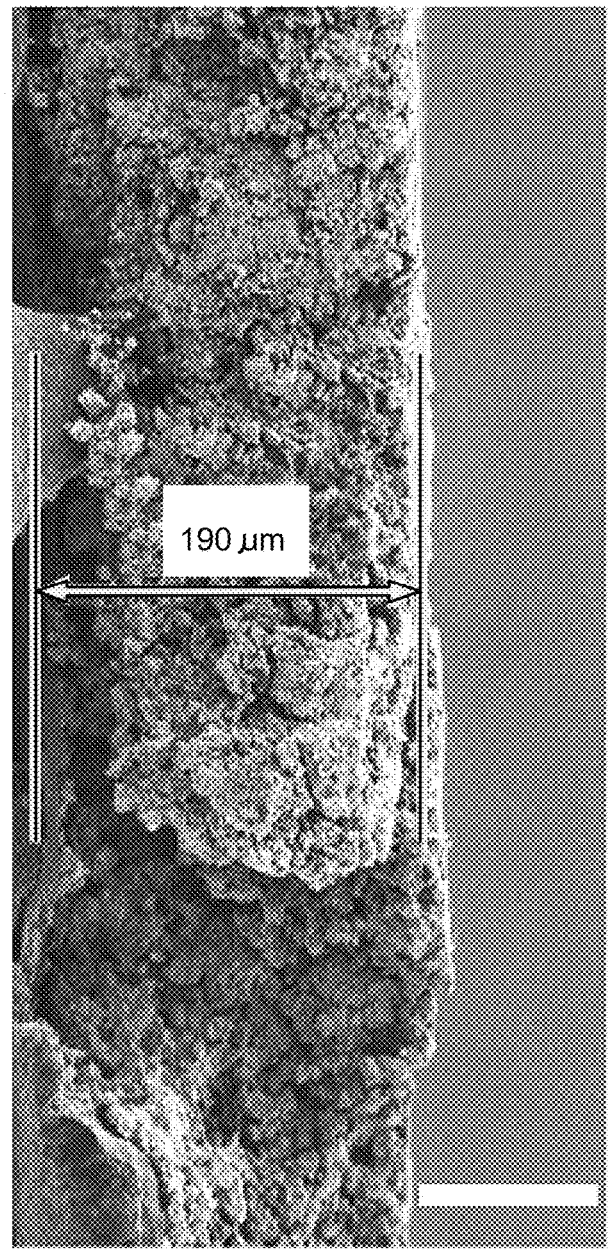
FIG. 12A shows a cross-sectional SEM image of an exemplary cathode with 10 mg cm$^{-2}$ S+9.9 mg cm$^{-2}$ $Mo_6S_8$. The scale bar is 100 m.
Figure 12B:
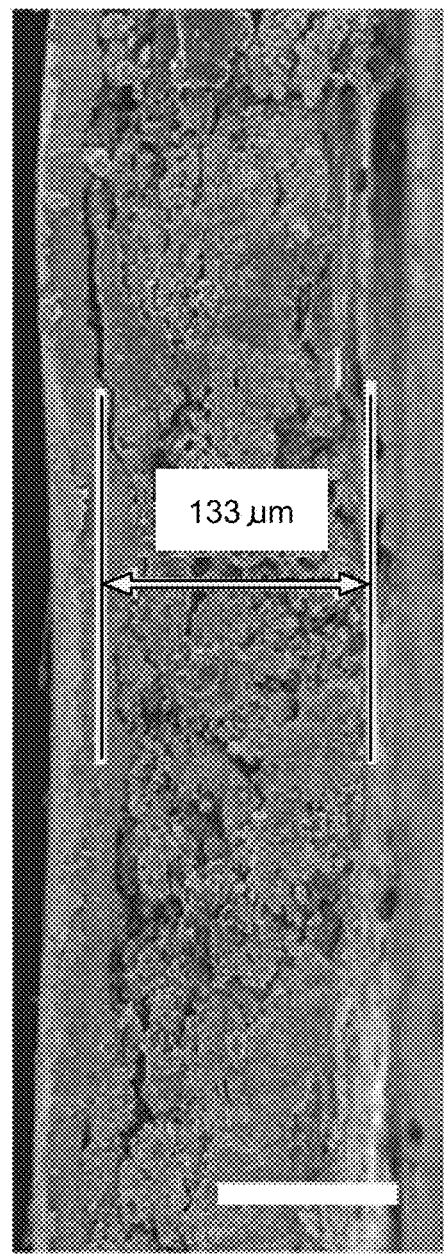
FIG. 12B shows a cross-sectional SEM image of an exemplary cathode with 6.9 mg cm$^{-2}$ S+6.8 mg cm$^{-2}$. The scale bar is 100 μm.

Thus, HMSC materials 112 formed, using the fabrication processes previously described, may be crack-free and highly compact with a high loading of active material (e.g., a mass loading as high as 10 mg·cm$^{-2}$ S and 9.9 mg·cm$^{-2}$ $Mo_6S_8$) as shown in FIG. 12A. Another exemplary HMSC material 112 with a mass loading of 6.9 mg cm$^{-2}$ S+6.8 mg cm$^{-2}$ is shown in FIG. 12B. Once the slurry coats the current collector 114, the slurry physically feels similar to a traditional LIB cathode slurry and not like a typical $C/S_8$ slurry due to the presence of hard $Mo_6S_8$ articles as the dispersant. Unlike conventional $C/S_8$ cathodes, the HMSC material 112 may be hard pressed like conventional LIB cathodes.

(3) The electrically and ionically conductive $Mo_6S_8$ also functions as a mechanically hard backbone that "unlocks" the gravimetric capacity of sulfur and immobilizes the "soft" sulfur species. Compared to carbonaceous materials, $Mo_6S_8$ exhibits stronger LiPS adsorption capability, which is able to effectively suppress the SRM shuttling effect and thus improve the cycling stability as will be discussed below.

Enhanced Interaction Between $Li_xMo_6S_8$ and LiPS after Lithium Intercalation

Unlike conventional inactive host materials, which exhibit a given affinity for LiPS, the chemical composition of $Li_xMo_6S_8$ undergoes continuous variation during the charge-discharge process. As a result, $Li_xMo_6S_8$ exhibits a different chemical adsorption to LiPS as the voltage of the battery 100 changes during the charge-discharge process. In order to better understand the electrochemical evolution of lithiated $Mo_6S_8$, CV profiles were measured for an exemplary Li—S battery 100 with an HMSC material 112 in the hybrid cathode 110, a polypropylene (PP) separator 130, and a Li anode 120.

Figure 13A:
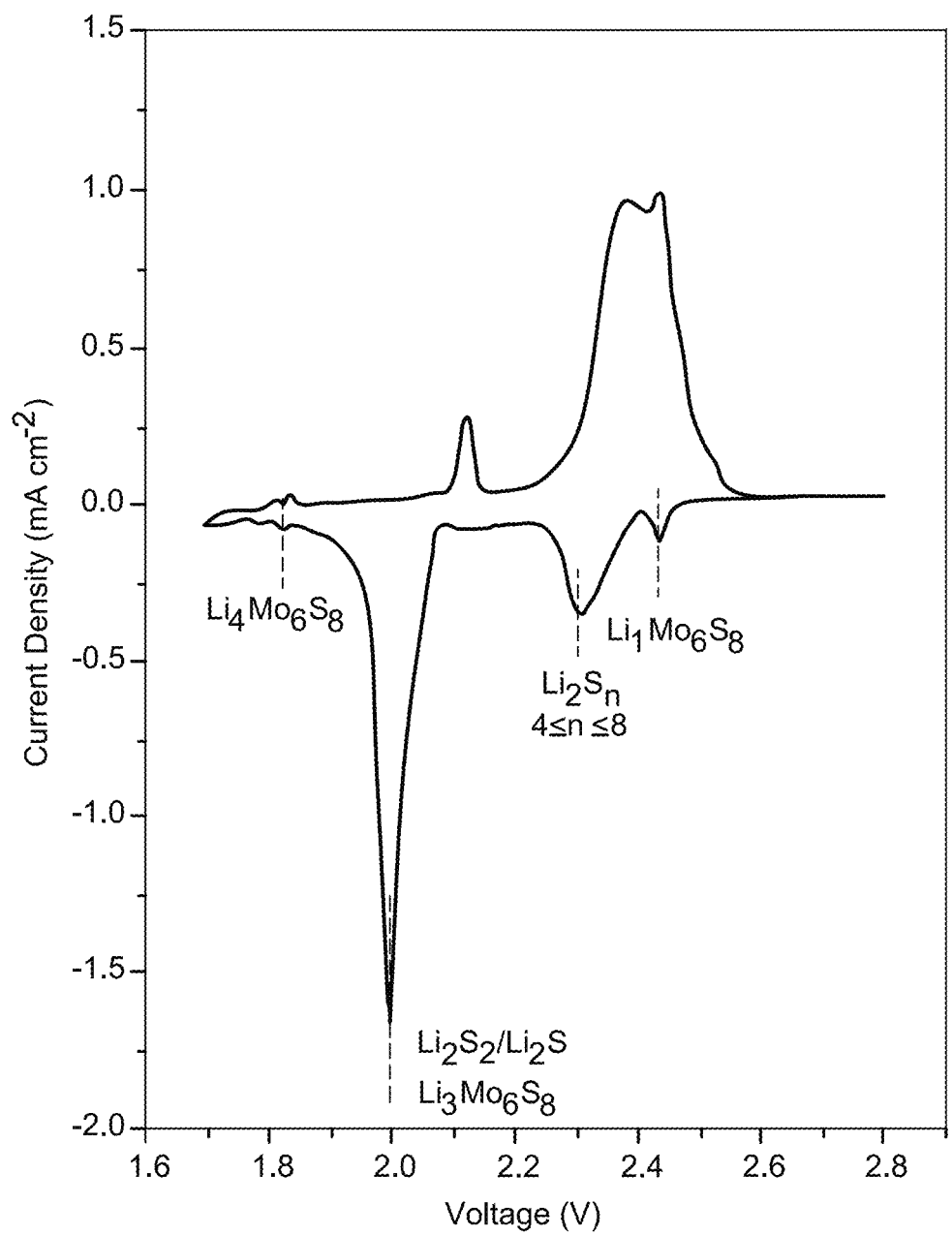
FIG. 13A shows a chart of the current density as a function of the voltage based on a cyclic voltammetry (CV) measurement on the HMSC cathode/Li anode.

FIG. 13A shows the CV characteristics of the exemplary Li—S battery 100, which indicate (1) multiple redox reactions during the charge-discharge process and (2) the highly reversible nature of the electrode 110. The representative cathodic peak at 2.43 V may be attributed to the lithiation of $Mo_6S_8$ to $Li_1Mo_6S_8$. The two representative cathodic peaks at ~2.3 V and 2.0 V may be attributed to the lithiation of sulfur to soluble LiPS ($Li_2S_n$, 4≤n≤8) and insoluble short-chain $Li_2S_2/Li_2S$, respectively. The cathodic peaks of $Li_3Mo_6S_8$ and $Li_4Mo_6S_8$ are not observed, which may be due to an overlap with redox peaks of sulfur.

Figure 13B:
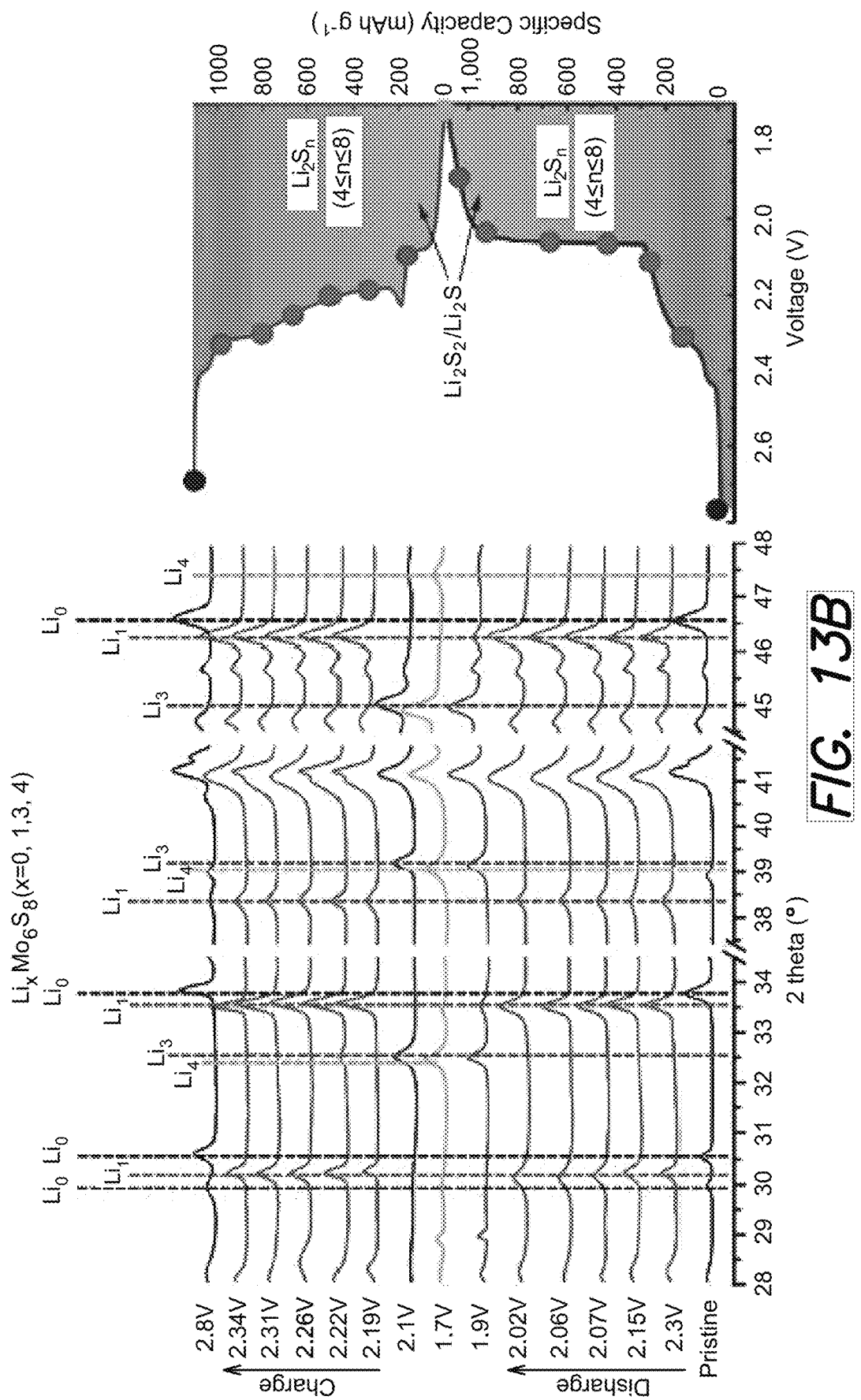
FIG. 13B shows in-situ x-ray diffraction (XRD) measurements of an exemplary Li/HMSC cell.

To gain more insight into the phase evolution of $Li_xMo_6S_8$ of the battery 100, in-situ XRD analysis was performed during the charge-discharge process as shown in FIG. 13B. Specifically, the phase composition was characterized by X-ray diffraction (XRD, Panalytical_XPert). In-situ XRD was performed using a Rigaku Smartlab XRD system coupled with a specialized battery cell to monitor the phase evolution during the discharge and charge.

Initially, the pristine sample contains only rhombohedral $Mo_6S_8$. It should be noted that no peaks associated with sulfur were identified because the intensity of such peaks were substantially lower than peaks associated with $Mo_6S_8$. When the battery 100 is initially discharged to 2.3 V, three characteristic peaks located at 30.7°, 33.9° and 46.7° shift towards lower angles. This shift indicates an increase in the lattice constant after Li intercalation corresponding to rhombohedral $Li_1Mo_6S_8$(JCPDS: 081-0858). When the battery 100 is further discharged from 2.3 V to 2.0 V, rhombohedral $Li_1Mo_6S_8$ becomes the dominant phase corresponding to the continuous reduction of sulfur into soluble, high-order LiPS ($Li_2S_n$, 4≤n≤8) and partially insoluble low-order $Li_2S_2/Li_2S$. When the battery 100 is further discharged to 1.9 V and 1.7 V, the characteristic peaks continue to shift to lower angles implying the emergence of $Li_3Mo_6S_8$(JCPDS: 81-0859) and $Li_4Mo_6S$ (JCPDS: 81-0860), which correspond to the full conversion from LiPS to solid $Li_2S$. The phase evolution is reversible as shown when the battery 100 is charged from 1.7 V to 2.8 V.

The in-situ XRD and CV results reveal that the transition from $S_8$ to LiPS occurs after the formation of $Li_1Mo_6S_8$ and in parallel with the transformation of $Li_1Mo_6S_8$ to $Li_3Mo_6S$. This suggests that the adsorption of LiPS predominately originates from the interactions between $Li_1Mo_6S_8$/$Li_3Mo_6S_8$ and LiPS.

In order to further investigate such interactions, a polysulfide adsorption experiment is performed using a $Li_2S_4$ solution with equal amounts of adsorbent materials (e.g., C, $Mo_6S_8$, $Li_1Mo_6S_8$, $Li_3Mo_6S_8$). In preparation for this experiment, $Mo_6S_8$ powders were pressed into 14 mm-diameter pellets. CR2032 type coin cells were then assembled using $Mo_6S_8$ pellets as cathodes, Celgard separators and metal Li as anodes in the Ar-filled glove box. The electrolyte was 1 M lithium bis (trifluoromethanesulfonyl) imide (LiTFSI) in a 1, 3-dioxolane (DOL) and dimethoxyethane (DME) mixture (1:1, v/v) with 2 wt % $LiNO_3$. The cells were galvanostatically discharged to 2.3 V and 1.9 V at a current density of 0.2 mA·cm$^{-2}$ using a Landt CT 2001A battery cycler to obtain electrochemical lithiated $Li_1Mo_6S_8$ and $Li_3Mo_6S_8$, respectively. Finally, the $Li_1Mo_6S_8$ and $Li_3Mo_6S_8$ products were collected by washing and drying the cathode materials after disassembling the coin cells in the glove box. $Li_2S_4$ solutions were synthesized by reacting lithium sulfide ($Li_2S$) and elemental sulfur in the desired ratio in anhydrous dimethoxyethane (DME) solvent in an Ar-filled glovebox. For LiPS adsorption study, $Mo_6S_8$, $Li_1Mo_6S_8$, $Li_3Mo_6S_8$ were added into glass vials. Subsequently, $Li_2S_4$ solutions were added. Two blank vials were also filled with the same blank $Li_2S_4$ solution and the $Li_2S_4$-Super C65 mixture as control samples, respectively. The adsorption ability of $Mo_6S_8$, $Li_1Mo_6S_8$, $Li_3Mo_6S_8$ and carbon on LiPS was qualitatively determined by using UV-vis spectrometer (Perkin Elmer Lambda 1050 Spectrophotometer).

Figure 13C:
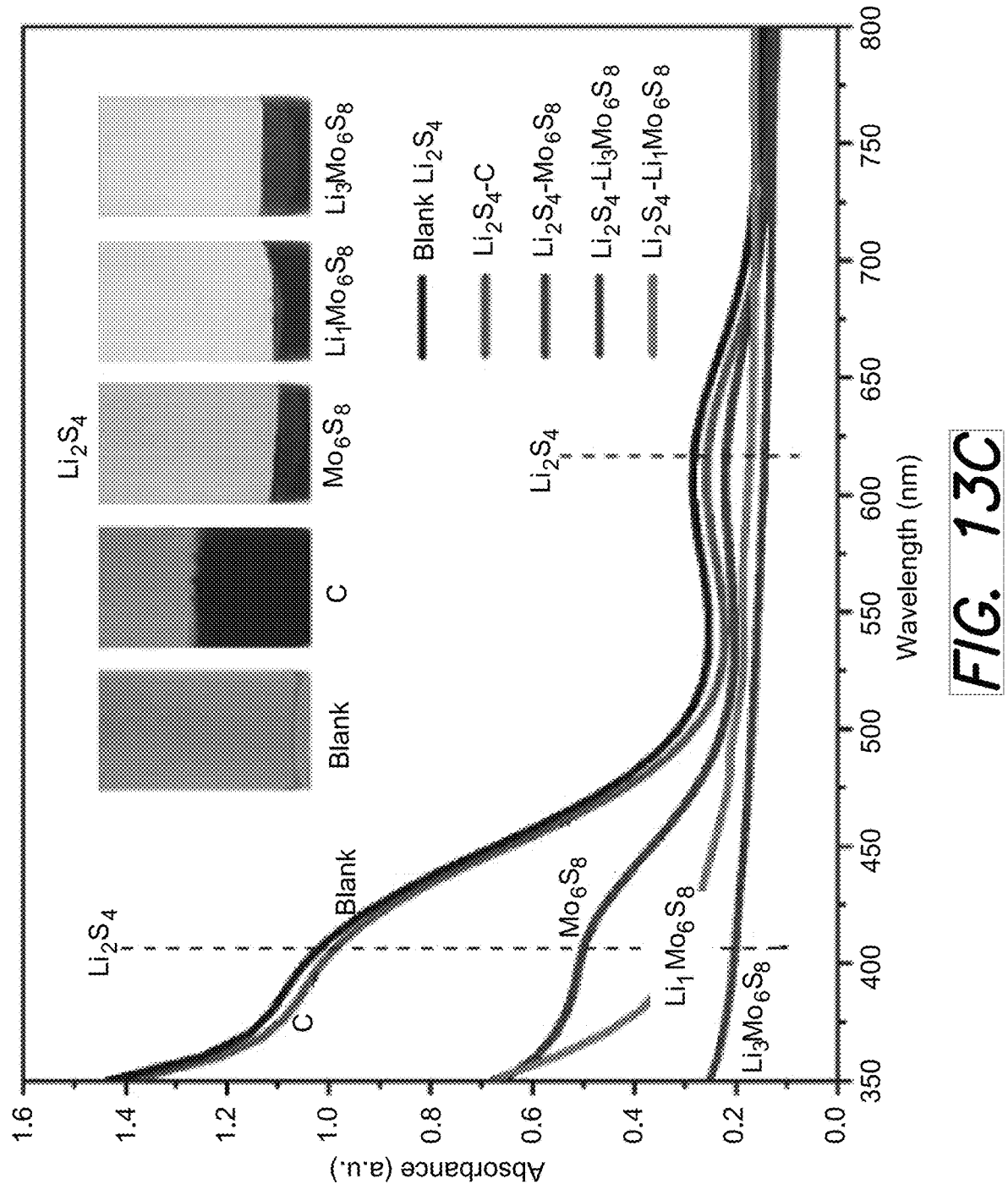
FIG. 13C shows ultraviolet and visible spectra of the $Li_2S_4$ solutions after exposure to C, $Mo_6S_8$, $Li_1Mo_6S_8$, $Li_3Mo_6S_8$ and $Li_4Mo_6S$. The inset shows corresponding images of the $Li_2S_4$ solutions after each exposure.
Figure 14A:
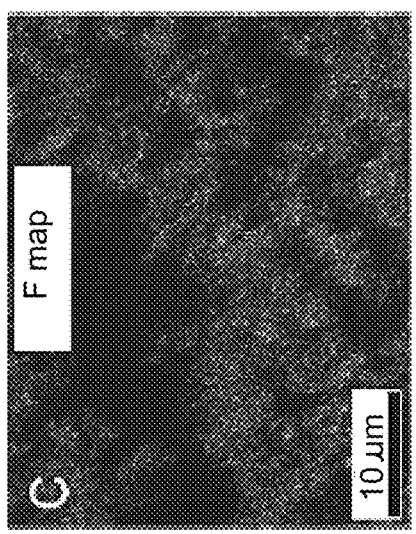
FIG. 14A shows a SEM image of an exemplary cycled HMSC cathode.
Figure 14B:
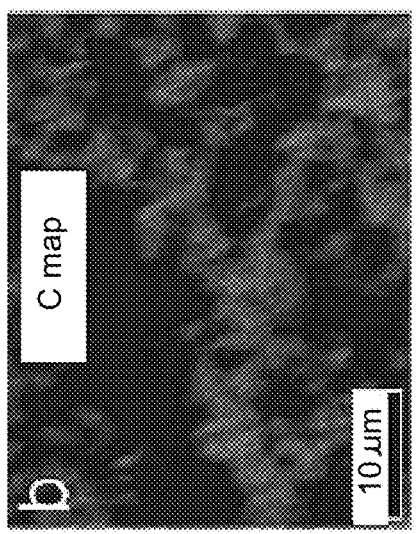
FIG. 14B shows an elemental map of carbon (C) based on the HMSC cathode of FIG. 14A.
Figure 14C:
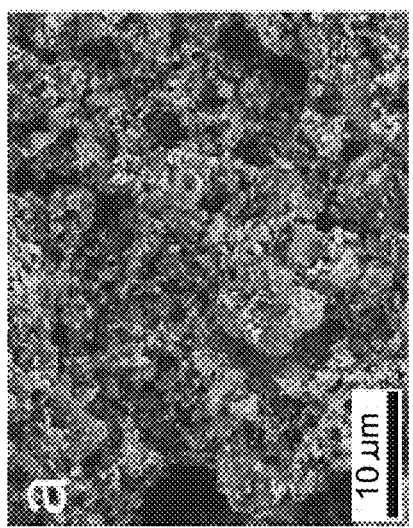
FIG. 14C shows an elemental map of fluorine (F) based on the HMSC cathode of FIG. 14A.
Figure 14D:
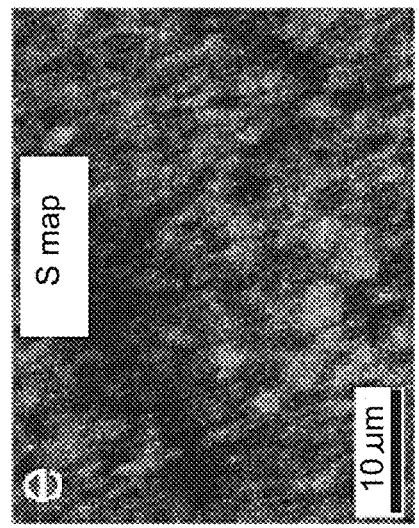
FIG. 14D shows an elemental map of molybdenum (Mo) based on the HMSC cathode of FIG. 14A.
Figure 14E:
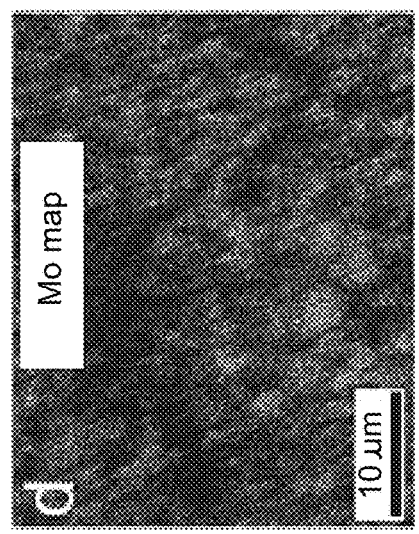
FIG. 14E shows an elemental map of sulfur (S) based on the HMSC cathode of FIG. 14A.

As shown in the inset images of FIG. 13C, the color of the these various $Li_2S_4$ solutions qualitatively change depending on the adsorbent material used, which is indicative of the adsorbent material's ability to adsorb $Li_2S_4$. For instance, the color of the carbon-$Li_2S_4$ solution is similar to the pure $Li_2S_4$ solution, which is indicative of weak surface interaction and consequently unimpressive electrocatalytic activity. The $Mo_6S_8$—$Li_2S_4$ solution shows a comparatively lighter hue, which corresponds to the intrinsic ability of $Mo_6S_8$ to adsorb $Li_2S_4$ and, hence, the strong interaction between the metal sulfide surface and LiPS. Interestingly, the $Li_1Mo_6S_8$—$Li_2S_4$ and $Li_3Mo_6S_8$—$Li_2S_4$ solutions are nearly transparent, which indicates an even stronger adsorption of LiPS.

The adsorption capability of LiPS from $Li_1Mo_6S_8$ and $Li_3Mo_6S_8$ may be further characterized quantitatively using ex-situ ultraviolet-visible (UV-vis) spectroscopy measurements. FIG. 13C shows the $Li_1Mo_6S_8$—$Li_2S_4$ and $Li_3Mo_6S_8$—$Li_2S_4$ solutions exhibit a lower optical absorbance than the $Mo_6S_8$—$Li_2S_4$ at characteristic absorption peaks of $Li_2S_4$ at ~410 nm and ~615 nm, which indicates $Li_1Mo_6S_8$ and $Li_3Mo_6S_8$ are able to more readily bind to $Li_2S_4$ than $Mo_6S_8$. FIGS. 14A-14E further shows elemental maps of C, F, Mo, and S for a representative portion of a cycled HMSC material 112 taken using an EDX detector in an SEM. As shown, the distribution of sulfur is similar to the distribution of Mo, which is further evidence of the adsorption capability of $Li_xMo_6S_8$ with LIPS.

First-principles simulations were performed in order to ascertain the fundamental mechanism for the enhanced affinity of $Li_xMo_6S_8$ to LiPS. For reference, previous modeling studies were typically based on oversimplified molecule-on-slab adsorption configurations. These previous studies did not take into consideration the dissolution of LiPS in electrolyte, which likely led to the overestimation of the binding energies. In practice, solvation plays a role in triggering the ionization of LiPS into solvated Li$^+$ (electrolyte) cations and $S_n^{2-}$ (electrolyte) anions. Therefore, the actual structure of LiPS in the electrolyte may be $LiS_n^-$/$S_n^{2-}$ and solvated Li$^+$. Herein, $Li_2S_4$ is employed as the representative LiPS.

The Perdew-Burke-Ernzerhof exchange-correlational functional and the projector augmented wave method were used in the density functional theory (DFT) simulations implemented by the Vienna Ab initio Simulation Package. The DFT-TS method was used to include the van der Waals interactions in the adsorption processes. A plane wave basis set with an energy cutoff of 500 eV was adopted to expand the electronic wavefunctions. The Brillouin zone integration was conducted on a 5×5×1 Monkhorst-Pack k-point mesh. Atomic coordinates in the structures were relaxed until the residual force was below 0.02 eV·A$^{-1}$.

Figure 15B:
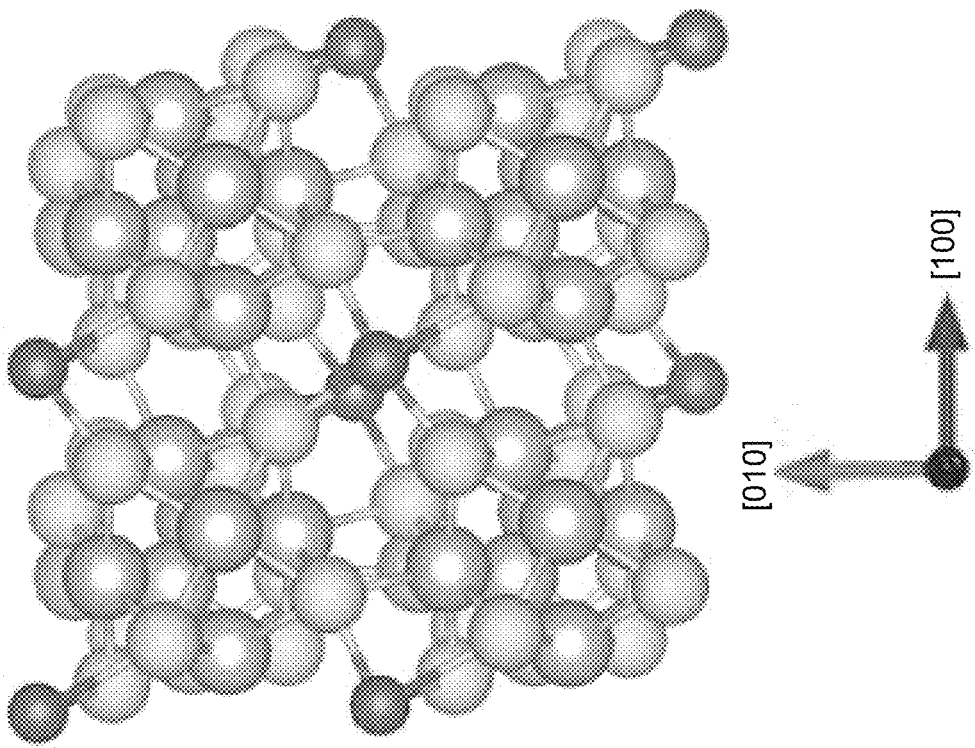
FIG. 15B shows the desired geometric configuration of Li-intercalated $Mo_6S_8$ ($LiMo_6S_8$).
Figure 15A:
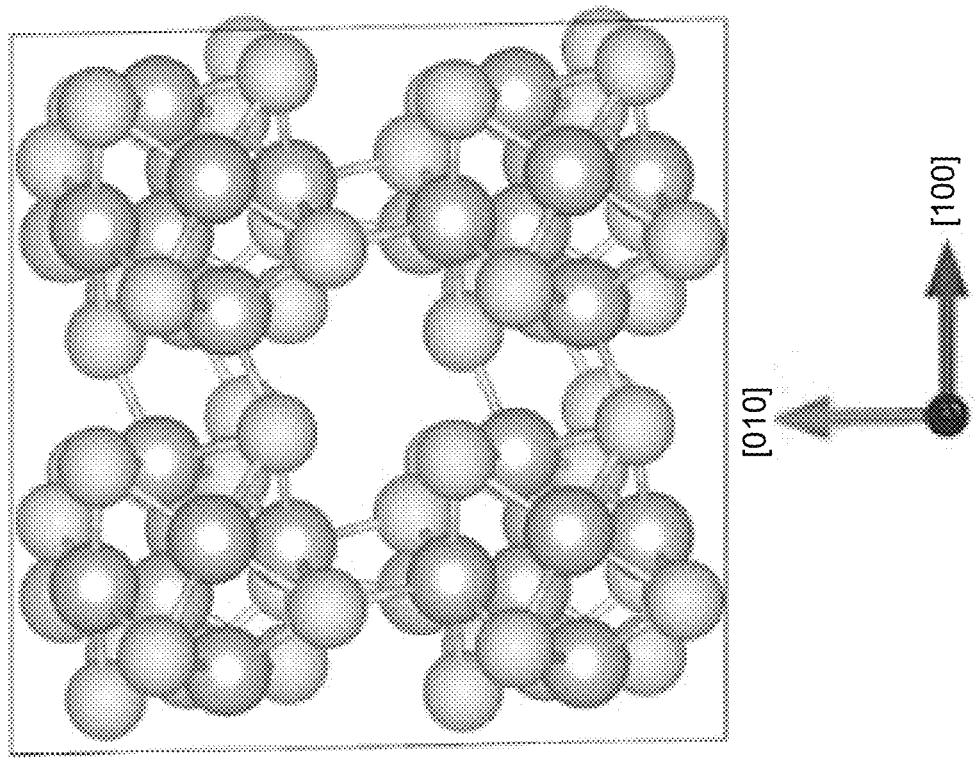
FIG. 15A shows the desired geometric configuration of pristine $Mo_6S_8$.
Figure 15D:
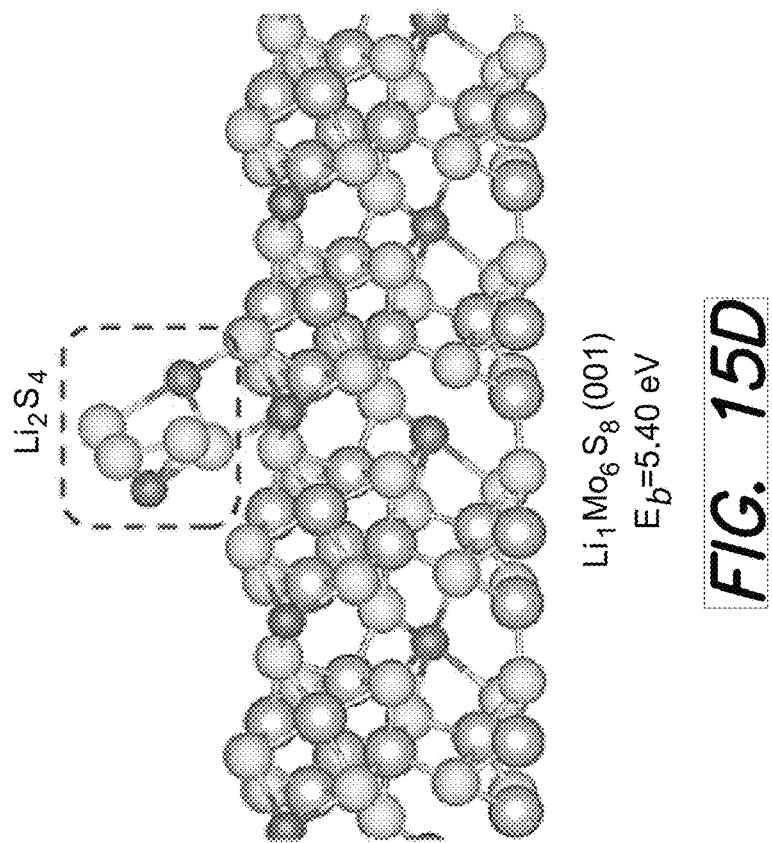
FIG. 15D shows the relaxed structure of Li2S4 (without ionization) absorbed upon $LiMo_6S_8$.
Figure 15C:
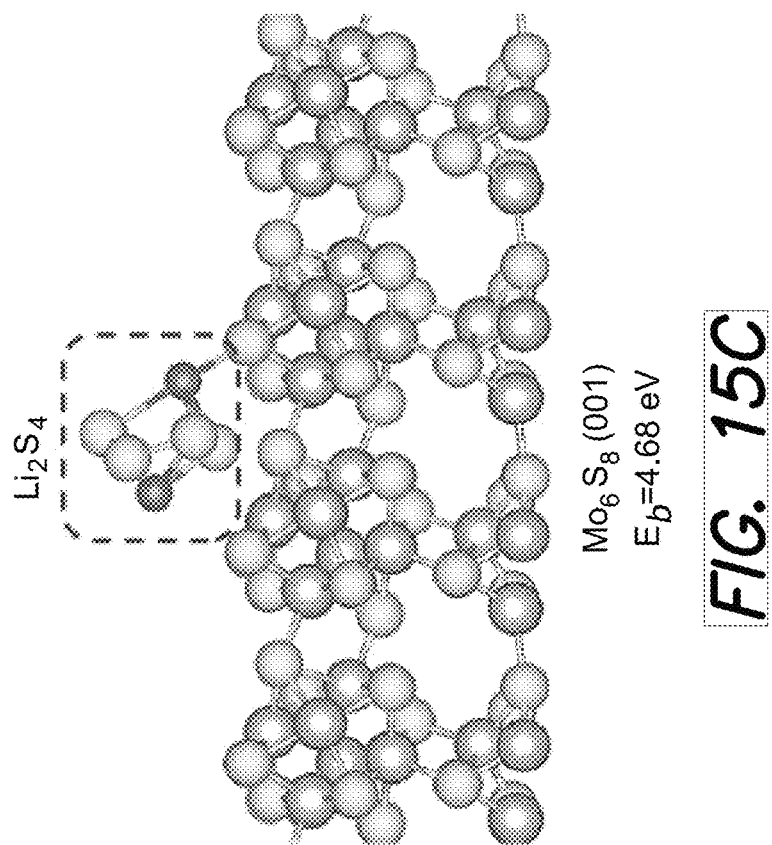
FIG. 15C shows the relaxed structure of Li2S4 (without ionization) absorbed upon (100) $Mo_6S_8$.

The $Mo_6S_8$ (001) surface has the lowest energy (24 meV·A$^{-2}$) and was determined as the most stable surface among the other low Miller index planes. A slab of 1.5 $Mo_6S_8$ atomic layers was constructed to model the $Mo_6S_8$ (001) surface and a vacuum spacing larger than 10 Å was placed on top of the slab to avoid interactions. The bottom half layer of the slab was frozen when determining the desired geometric configuration. FIGS. 15A and 15B show the resulting bulk unit cells have a lattice constant of 6.50 Å that matches the experimental value very well. FIGS. 15C and 15D show the enhanced geometric configuration of the pristine $Mo_6S_8$ and the Li-intercalated $Mo_6S_8$ ($LiMo_6S_8$). To simulate the $Li_1Mo_6S_8$ from the experiment, Li atoms are intercalated into the spacious sites surrounded by four $Mo_6S_8$ clusters, which is in agreement with typical metallic ion intercalation in Chevrel phase $Mo_6S_8$ determined by both experiment and computation.

The binding energy ($E_b$) is defined as the difference between the total energy of the $Li_2S_4$-adsorbed system ($E_{total}$) and the sum of the isolated $Li_2S_4$ energy and the clean $Mo_6S_8$ surface energy (with or without Li intercalation), $$E_b = E_{Li_2S_4} + E_{surface} - E_{total} \qquad (6)$$

where a larger $E_b$ value indicates greater adsorbing ability.

Figure 16B:
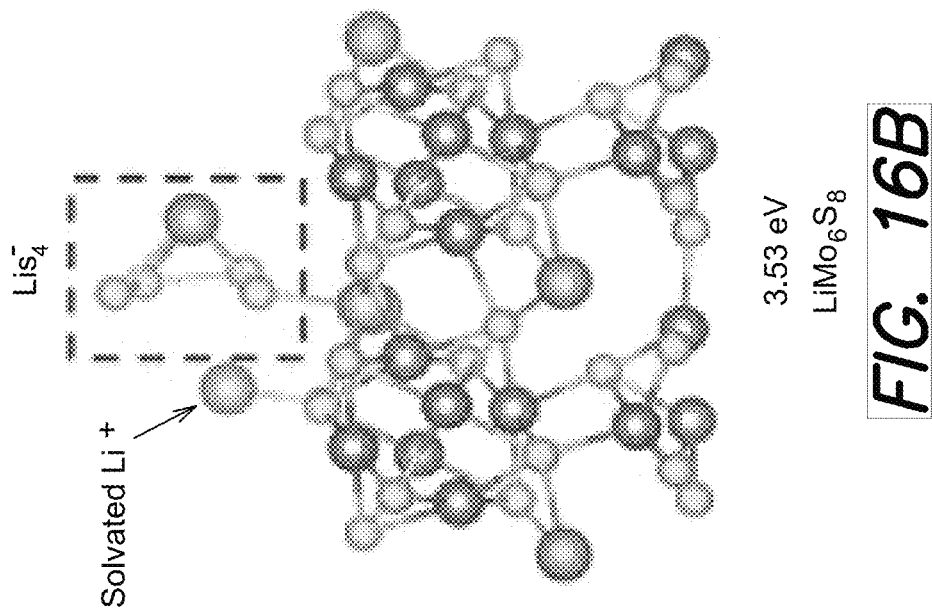
FIG. 16B shows a chemical model of the adsorption configuration for $LiS_4^-$ on $LiMo_6S_8$ (100). This model is used for a density functional theory (DFT) calculation of the adsorption.
Figure 16A:
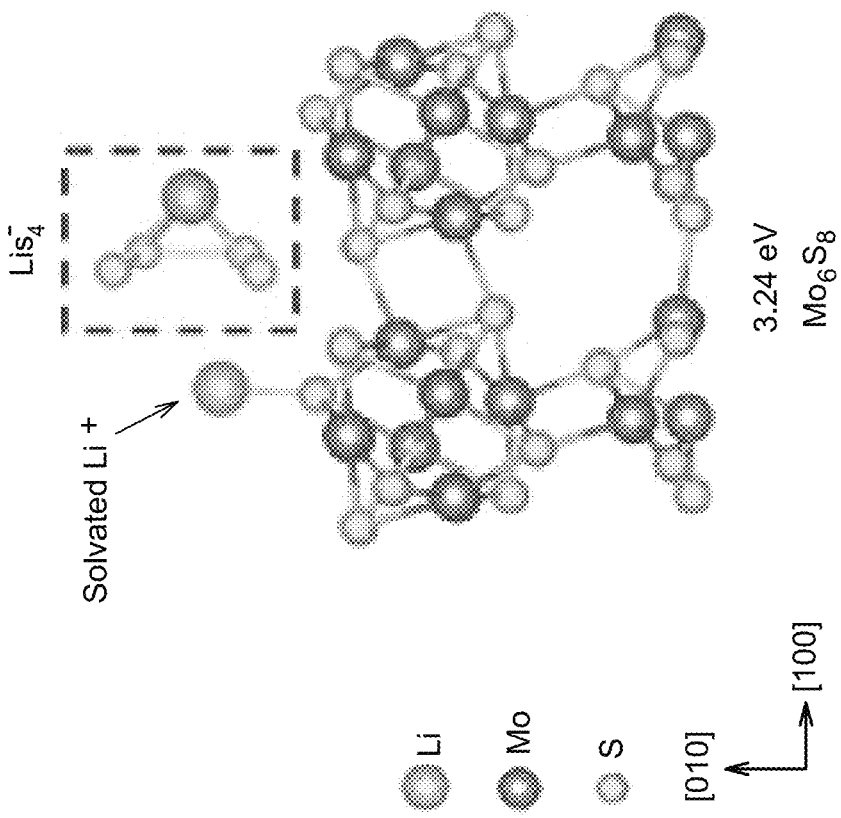
FIG. 16A shows a chemical model of the adsorption configuration for $LiS_4^-$ on $Mo_6S_8$ (100). This model is used for a density functional theory (DFT) calculation of the adsorption.
Figure 16E:
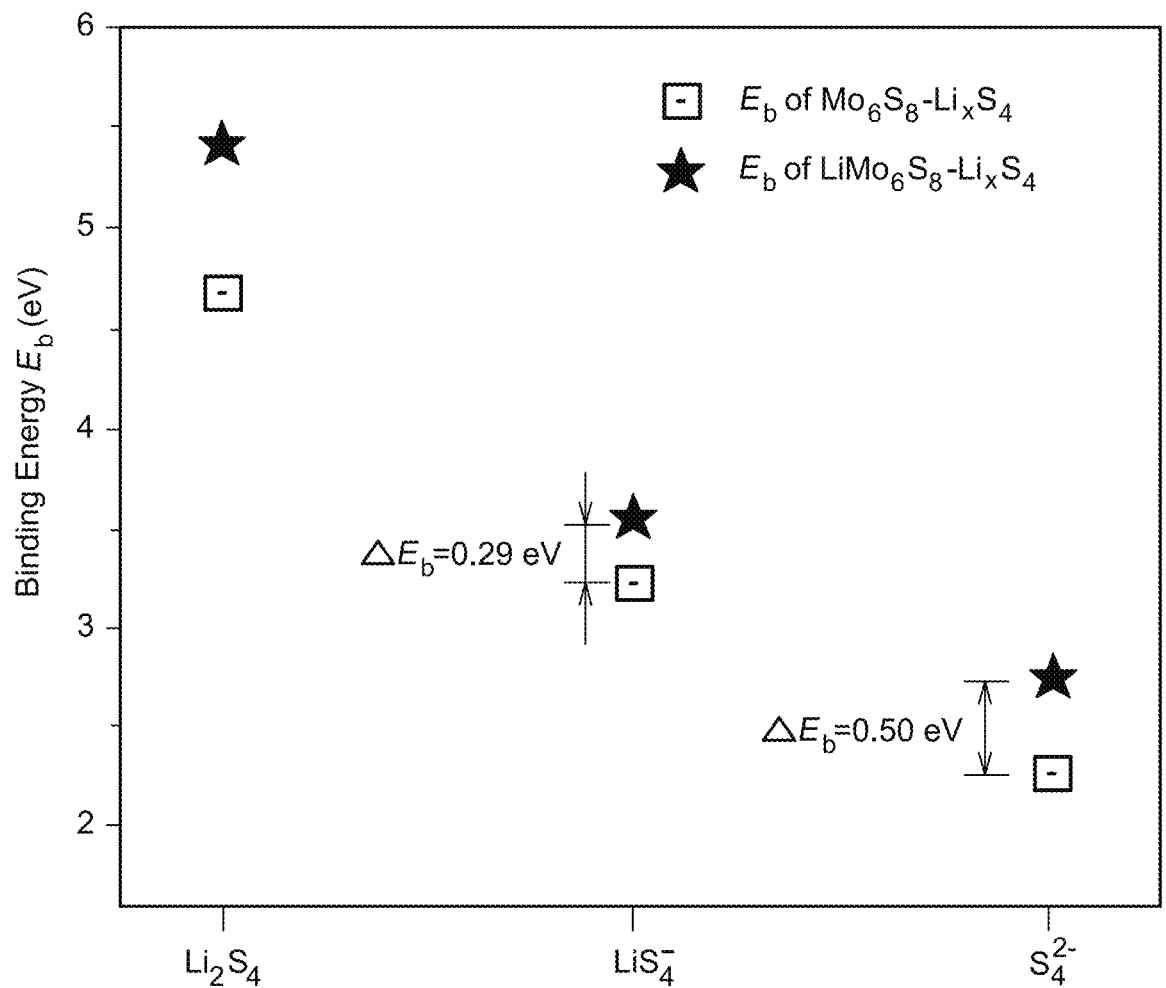
FIG. 16E shows the binding energies between lithium polysulfides (LIPS) and $Mo_6S_8/LiMo_6S_8$ before and after step-wise ionization.

FIGS. 16A-16D show the adsorption configurations for $LiS_4^-$ and $S_4^{2-}$ on $Mo_6S_8$ and $LiMo_6S_8$ surfaces, respectively. The adsorptive interaction is dominated by the bonding between Li and S. Therefore, during the step-wise ionization of $Li_2S_4$, the binding strength of $Li_2S_4$ with the substrate tends to drop with fewer Li atoms in $Li_2S_4$. However, compared to pristine $Mo_6S_8$, the $LiMo_6S_8$ with the additional bond demonstrates a better anchoring capability, which is reflected not only by the higher binding energy, but also in the smaller decrease in binding energy during the step-wise ionization as shown in FIG. 16E. In the ether-based electrolyte 3-dioxolane (DOL) and dimethoxyethane (DME) mixture, the interaction between the Li cation and the polysulfide anion weakens as the chain length of polysulfide increases. This results in the substrates having a weaker anchoring capability, especially for substrates reliant on mainly polar-polar Li—S interactions. The simulation results suggest the prelithiated substrate exhibits a stronger LiPS adsorption capability compared to the unlithiated substrate in the more realistic LiPS-electrolyte system due to additional Li—S binding.

Figure 17:
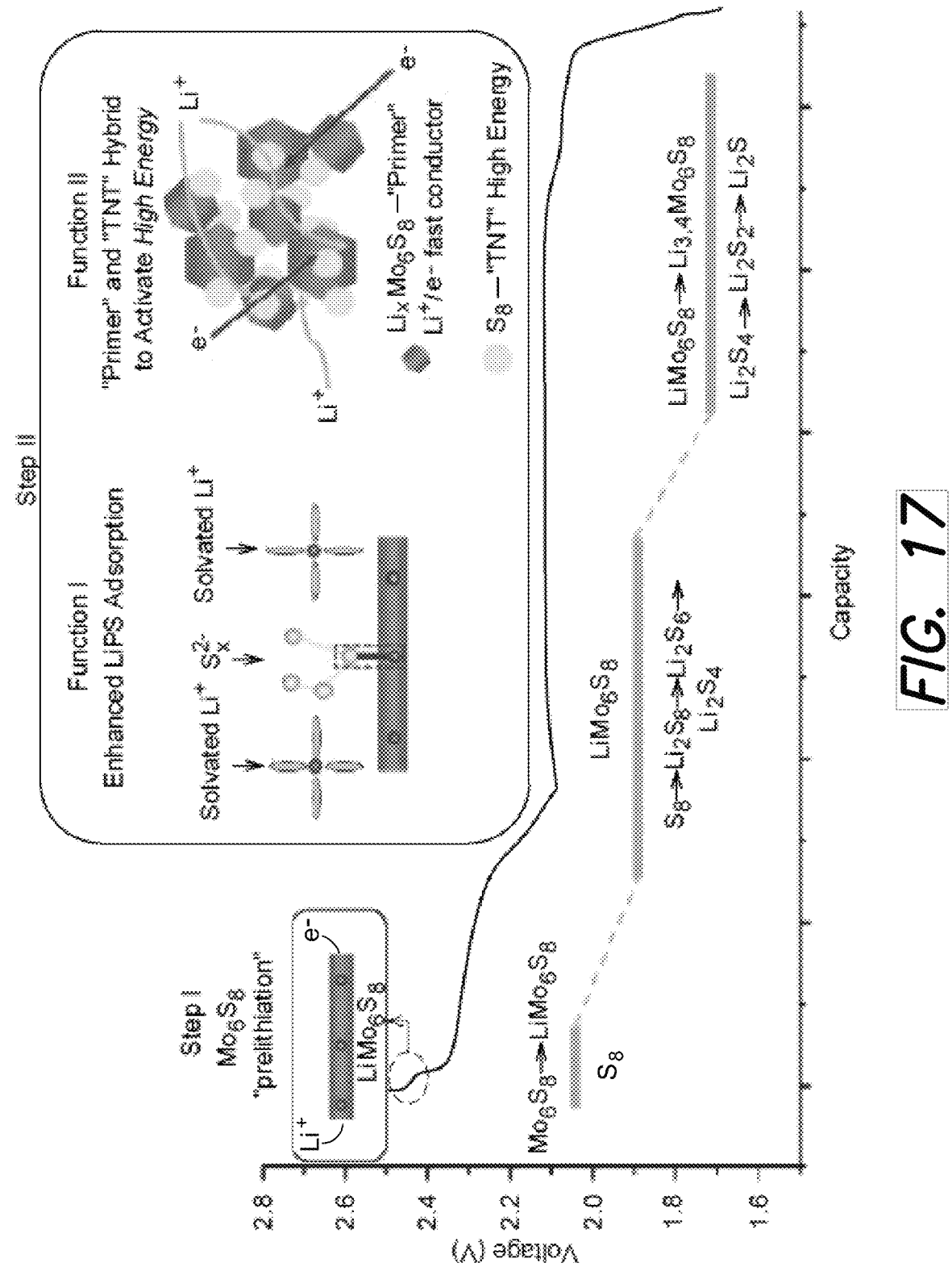
FIG. 17 shows a diagram illustrating the role of Chevrel-phase $Mo_6S_8$ in the HMSC.

FIG. 17 is used to illustrate a proposed two-step mechanism showing the important role of Chevrel-phase $Mo_6S_8$. Step I represents the pre-lithiation step at a voltage greater than 2.4 V. During this step, $Mo_6S_8$ is transformed to $Li_xMo_6S_8$ (x=1) prior to the reduction of sulfur. Step II represents the post-lithiation step where $Li_xMo_6S_8$ exhibits two unique functions: (I) the enhanced interaction between LiPS and $LiMo_6S_8/Li_3Mo_6S_8$ causes long-chain LiPS to form in the presence of $LiMo_6S_8$, which may contribute to the suppression of the shuttling effect and thus improve the cycling stability, (II) the topotactic/intercalative reaction in $Li_xMo_6S_8$ may provide a fast Li-ion transporting channel, which is used to "unlock" the high gravimetric capacity of $S_8$ by enabling higher proportion of the sulfur in the cathode material 112 to be utilized.

Electrochemical Performance of the Exemplary $Mo_6S_8/S_8$ Cathode

As described above, Li—S batteries may theoretically provide high energy densities greater than conventional LIB's. However, one of the challenges in designing a Li—S battery that exhibits high full-cell $E_g$ or $E_v$ is achieving a high $S_8$ mass loading and maintaining a sufficient rate capability while decreasing the E/AM ratio and cathode porosity. In order to raise $E_g$ to ~400 Wh·$kg^{-1}$ or higher, the E/AM ratio of the Li—S battery should preferably be below 3 µL·$mg^{-1}$ or even 1.9 µL·$mg^{-1}$. For reference, conventional LIB cathodes exhibit an E/AM ratio of ~0.3 µL·$mg^{-1}$. The cathode porosity of the Li—S battery should also be reduced in order to achieve a high $E_v$. However, reducing the E/AM ratio and the porosity may also have an impact on the reaction kinetics. For instance, a high E/AM ratio and cathode porosity are preferable for standard $C/S_8$ cathodes in order to provide sufficiently fast reaction kinetics.

In order to better understand the role of the E/AM ratio in determining the electrochemical performance, several exemplary electrodes 110 based on the HMSC material 112 and reference C/S cathodes were fabricated. A slurry coating method using a doctor blade was employed to prepare the electrodes. In the case of the exemplary electrodes 110, the slurry was fabricated by mixing 95 wt % of the HMSC and 2.5 wt % of styrene butadiene rubber (SBR) aqueous binder, and 2.5 wt % of carboxymethyl cellulose (CMC) binder. The obtained slurry was dried at 60° C. in a vacuum oven for 12 h and then doctor-blade coated onto a carbon-coated aluminum foil. Finally, the electrodes were rolled and cut into round disks.

Figure 18A:
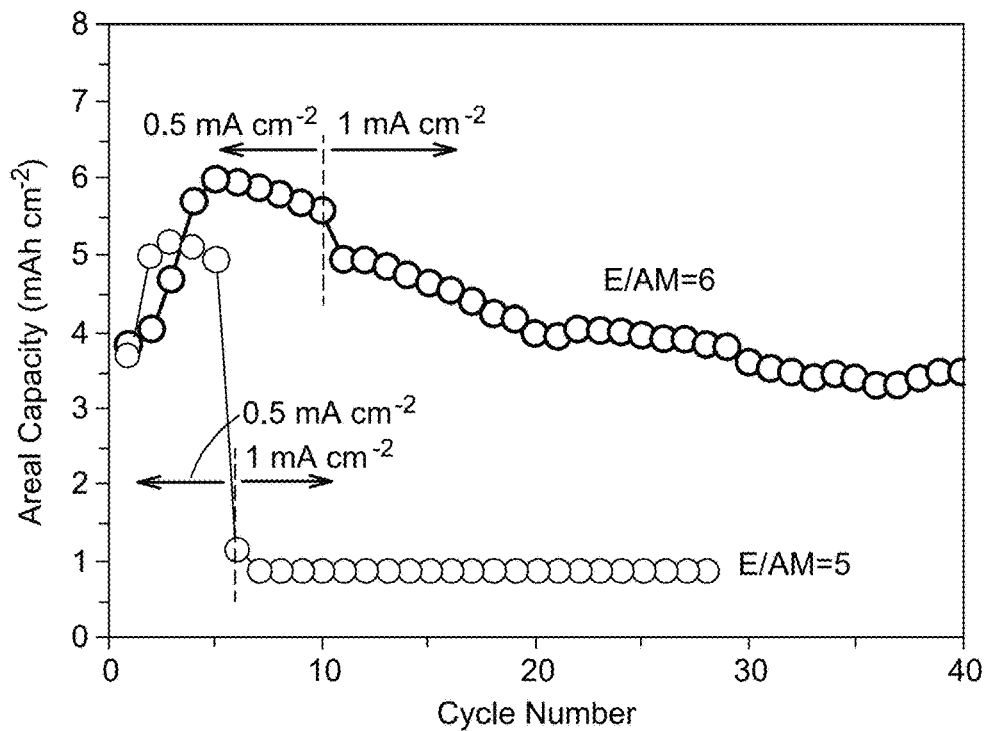
FIG. 18A shows the cycling performance of the C/S cathode (70 wt % S+20 wt % C+10 wt % binder, sulfur loading=5.8 mg cm$^{-2}$) at different E/AM ratios.

FIG. 18A shows a chart of the areal capacity as a function of cycle number for two E/AM ratios in a C/S electrode. At an E/AM=6 L·$mg^{-1}$, the areal capacity of the C/S cathode may reach about 5 mAh·$cm^{-2}$ @ 1 mA·$cm^{-2}$. The areal capacity decreases to less than 1 mAh·$cm^{-2}$ @1 mA·$cm^{-2}$ after the E/AM ratio decreases to 5 µL·$mg^{-1}$ due to the increased cell impedance.

Figure 18B:
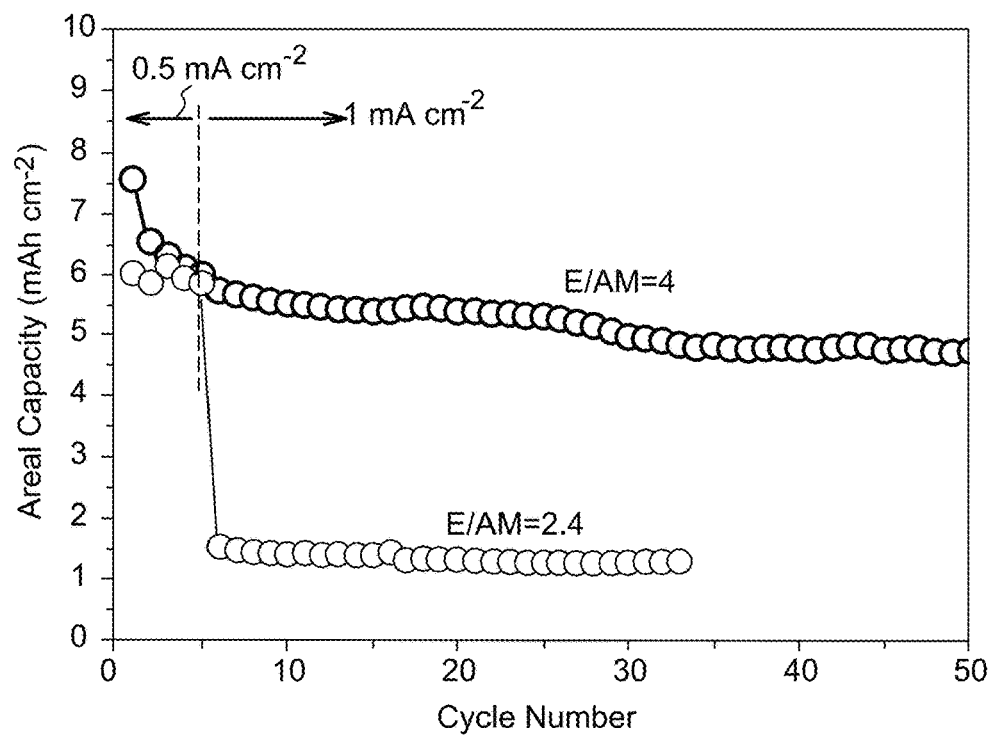
FIG. 18B shows the cycling performance of the C/S/$Mo_6S_8$ cathode (65 wt % S+20 wt % $Mo_6S_8$+10 wt % C+5 wt % binder, sulfur loading=6.0 mg cm$^{-2}$) at different E/AM ratios.
Figure 18C:
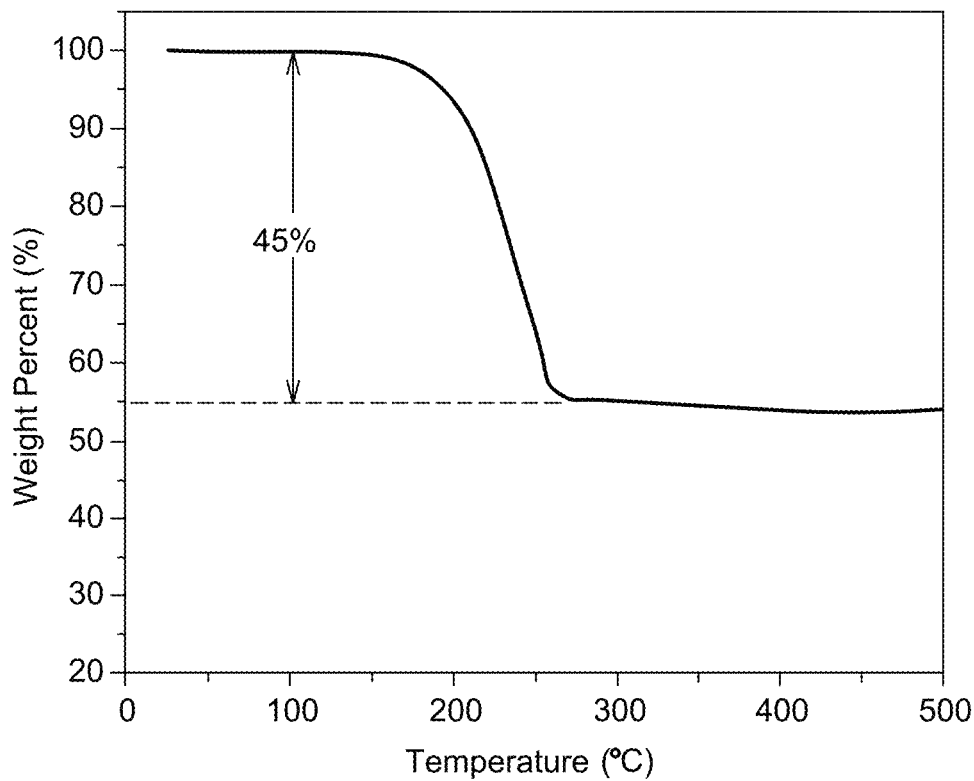
FIG. 18C shows thermogravimetric analysis (TGA) of the HMSC material from room temperature to 500° C. at a heating rate of 10° C./min under N2 atmosphere to determine the sulfur content.

The E/AM ratio of the HMSC material 112 may be reduced to 4 µL·$mg^{-1}$ by introducing only 20 wt % $Mo_6S_8$ into cathode. FIG. 18B shows another chart of the areal capacity as a function of the cycle number for an exemplary Li—S battery 100 with 20 wt % $Mo_6S_8$ in the cathode material 112. The E/AM ratio may be further reduced to 2.4 µL·$mg^{-1}$ using equal weight fraction of $Mo_6S_8$ and S with only ~10 wt % carbon in the hybrid cathode 110. FIG. 18C shows another chart of the areal capacity as a function of the cycle number for an exemplary Li—S battery 100 with equal weight fraction of $Mo_6S_8$ and S. As shown, the 45% sulfur content in the HMSC material 112 corresponds to 42.75% (i.e., 45%×0.95=42.75% with 95% HMSC and 5% binder) sulfur content in the HMSC material 112. The HMSC thus includes 42.25% $Mo_6S_8$, 42.75% S, 10% C and 5% binder. The sulfur content was determined by Thermogravimetric analyses (TG-DSC, SDT Q600) under Nitrogen protection.

The electrochemical performance of several exemplary Li—S batteries 100 were also characterized. The exemplary Li—S batteries 100 were assembled as CR2032 type coin cells with the HMSC cathode 110 and Li metal anode 120 in an Ar-filled glove box. The electrolyte was 0.6 M lithium bis (trifluoromethanesulfonyl) imide (LiTFSI) in a 1, 3-dioxolane (DOL) and DME mixture (1:1, v/v) with 0.4 M $LiNO_3$. E/AM ratio is calculated by the electrolyte volume over the active materials mass ($Mo_6S_8$ and S are both considered as active materials).

Figure 19A:
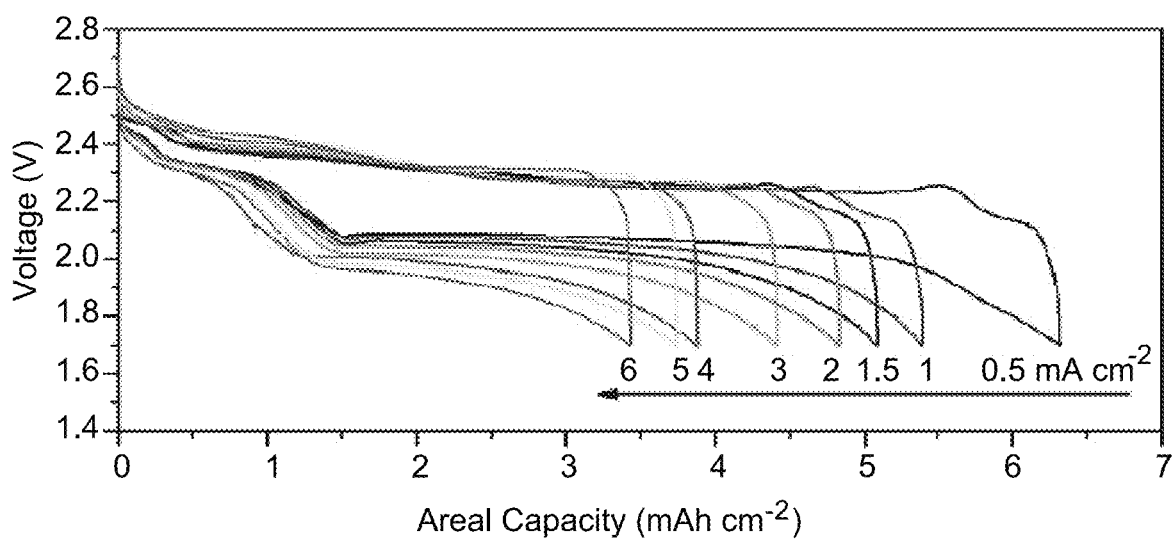
FIG. 19A shows the charge-discharge profiles at various current densities ranging from 0.5 mA·cm$^{-2}$ to 6 mA·cm$^{-2}$ for an exemplary Li/HMSC coin cell with 6.2 mg·cm$^{-2}$ S+6.1 mg·cm$^{-2}$ $Mo_6S_8$ and an electrolyte-to-active material (E/AM) ratio=2.4 μL·mg$^{-1}$.

FIG. 19A shows several voltage profiles measured at various current densities for an exemplary Li—S battery 100 configured as a coin cell with 6.2 mg·$cm^{-2}$ S+6.1 mg·$cm^{-2}$ $Mo_6S_8$ and an E/AM ratio=2.4 µL·$mg^{-1}$. As shown, the voltage profiles exhibit long and flat discharge plateaus at ~2.1 V and a low overpotential even at high current densities, indicating good electronic/ionic conductivities in the HMSC material 112. In addition, the charge-discharge plateaus from $Mo_6S_8 \leftrightarrow Li_1Mo_6S_8$ at ~2.4 V are also be observed, further verifying that $Mo_6S_8$ indeed works with $S_8$ as a secondary active material by contributing an extra ~10% capacity.

Figure 19B:
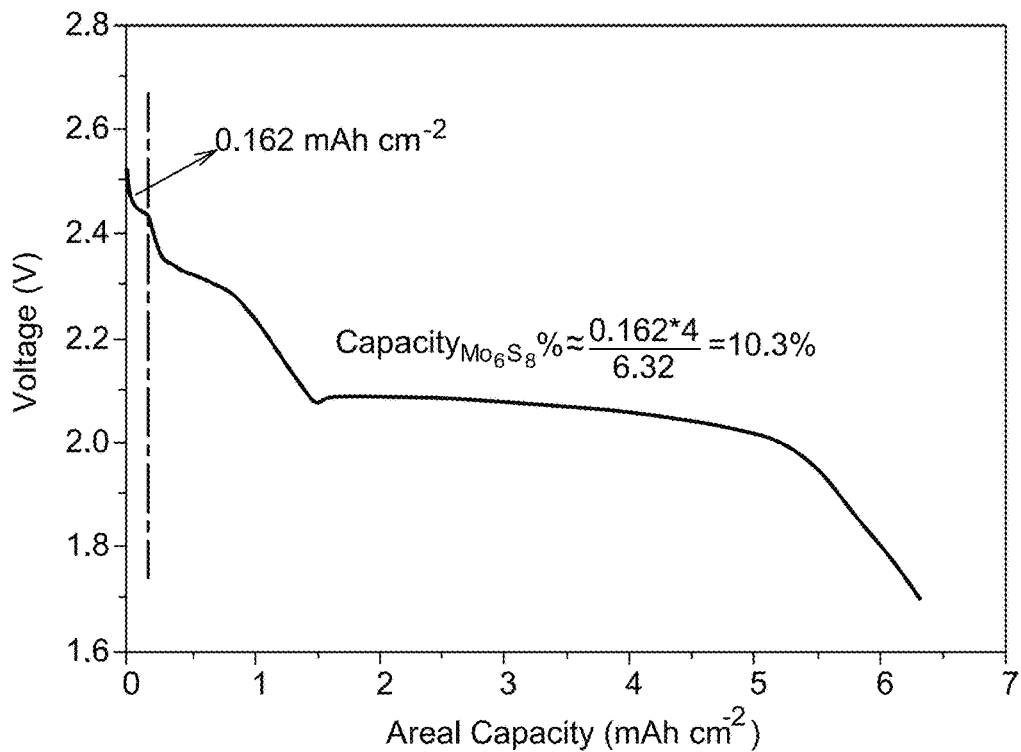
FIG. 19B shows an estimate of the capacity contribution from $Mo_6S_8$.

The exact contribution of $Mo_6S_8$ to the capacity of the exemplary Li—S battery 100 is difficult to separate from the $S_8$ contribution since the $2^{nd}$ and $3^{rd}$ discharging plateaus of $Mo_6S_8$ are merged with those of $S_8$. However, the contribution of $Mo_6S_8$ to the capacity may be conservatively estimated based on the $1^{st}$ discharging plateau. As described above, the stoichiometry of Li insertion into $Mo_6S_8$ involves three stages within the operating voltage window of Li—S batteries from 1.7 V to 2.8 V as described by Eqs. (1), (2), and (3). The capacity contribution of $Mo_6S_8$ may thus be estimated to be ~4 times the capacity contributed by the $1^{st}$ discharging plateau. FIG. 19B shows the areal capacity from the $1^{st}$ plateau is ~0.162 mAh·$cm^{-2}$. The capacity contribution from $Mo_6S_8$ may thus be estimated as follows, $$Capacity_{Mo6S8}\% \approx \frac{0.162 \text{ mAh cm}^{-2} * 4}{6.32 \text{ mAh cm}^{-2}} = 10.3\% \quad (7)$$

Figure 19C:
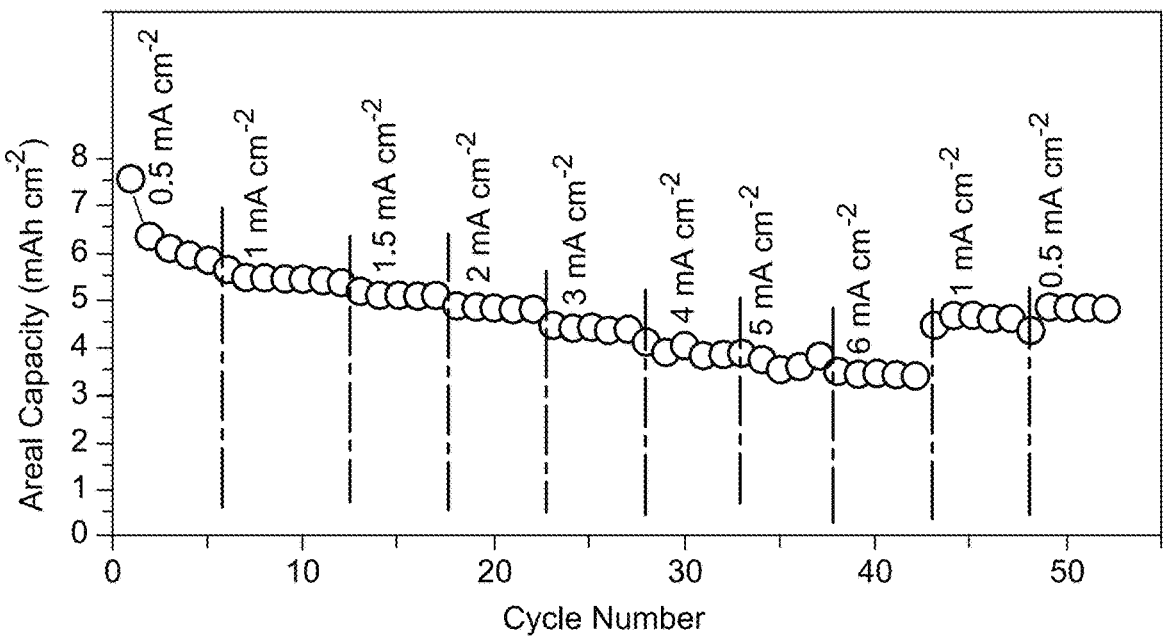
FIG. 19C shows the rate capability as a function of the cycle number at various current densities ranging from 0.5 mA cm$^{-2}$ to 6 mA cm$^{-2}$ for the exemplary Li/HMSC coin cell of FIG. 19A.
Figure 19D:
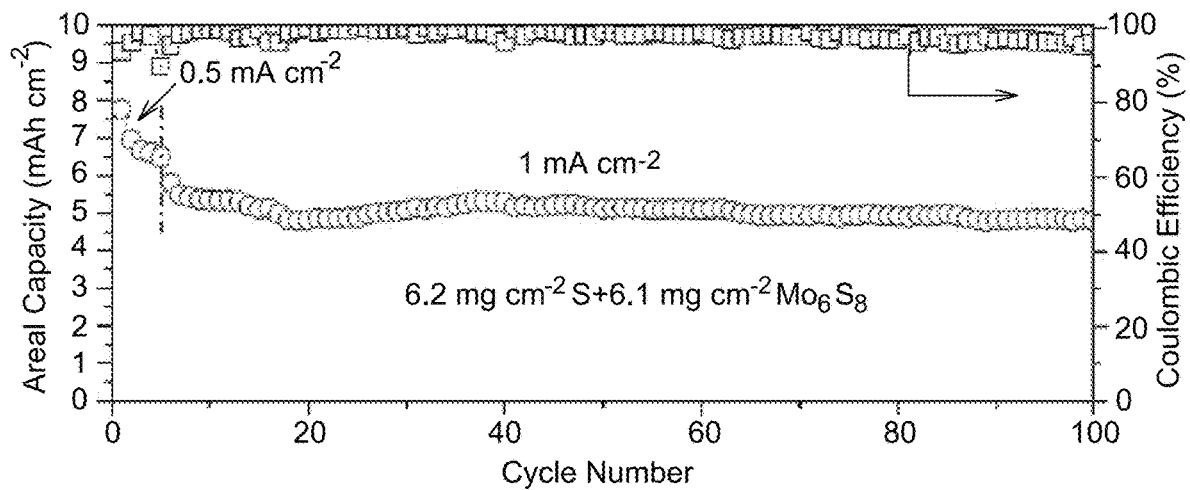
FIG. 19D shows the cycling life and coulombic efficiency at 1 mA cm$^{-2}$ with 5 formation cycles at 0.5 mA·cm$^{-2}$ or the exemplary Li/HMSC coin cell of FIG. 19A.
Figure 20:
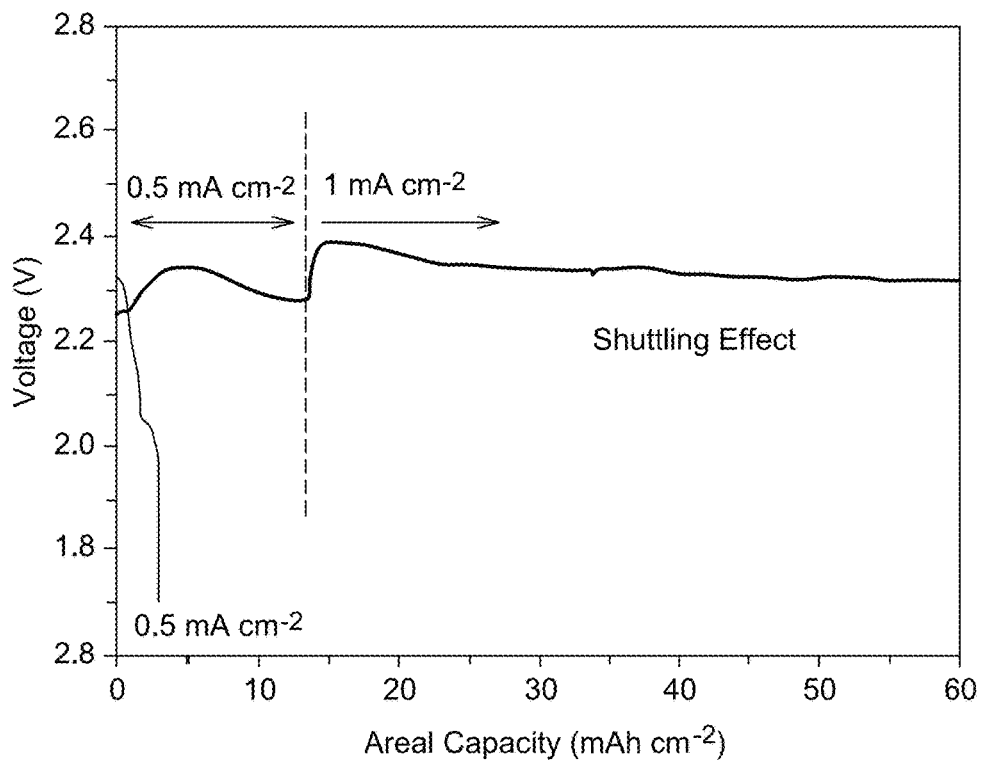
FIG. 20 shows the shuttling effect of the C/S cathode without $Mo_6S_8$ (85 wt % S+10 wt % C+5 wt % binder, sulfur loading=6.5 mg cm$^{-2}$, E/AM ratio=2.4 μL mg$^{-1}$).

The hybrid cathode 110 with the HMSC material 112 disclosed herein exhibits excellent rate capability. As shown in FIG. 19C, the exemplary battery 100 is able to achieve 7.5 mAh·$cm^{-2}$, 4.9 mAh·$cm^{-2}$, 4.0 mAh·$cm^{-2}$, and 3.5 mAh·$cm^{-2}$ at current densities of 0.5 mA·$cm^{-2}$, 2 mA·$cm^{-2}$, 4 mA·$cm^{-2}$, and 6 mA·$cm^{-2}$, respectively. FIG. 19D shows the long-term cycling performance of the exemplary battery 100. As shown, the battery 100 exhibits an initial capacity of 7.8 mAh·$cm^{-2}$ followed by a capacity retention of 83% over 100 cycles at 1 mA·$cm^{-2}$. The observed stability in the cycling of the battery 100 may be attributed to the favorable LiPS adsorption capability of $Li_xMo_6S_8$. In contrast, FIG. 20 shows a conventional C/S cathode without $Mo_6S_8$ exhibits severe shuttling behavior. Compared to the conventional C/S cathode, the HMSC material 112 with high mass loading of active material and a low E/AM ratio exhibits a substantially greater rate capability and cycling stability.

Figure 21A:
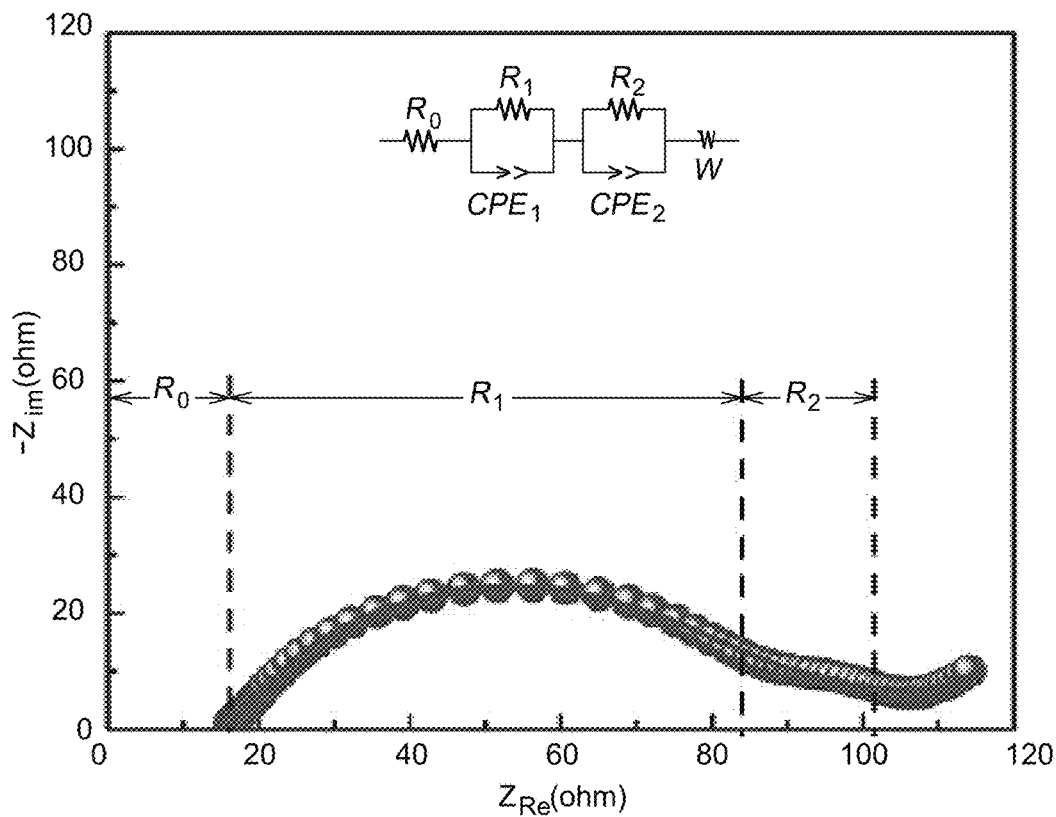
FIG. 21A shows electrochemical impedance spectroscopy (EIS) data conducted on an exemplary Li/HMSC cell before cycling.
Figure 21B:
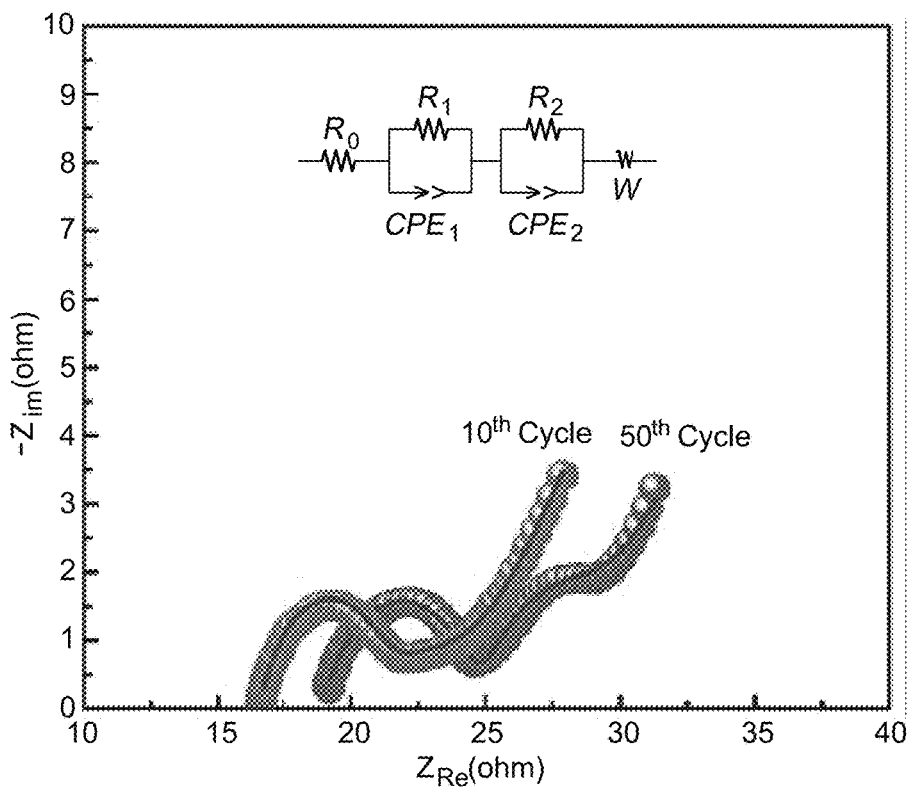
FIG. 21B shows EIS data conducted on the exemplary Li/HMSC cell after 10 and 50 cycles.
Figure 21C:
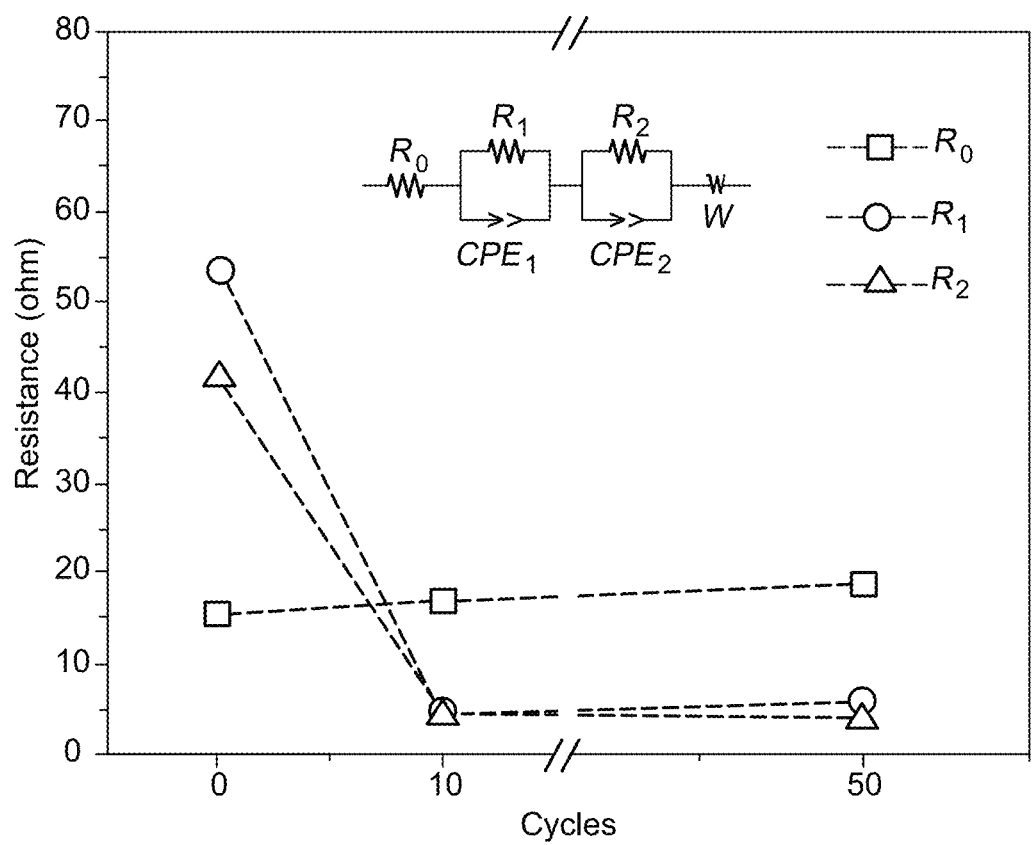
FIG. 21C shows a chart of the fitting parameters of the EIS plots of FIGS. 21A and 21B before cycling and after cycling for 10 and 50 cycles.

FIGS. 21A and 21B shows electrochemical impedance spectroscopy (EIS) data collected on an exemplary hybrid cathode 110 before and after cycling, respectively. The equivalent electrical circuit $R_0$ corresponds to the Ohmic resistance from the electrolyte solution. $R_1/CPE_1$ from the first semi-circle in the high-frequency range is assigned to the resistance of the surface layers on both the cathode 110 and anode 120. $R_2/CPE_2$ from the second semi-circle in the low-frequency range is attributed to the charge transfer process occurring at the interface between the cathode 110 and the electrolyte. FIG. 21C shows the fitting parameters used in the EIS plots of FIGS. 21A and 21B. As shown, $R_0$, $R_1$ and $R_2$ remain low and stable, indicating a favorable and well-maintained conducting network during cycling.

Figure 21D:
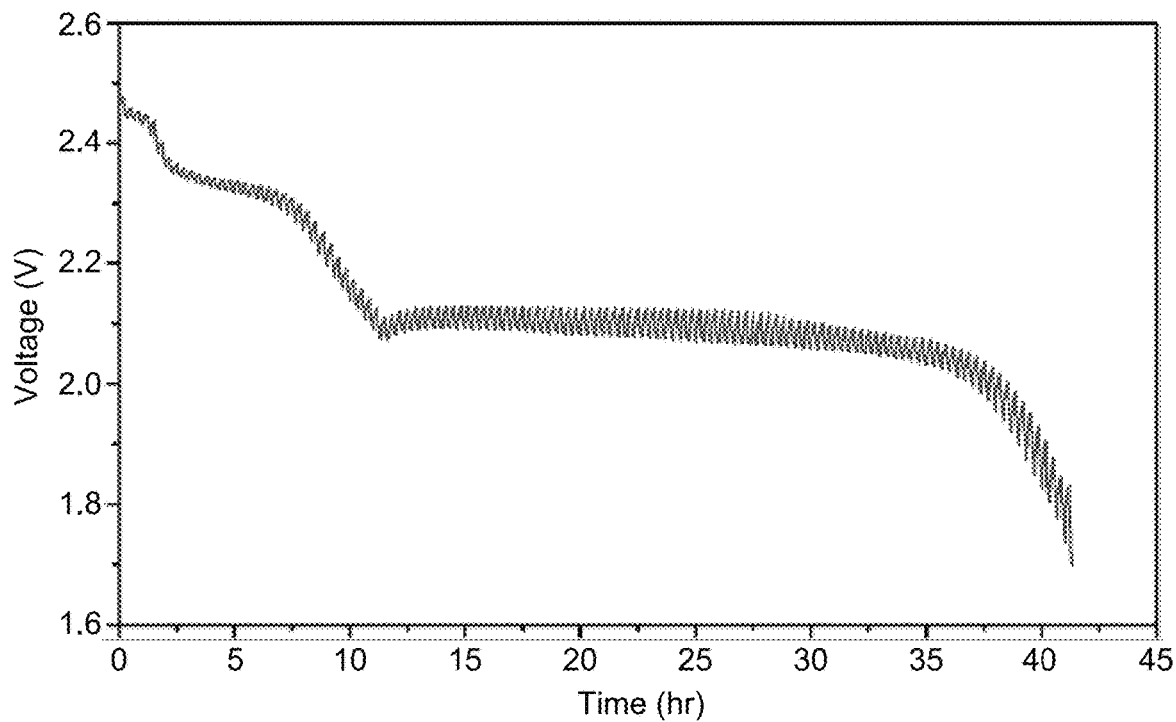
FIG. 21D shows a galvanostatic intermittent titration technique (GITT) curve as a function of time with a discharging current density of 0.25 mA cm$^{-2}$ using the cell after cycling for 100 cycles.
Figure 21E:
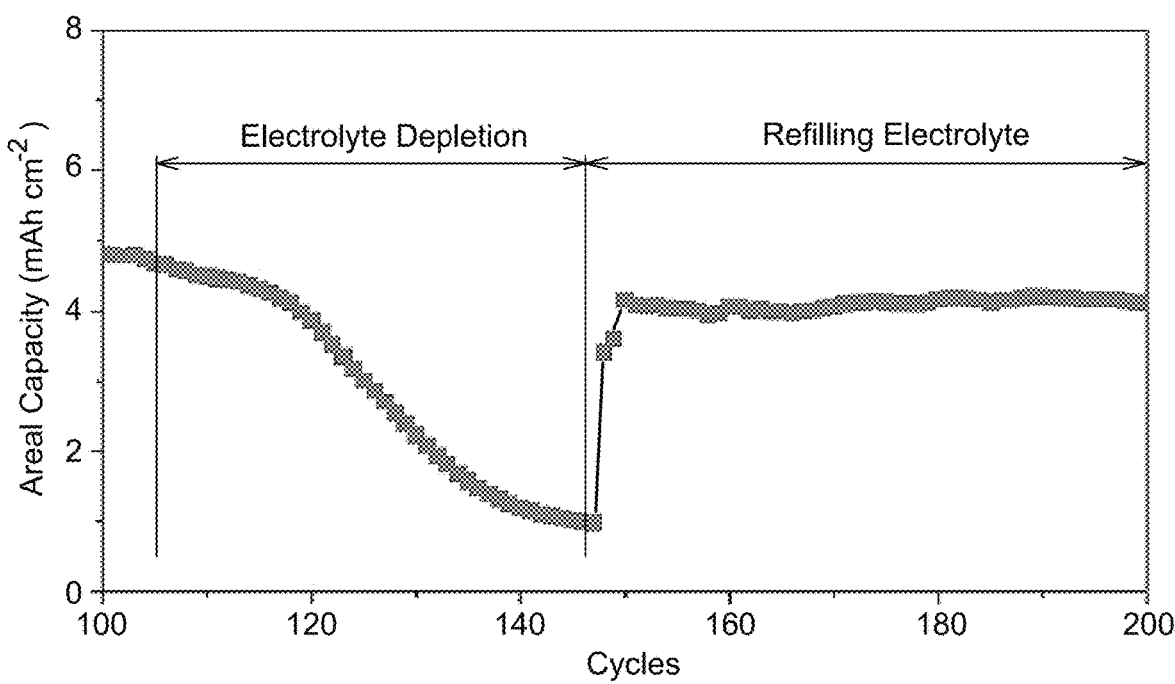
FIG. 21E shows the cycling performance after 100 cycles followed by a refill of electrolyte for the exemplary Li/HMSC coin cell of FIG. 19D.

FIG. 21D shows a chart of the voltage recorded as a function of time for an exemplary Li—S battery 100 using a galvanostatic intermittent titration technique (GITT). The GITT technique is used to evaluate the state of health of the Li/HMSC battery 100 after 100 cycles. Within the voltage range between 2.1 V and 2.5 V, small variations in the voltage are observed upon removal of the current, which indicates relatively fast kinetics. Within the lower voltage range between 1.7 V and 2.1 V, both the quasi-equilibrium potential and the discharge plateau remain stable and flat, implying a good state of health even after 100 cycles. These results are encouraging especially since the life cycle of the Li/HMSC battery 100 is not only dependent on the cathode 110, but also the anode 120, which depletes the electrolyte, especially under such lean electrolyte conditions as shown in FIG. 21E.

In order to compare the full-cell energy densities of the exemplary Li—S battery 100 with the HMSC material 112 to previous demonstrations of Li—S batteries, a simplified pouch cell model was used to evaluate the coin cell data previously described. The model included a 2× excess Li metal anode, a cathode, electrolyte, an Al current collector, and a separator. FIG. 22A shows a table of the material densities of each constituent component in the model. The calculation of $E_g$ was performed using the following, $$E_g = \frac{V \cdot C}{\sum m_i} \quad (8)$$

where $E_g$ is the gravimetric energy density (Wh·kg⁻¹), V is the average cell voltage (V), which is assumed to be 2.1 V for Li—S batteries, C is the areal capacity (mAh·cm⁻²), and $m_i$ is the mass per unit square of various cell components (mg·cm⁻²) including the cathode, the anode (200% excess of Li for the calculations), current collectors, separator, electrolyte ($\rho \approx 1.2$ g·cm³). The calculation of $E_v$ was performed using the following, $$E_v = \frac{V \cdot C}{\sum T_i} \quad (9)$$

where $E_v$ is the volumetric energy density (Wh·L⁻¹), V is the average cell voltage (V). 2.1 V is assumed for Li—S batteries, C is the areal capacity (mAh·cm⁻²), and Ti is the thickness of various cell components (cm) including the cathode, the anode (200% excess of Li for the calculations), the current collectors, and the separator (15 µm). The electrolyte volume was not taken into account as the electrolyte is assumed to be confined in the pores.

In order to theoretically predict the relationship between the energy densities and the cathode porosity (see FIGS. 1A and 1B), the electrolyte is assumed to fill the pores in the cathode material 112, thus the amount of electrolyte is correlated to porosity. The cathode material 112 is assumed to include pure S, $Mo_6S_8$/S (3:7 and 5:5 by weight), or C/S (3:7 and 5:5 by weight) without any additives. The theoretical energy densities of sulfur (1672 mAh·g⁻¹×2.1 V=3511 Wh·kg⁻¹) and $Mo_6S_8$ (128 mAh·g⁻¹×2.1 V=269 Wh·kg⁻¹) are used for the calculation under the assumption that there is a (g) of solid in the cathode material 112 and the cathode porosity is x %. m, V and ρ are the mass, volume and density of the materials, respectively, which appear as subscripts. FIG. 22B shows estimates of the solid volume for pure sulfur, $Mo_6S_8$/S, and C/S compositions. The electrolyte mass may be calculated as follows, $$m_{electrolyte} = V_{porosity} \cdot \rho_{electrolyte} \quad (10)$$
$$= V_{solid} \cdot \frac{x \, \%}{1 - x \, \%} \cdot \rho_{electrolyte}$$
$$= \sum \frac{m_{solid}}{\rho_{solid}} \cdot \frac{x \, \%}{1 - x \, \%} \cdot \rho_{electrolyte}$$

FIG. 22C shows the estimates of the total energy delivered by the electrochemically-active materials in FIG. 22B, which were calculated as follows, $$E = \Sigma m_{active} \cdot E_{active} \quad (11)$$

The gravimetric energy density Eg (Wh·kg⁻¹) of the cathode and the electrolyte can be calculated as follows, $$E_g = \frac{E}{m_{solid} + m_{electrolyte}} \quad (12)$$
$$= \frac{E}{a + m_{electrolyte}}$$

The volumetric energy density $E_v$ (Wh·L⁻¹) of the cathode and the electrolyte can be calculated as follows, $$E_v = \frac{E}{V_{solid}/(1 - x \, \%)} \quad (13)$$

Figure 23A:
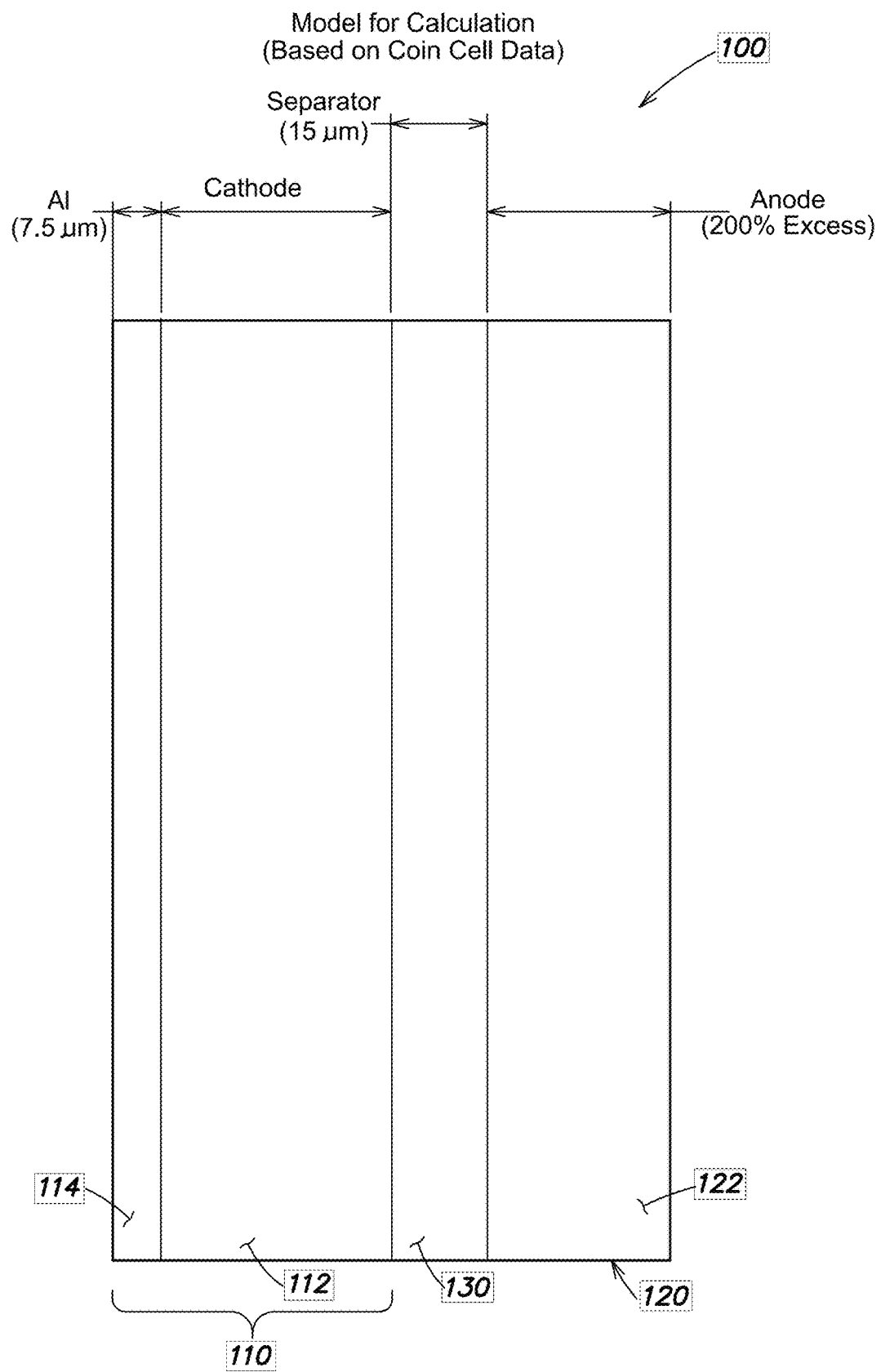
FIG. 23A shows a simplified configuration of a Li/HMSC pouch cell used for theoretical estimates of the gravimetric and volumetric energy densities.
Figure 23B:
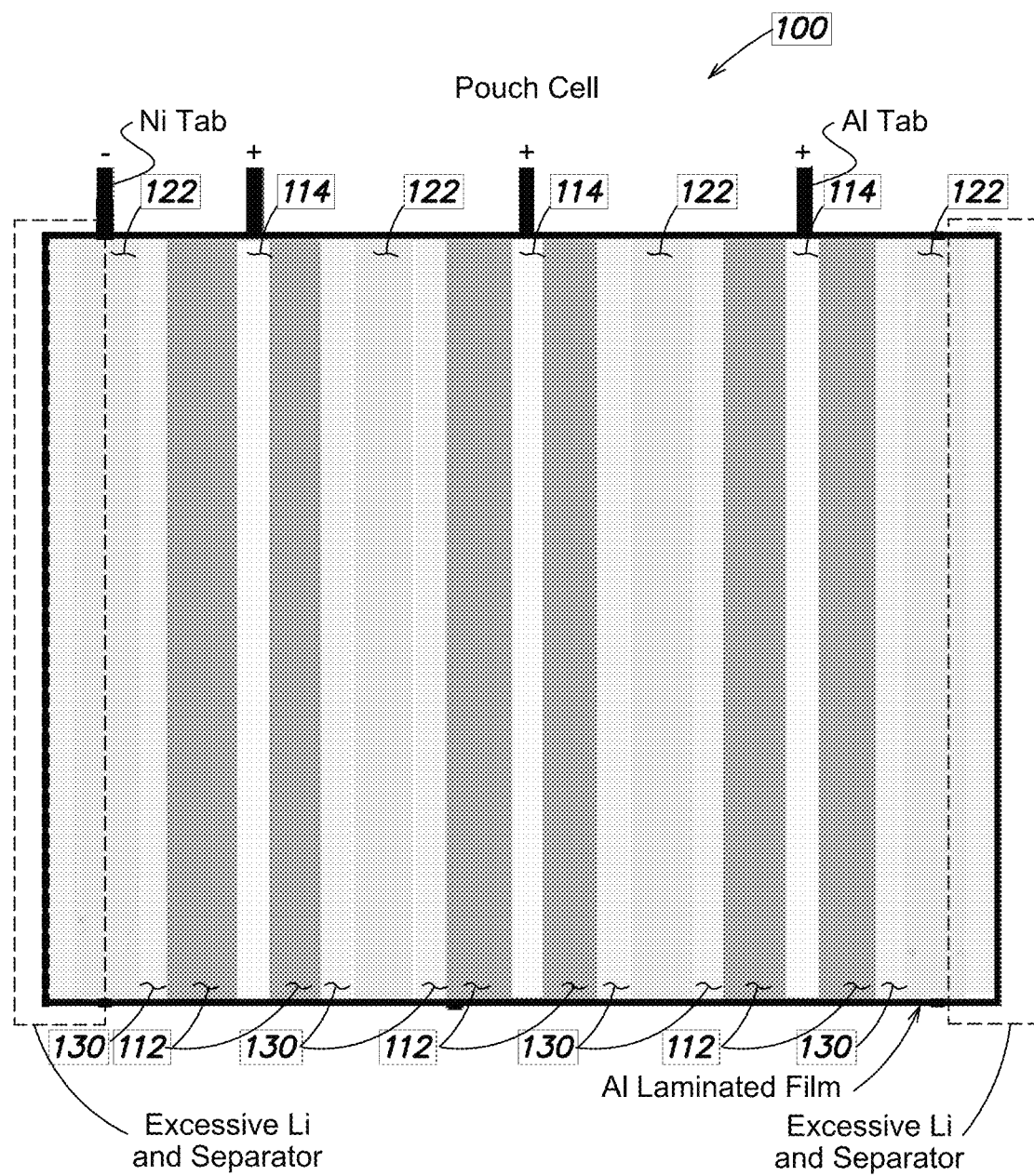
FIG. 23B shows a schematic of an exemplary configuration of a fabricated Li/HMSC pouch cell.

The slight difference between the energy densities estimated in the theoretical model and the actual pouch cell are mainly due to difficulties in maintaining the high quality of the HMSC material 112 when transferring to mass production. Furthermore, there are more components in the real pouch cell (see FIG. 23B) than the model (see FIG. 23A). For example, the separator/anode/cathode ratio is 3:3:3 and 8:4:3 in the model and pouch cell, respectively. The thickness of the separator is 15 µm in model, but 25 µm in the pouch cell.

Figure 24A:
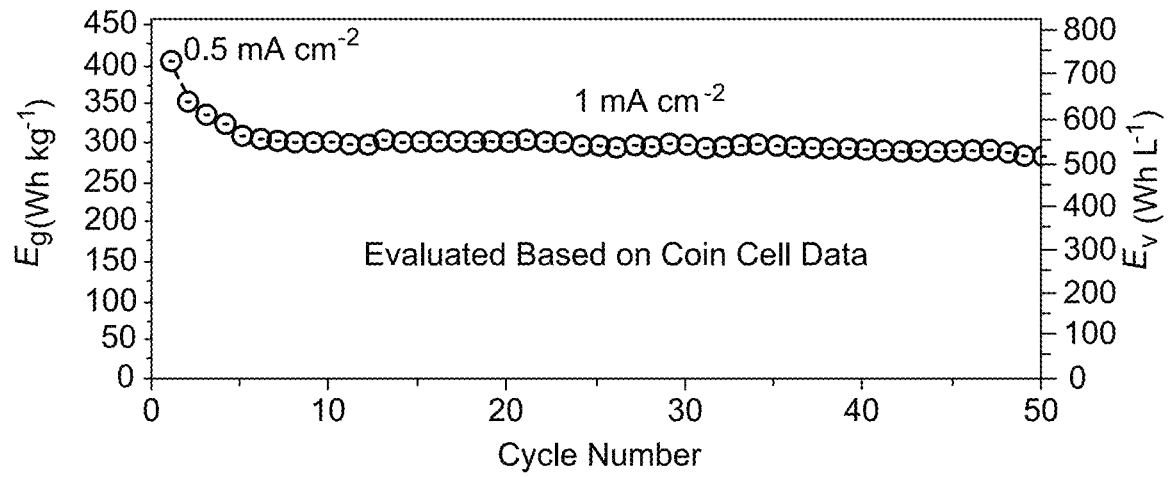
FIG. 24A shows empirical measurements of $E_g$ and $E_v$ as a function of the cycle number for an exemplary Li/HMSC coin cell constructed using the HMSC cathode (6.9 mg cm$^{-2}$ S+6.8 mg cm$^{-2}$ $Mo_6S_8$) with an E/AM ratio ~1.5 μL mg$^{-1}$.
Figure 24B:
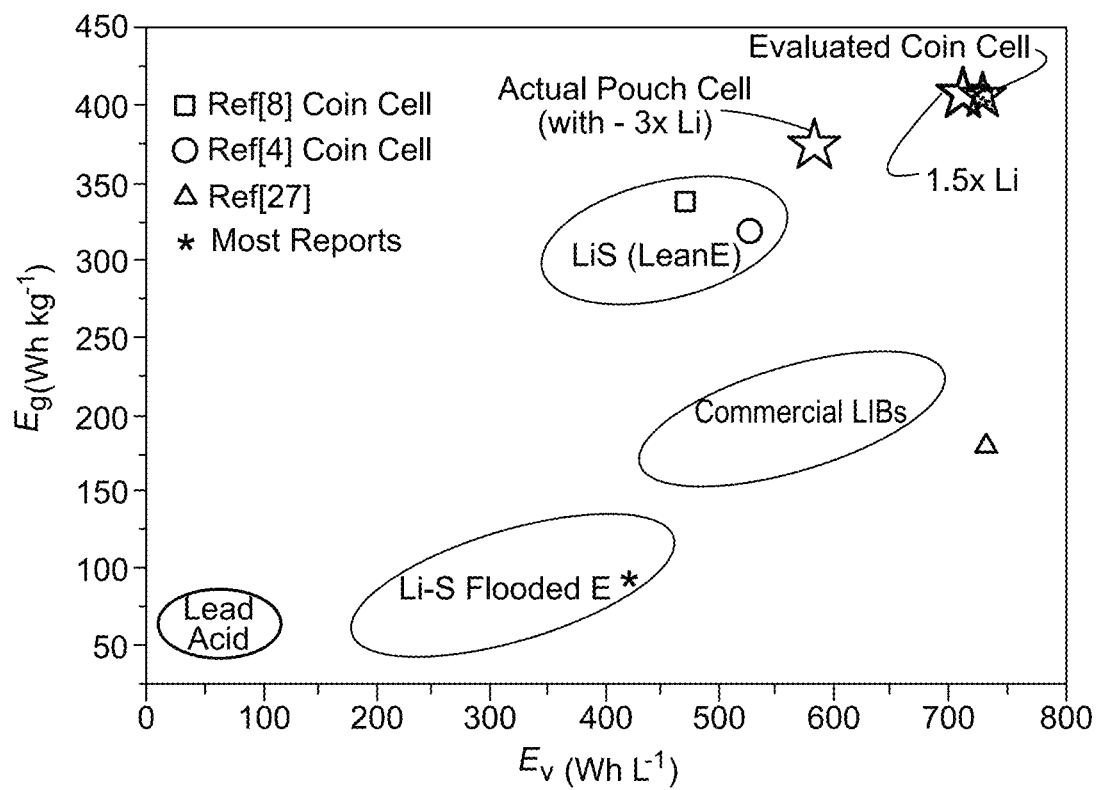
FIG. 24B shows a chart comparing the full-cell energy densities of the exemplary Li/HMSC coin cell of FIG. 24A and the exemplary Li/HMSC pouch cell of FIG. 26A to conventional battery technologies.

FIG. 24A show measurements of $E_g$ and $E_v$, respectively, as a function of the cycle number for an exemplary Li/HMSC coin cell 100 constructed using the HMSC material 112 (6.9 mg cm⁻² S+6.8 mg·cm⁻² $Mo_6S_8$) with an E/AM ratio ~1.5 µL·mg⁻¹. For the E/AM ratio of 1.5 µL mg⁻¹, lithium metal was immersed into electrolyte for 12 hr to form passivation SEI layer before use. As shown, the Li/HMSC cell 100 exhibits a high joint $E_g$ and $E_v$ of 402 Wh·kg⁻¹ and 731 Wh·L⁻¹ at 0.5 mA cm⁻² and good cycling stability. The $E_g$ is much higher than commercial LIBs and the $E_v$ is comparable to commercial LIBs. FIG. 24B shows the full-cell joint $E_g$-$E_v$ of the exemplary Li—S battery 100 in FIG. 24A is higher than previously demonstrated Li—S batteries.

Figure 25A:
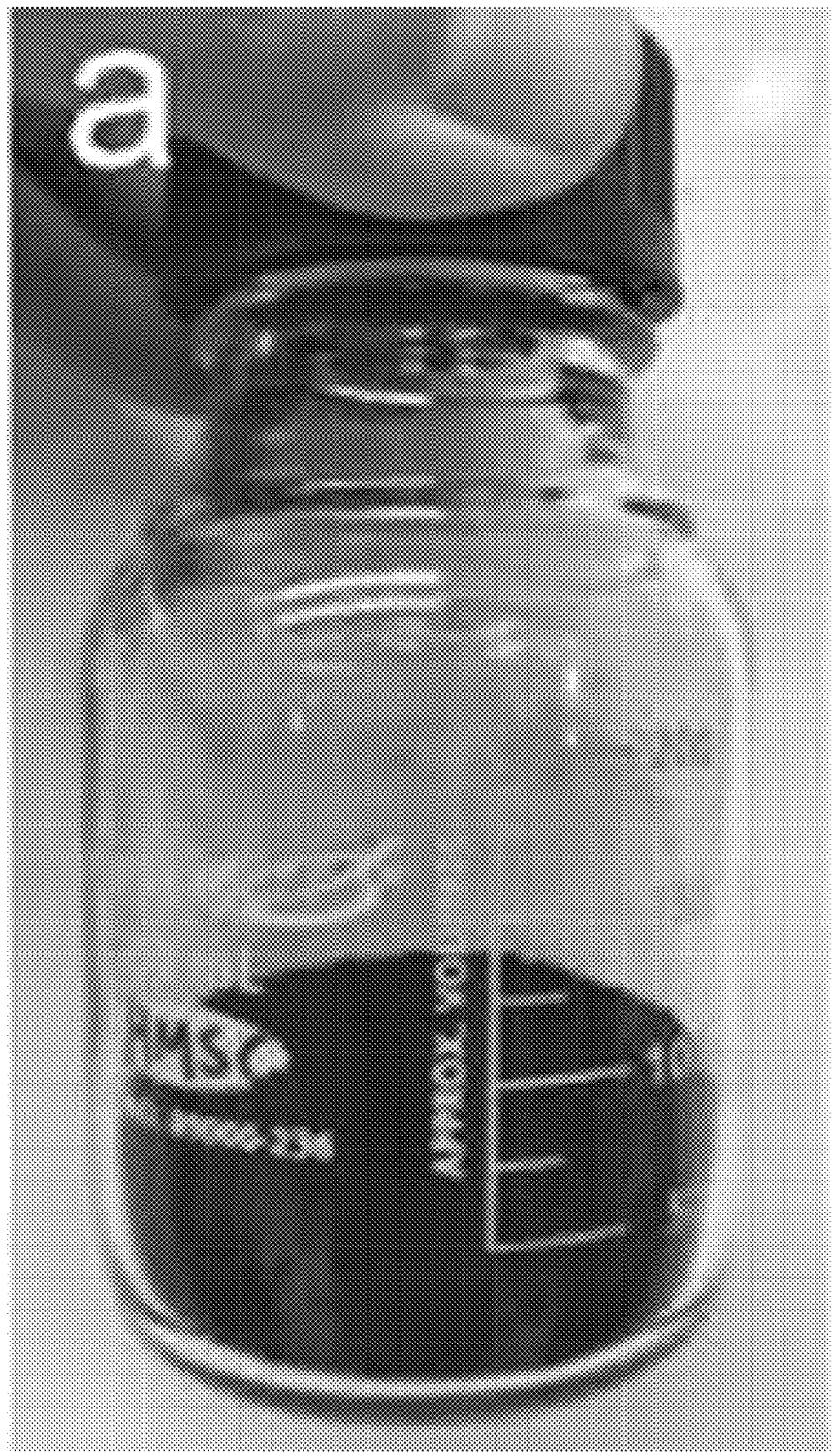
FIG. 25A shows an image of the HMSC powder.
Figure 25B:
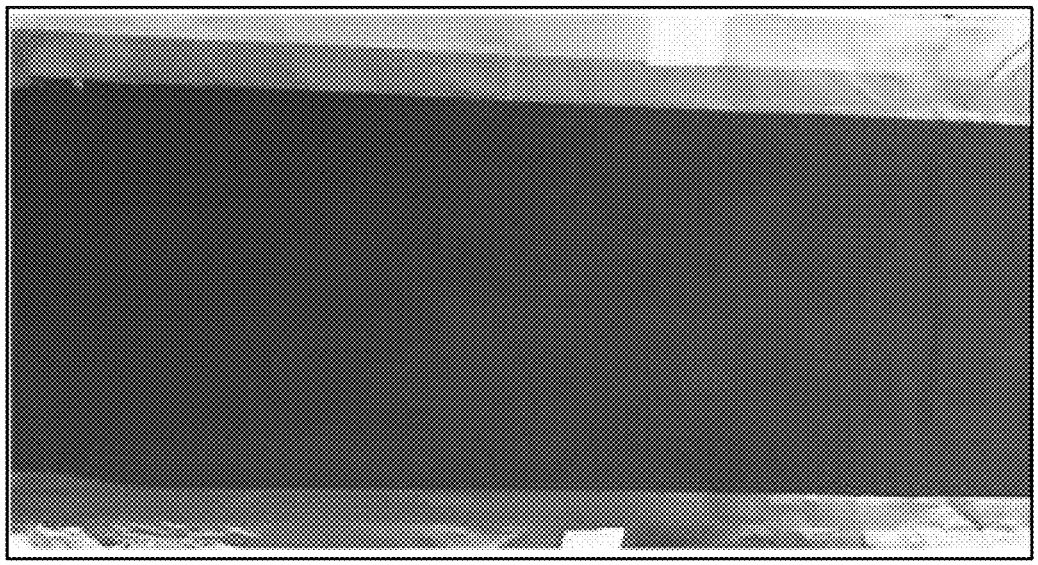
FIG. 25B shows an image of the HMSC electrode after being coated on both sides with the HMSC slurry made from the powder in FIG. 25A and dried.
Figure 25C:
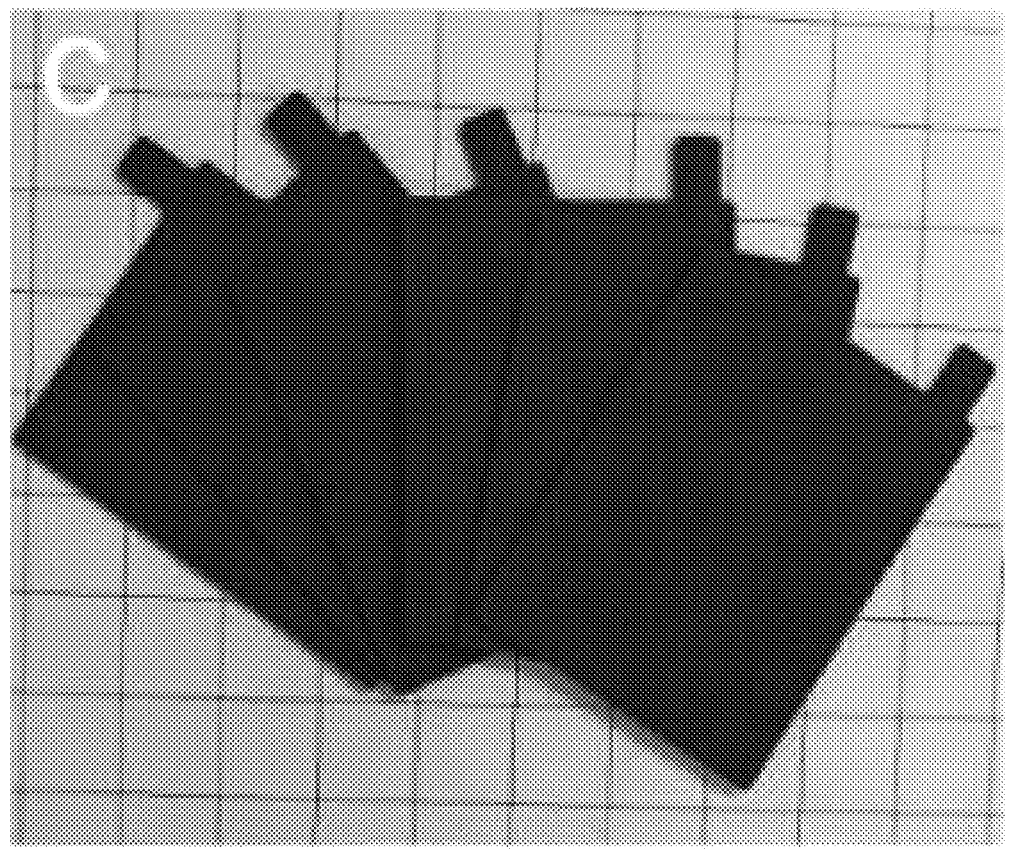
FIG. 25C shows an image of several HMSC electrodes of FIG. 25B after being cut by a gas driven die cutter.
Figure 25D:
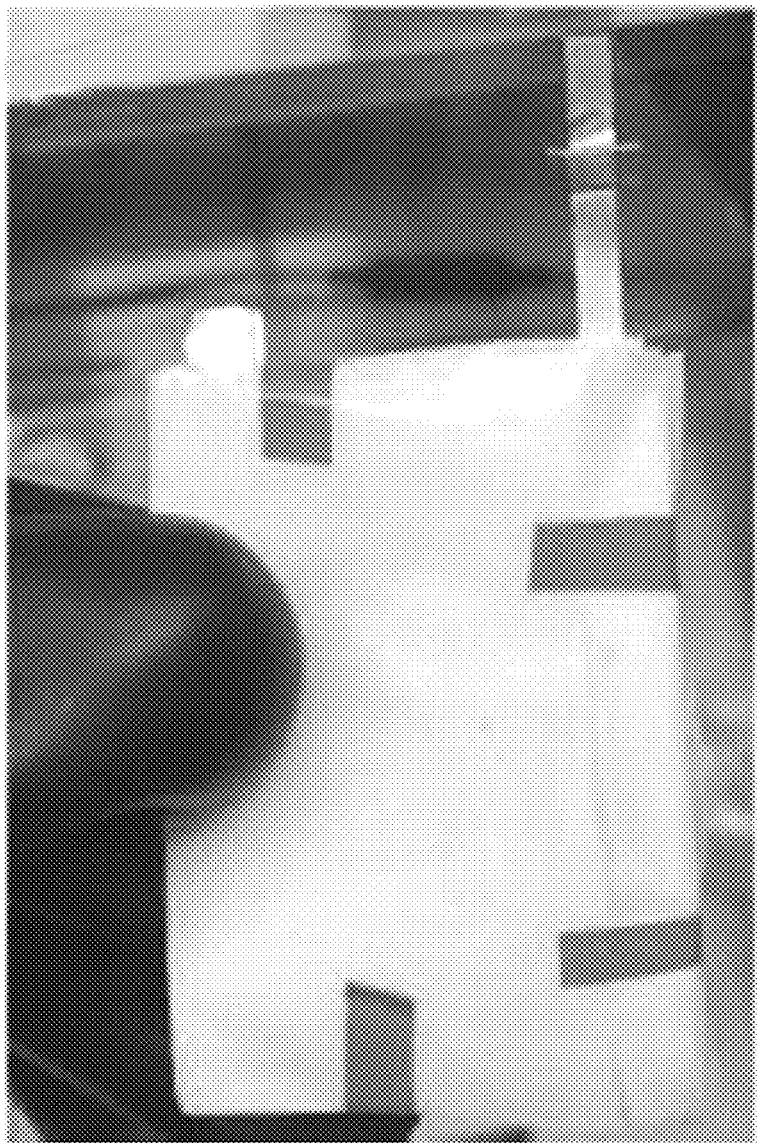
FIG. 25D shows an image of the jellyroll cell after stacking multiple layers of cathodes and anodes.
Figure 25E:
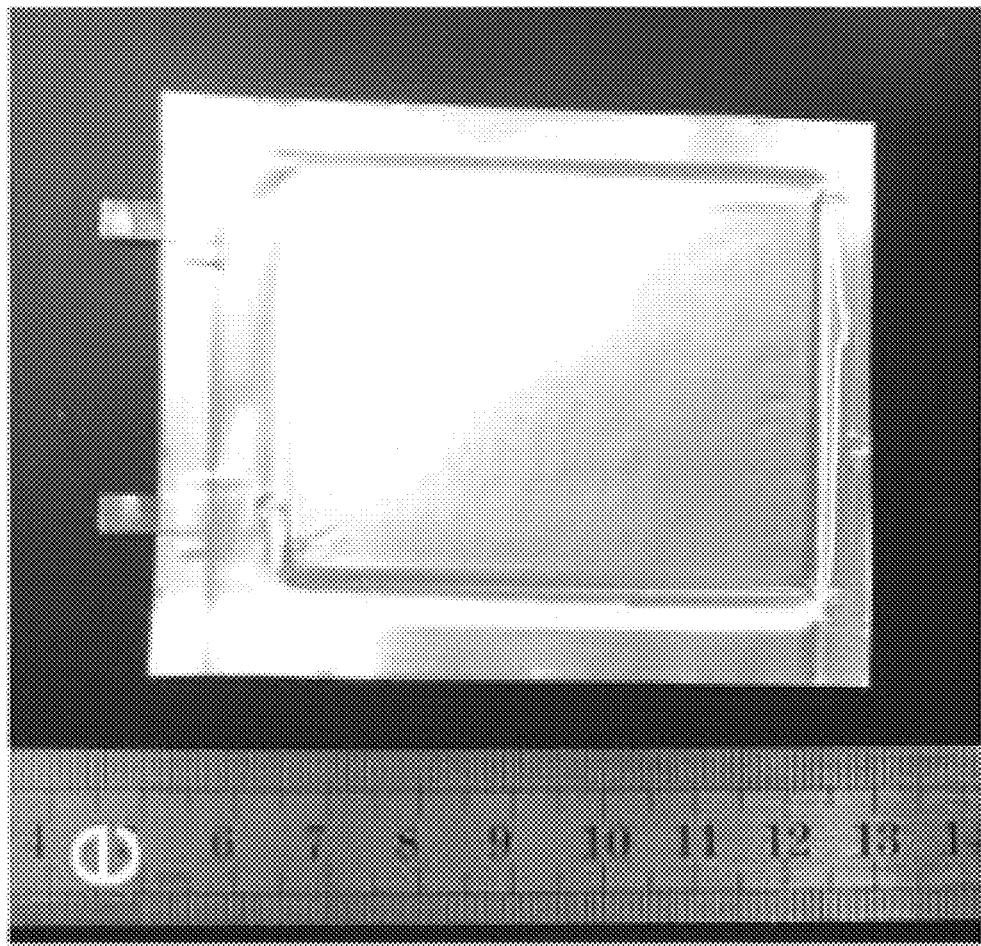
FIG. 25E shows an image of the Li/HMSC pouch cell after injecting electrolyte and vacuum-sealing.

As an exemplary demonstration of the practical applicability of the Li—S battery 100 with the HMSC material 112, an Ah-level pouch cell with multiple layers of HMSC material 112 and 2× excess Li was assembled. First, a well-mixed HMSC slurry (see FIG. 25A) was used to double-side coat a carbon-coated Al foil and then dried at 60° C. for 4 hr (see FIG. 25B). Second, 4.3×5.6 cm$^2$ electrodes were cut by a gas driven die cutter (MTI Corporation, USA) and the electrode materials were carefully removed from tab areas to expose the Al foil (see FIG. 25C). The assembly process of an exemplary pouch cell was performed as follows: (1) the Ni tab was pressed to attach with the Li foil and then covered with 25 μm-thick Celgard separator, (2) the cathode and anode were carefully stacked layer-by-layer by hand to make a jellyroll cell (see FIG. 25D), (3) the Al tab was welded together with the cathodes, and (4) the jellyroll cell was vacuum-sealed by Al laminated film after injecting electrolyte (see FIG. 25E).

The cycling performance of the pouch cells were measured by galvanostatic charge and discharge within the voltage window of 1.7 V-2.8 V versus Li/Li$^+$ at various current densities using a Landt CT 2001A battery cycler. Cyclic voltammetry (CV) and electrochemical impedance spectroscopy (EIS) measurements were performed using an electrochemical workstation (Gamry Instruments, Reference 3000). GITT was conducted on the cycled batteries which were subjected to current pulse intervals with a current density of 0.25 mA cm$^{-2}$ for 10 minutes, followed by 10-minute rests until complete discharge. The estimation of the jellyroll energy densities based on coin cell data is shown in Eqs. ( ) and ( ).

Figure 26A:
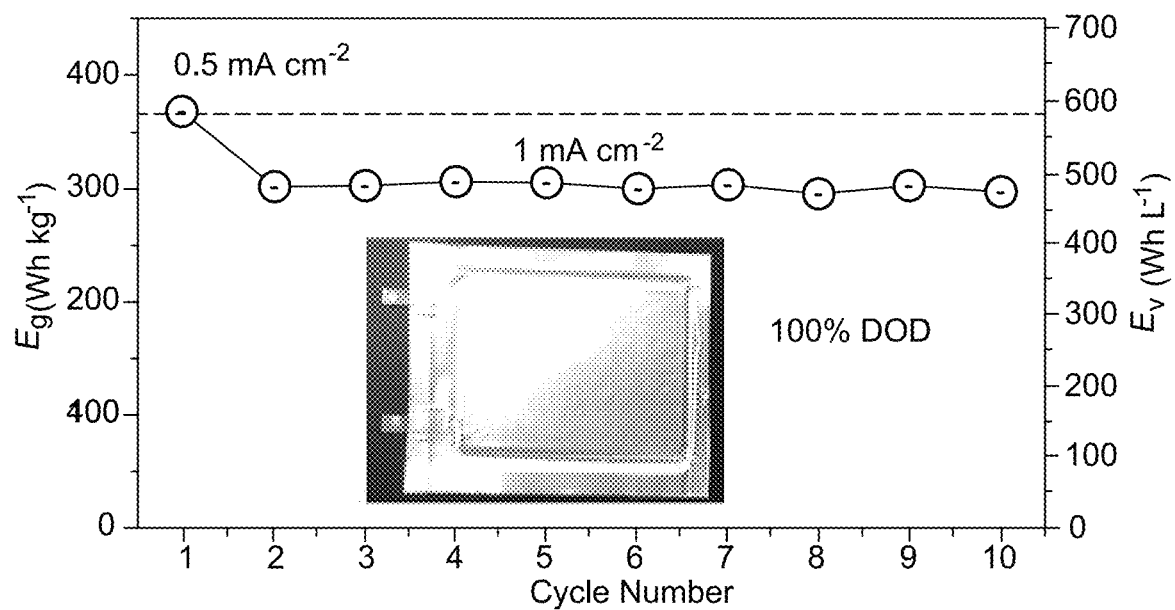
FIG. 26A shows empirical measurements of $E_g$ and $E_v$ as a function of the cycle number for an exemplary Li/HMSC pouch cell constructed using the HMSC cathode with E/AM ratio ~1.2 μL mg$^{-1}$ and 2×Li excess (100 μm for one side).
Figure 26B:
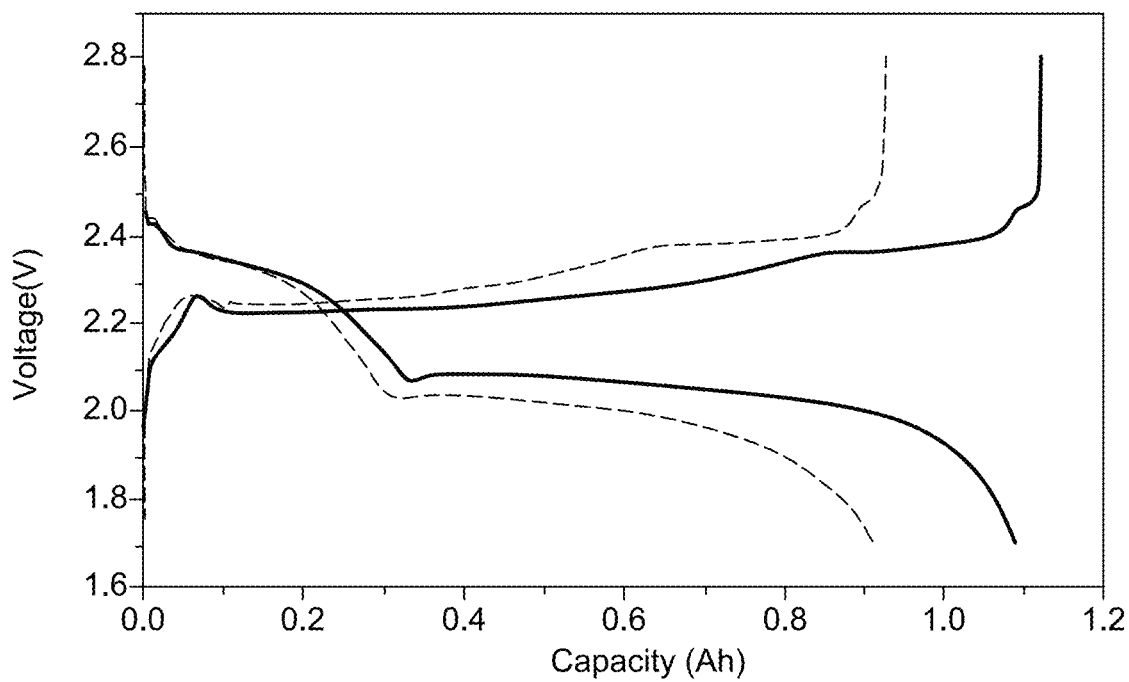
FIG. 26B shows the voltage profiles of the Li-HMSC pouch cell with an E/AM ratio of 1.2 μL mg$^{-1}$ and 2×Li excess.
Figure 26C:
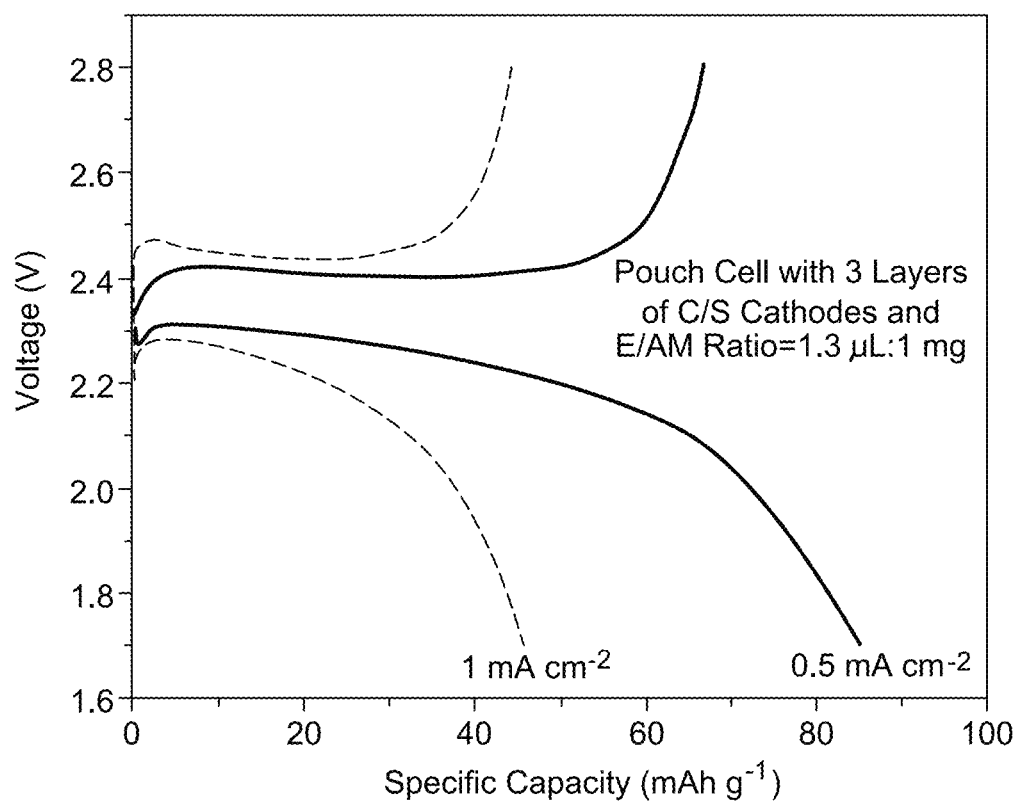
FIG. 26C shows the electrochemical properties of the Li—S pouch cell with double-side coated C/S cathodes with an E/AM ratio of 1.3 μL mg$^{-1}$.

FIG. 26A shows the Li/HMSC pouch cell delivers energy densities of 366 Wh·kg$^{-1}$ and 581 Wh·L$^{-1}$, which is comparable to the projected coin cell data disclosed herein. The cycling of the Li-HMSC pouch cell is also quite stable. FIG. 26B shows the voltage profiles of the pouch cell are identical to those of coin cells. Remarkably, the E/AM ratio in the pouch cell may be further reduced to a very lean electrolyte condition of 1.2 μL·mg$^{-1}$. FIG. 26C shows a pouch cell assembled using conventional C/S cathodes are unable to function under such lean electrolyte conditions.

It is also worth noting that these exemplary results for the energy densities may be enhanced even further by adjusting both the mass production process and other mechanical parameters for making a pouch cell, which are well-known parameters that influence performance. For example, if 50% excess Li is used, the energy densities can be further boosted to 405 Wh·kg$^{-1}$ and 712 Wh·L$^{-1}$ as shown in FIG. 26A.

Summary of Findings for Hybrid Cathode Using Chevrel-Phase Mo$_6$S$_8$

A cathode material 112 was formed by combining a conversion-type material (S$_8$) with an intercalation compound (Chevrel-Phase Mo$_6$S$_8$). In this composite, the soft S$_8$ provided high gravimetric energy density and the electrochemically-active Chevrel-phase Mo$_6$S$_8$ provided fast lithium intercalation reactions and high tap density. This exemplary cathode material 112 was shown to provide a way of decreasing the porosity and the concentration of inactive components in the Li—S battery cathode 110, thus achieving high E$_g$ and E$_v$ simultaneously along with good rate capability. The mechanically "hard" Mo$_6$S$_8$ with fast Li-ion transport, decent capacity contribution and the dramatically enhanced affinity for LiPS after lithium intercalation, functions as a backbone to immobilize "soft" sulfur species and "unlock" their high gravimetric capacity by increasing sulfur utilization.

As described above, the introduction of Mo$_6$S$_8$ into the cathode material 112 enables a reduction in carbon content (~10 wt %), cathode porosity (~55 vol %) and E/AM ratio (1.2 L·mg$^{-1}$) while still providing an areal capacity and cyclability sufficient for practical use. A Li/HMSC coin cell 100 was theoretically estimated to achieve an E$_g$ of 402 Wh·kg$^{-1}$ and E$_v$ of 731 Wh·L$^{-1}$ with good cycling stability and rate capability. An experimental demonstration to corroborate these estimates was performed where an Ah-level Li/HMSC pouch cell was built and characterized to have high energy densities of 366 Wh·kg$^{-1}$ and 581 Wh·L$^{-1}$ using an abundant 2× excess lithium metal. These results suggest the combination of a conversion-type material and an intercalation compound (e.g., Chevrel-phase Mo$_6$S$_8$) can indeed exhibit a high E$_g$ and E$_v$ simultaneously that exceeds the energy densities of conventional commercial batteries while reducing the amount of inactive materials used in the hybrid cathode 110.

II. An Exemplary Hybrid Cathode Using LiFePO$_4$

Figure 27:
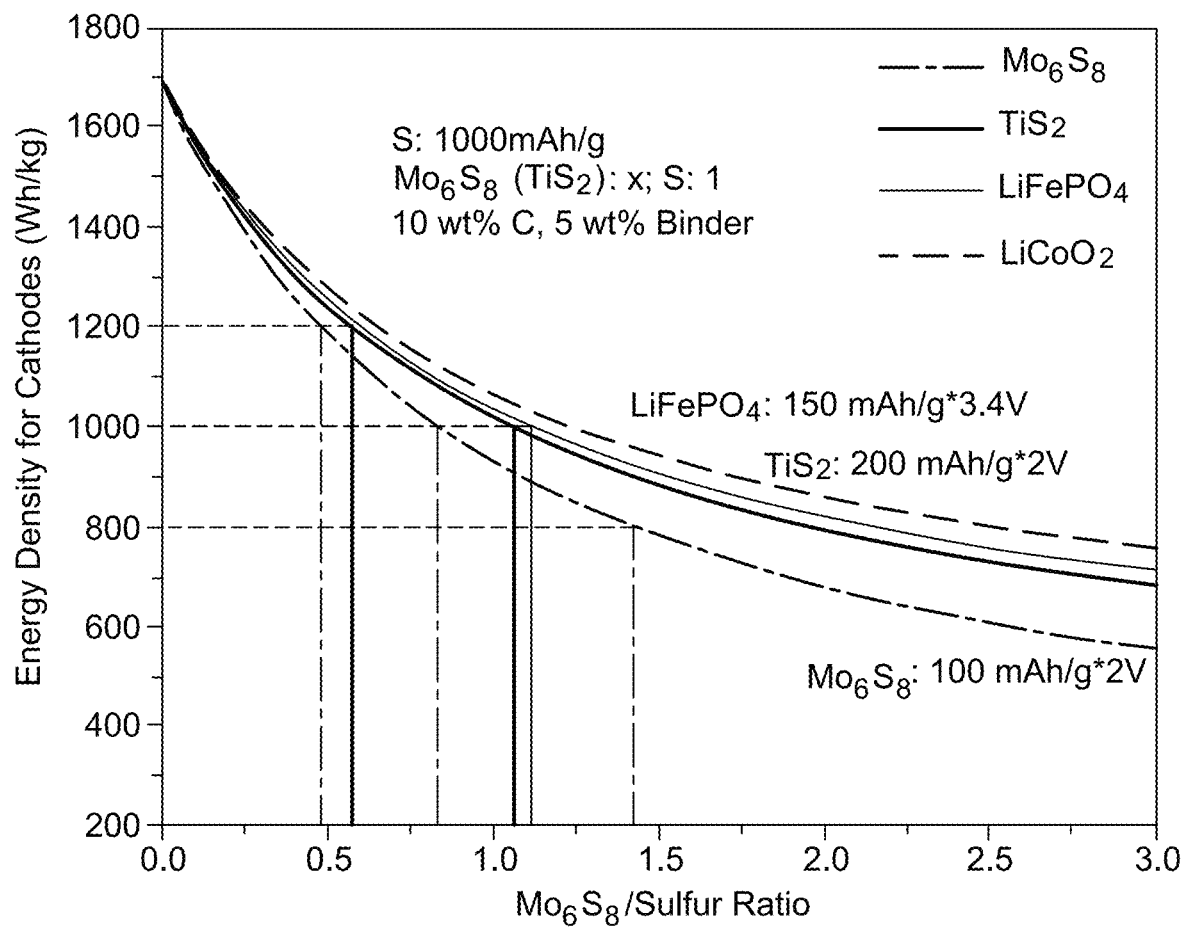
FIG. 27 shows theoretical predictions of the cathode-specific gravimetric energy density for hybrid cathodes using different intercalation compounds.

In another exemplary implementation of the hybrid cathode 110, the intercalation compound in the cathode material 112 may include LiFePO$_4$ (LFP), which is a layered intercalation compound. LFP exhibits a higher gravimetric energy density of 150 mAh·g$^{-1}$×3.4 V=510 Wh/kg compared to Chevrel-phase Mo$_6$S$_8$ of ~100 mAh·g$^{-1}$×2 V=200 Wh/kg as shown in FIG. 27. FIG. 27 also shows other potential intercalation compounds that may be used including TiS$_2$ and LiCoO$_2$ with a larger E$_g$ than Chevrel-phase Mo$_6$S$_8$. Therefore, LFP (in addition to the other material shown) may be used to increase the energy density of the Li—S battery 100 even further.

As an exemplary demonstration to illustrate the use of other intercalation compounds, a Li—S battery 100 was fabricated using a hybrid cathode 110 with LFP in the cathode material 112. The exemplary Li—S battery 100 was formed as a coin cell for testing. The Li—S battery 100 was fabricated as follows: (1) mixing LFP and sulfur powder at a preferred LFP:S ratio (e.g., 3:2) in ethanol for 30 minutes, (2) sealing the mixture in a hydrothermal reactor under Ar protection and heating at 155° C. for 12 hours, (3) cooling the mixture to room temperature, (4) forming the slurry by mixing the LFP/S composite, carbon black, and binder (e.g., polyvinylidene fluoride) with N-methylpyrrolidone (NMP) overnight, (5) coating a carbon-coated Al foil with the slurry using a doctor blade, and (6) punching the slurry coated Al foil into round disks after drying.

The exemplary Li—S battery 100 with a LFP to S$_8$ weight ratio of 1.5 exhibited the following properties: the active material loading is 6.3 mg$_{(LFP+S)}$/cm$^2$, the E/AM ratio is 2 μL/mg, the electrode thickness is 60 m, and the carbon content is 15 wt %.

It should be appreciated other processes and recipes may be used to fabricate the Li—S battery 100 with LFP (and other intercalation compounds). For example, the Li—S battery 100 with a LFP/S$_8$ cathode material 112 may be fabricated using a similar approach to the Chevrel-phase Mo$_6$S$_8$/S$_8$ cathode material 112 described previously. For instance, a mixture of LFP, sulfur, CNT's, and graphene may be mixed together such that the CNT's and graphene form a 3D conducting network, which may increase the conductivity of the cathode material 112 particularly at high active material loading. Additionally, the nano-sulfur formed based on the reaction of Na$_2$S$_2$O$_3$ and H$_2$SO$_4$/HCl may be dispersed more uniformly than commercially available sulfur particulates.

Figure 28A:
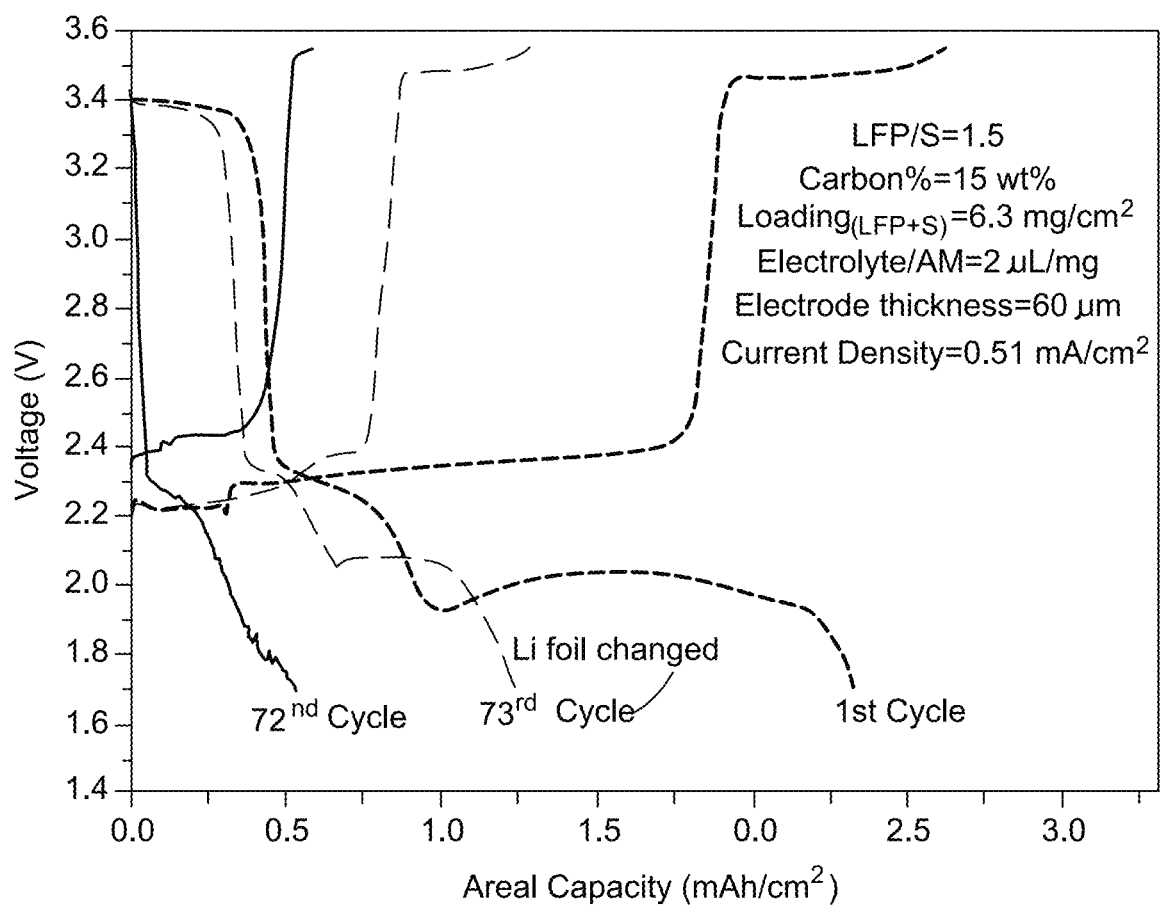
FIG. 28A shows voltage profiles for an exemplary Li—S battery using a LFP/$S_8$ hybrid cathode with 6.3 mg(LFP+S)/cm$^2$, carbon (carbon black nanoparticles) content 15 wt %, electrolyte/active material ratio (E/AM)=2 μL/mg, electrode thickness of 60 μm.
Figure 28B:
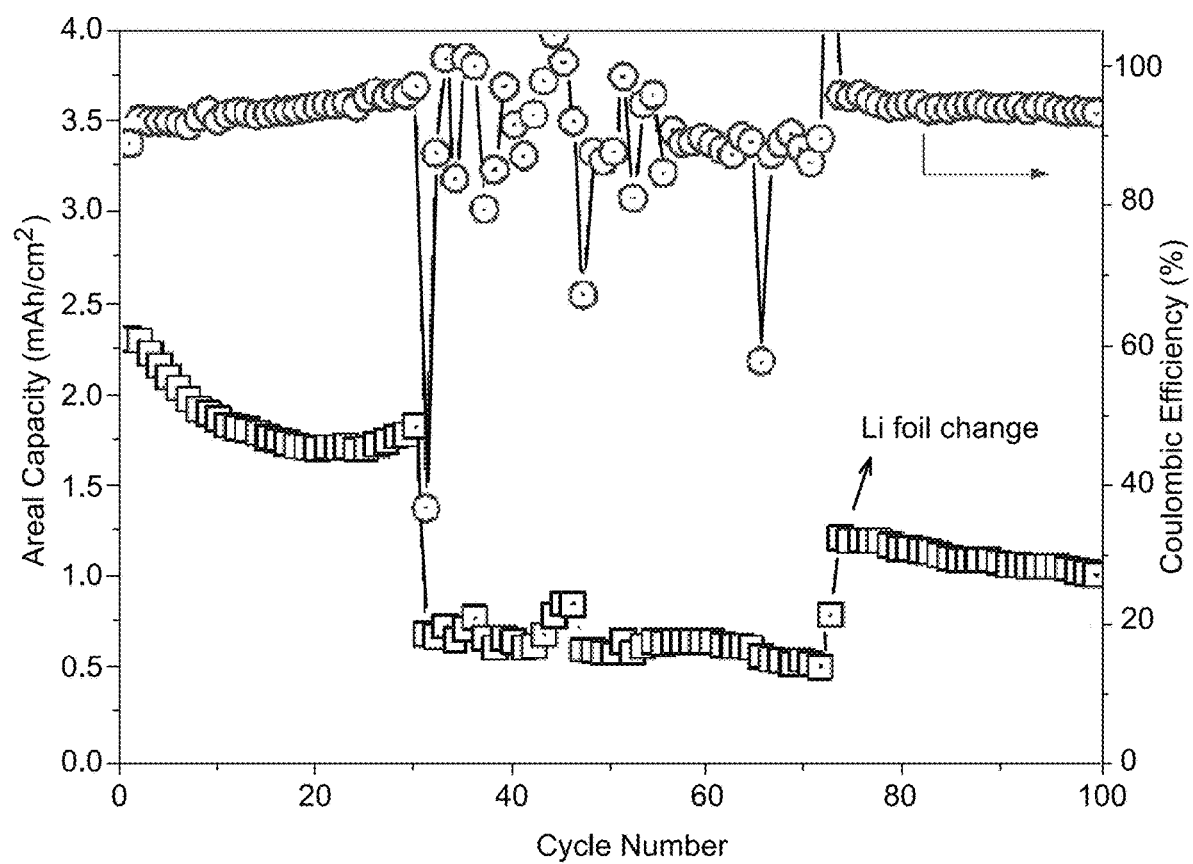
FIG. 28B shows the cycling performance of the exemplary Li—S battery of FIG. 28A.

FIG. 28A shows voltage profiles of the exemplary Li—S battery 100. The voltage profiles indicate that both LFP and S$_8$ may exhibit voltage plateaus (i.e., ~3.4 V for LFP, 2.3 V and 2.0 V for S$_8$) within the operating voltage window of 1.7 V to 3.55 V. In other words, LFP contributes to the capacity of the battery at a voltage of around 3.4-3.5 V. The observation of such voltage plateaus indicates that the hybrid cathode 110 with a LFP/$S_8$ cathode material 112 operates in a similar manner to the HMSC material 112 described previously, thus the use of LFP may also increase both $E_g$ and $E_v$ simultaneously. Once again, the carbon content, the E/AM ratio, and the electrode thickness are much lower than traditional C/$S_8$ cathodes. FIG. 28B shows a chart of the areal capacity as a function of the cycle number. As shown, the exemplary Li—S battery 100 remains stable for the first 30 cycles.

CONCLUSION

All parameters, dimensions, materials, and configurations described herein are meant to be exemplary and the actual parameters, dimensions, materials, and/or configurations will depend upon the specific application or applications for which the inventive teachings is/are used. It is to be understood that the foregoing embodiments are presented primarily by way of example and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein.

In addition, any combination of two or more such features, systems, articles, materials, kits, and/or methods, if such features, systems, articles, materials, kits, and/or methods are not mutually inconsistent, is included within the inventive scope of the present disclosure. Other substitutions, modifications, changes, and omissions may be made in the design, operating conditions and arrangement of respective elements of the exemplary implementations without departing from the scope of the present disclosure. The use of a numerical range does not preclude equivalents that fall outside the range that fulfill the same function, in the same way, to produce the same result.

Also, various inventive concepts may be embodied as one or more methods, of which at least one example has been provided. The acts performed as part of the method may in some instances be ordered in different ways. Accordingly, in some inventive implementations, respective acts of a given method may be performed in an order different than specifically illustrated, which may include performing some acts simultaneously (even if such acts are shown as sequential acts in illustrative embodiments).

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A hybrid cathode for a battery, the hybrid cathode comprising:
an electrode;
a cathode material, electrically coupled to the electrode, the cathode material comprising:
a first concentration X wt % of an intercalation compound, wherein X is in a range of between 10 to 75;
a second concentration Y wt % of sulfur (S), wherein Y is in a range of between 10 to 75; and
a third concentration Z wt % of carbon (C); and a liquid electrolyte, disposed, at least in part, in the cathode material, to transport at least one of lithium ions or sulfur ions, wherein:

Y is greater than X;

Z is greater than or equal to 5 and less than or equal to 20;

the sum of X, Y, and Z equals 100;

the intercalation compound contributes to a capacity of the battery within a voltage window of 1.7 Volts to 2.8 Volts; and the hybrid cathode has a liquid electrolyte-to-active material ratio less than approximately 3 $\mu L \cdot mg^{-1}$.

2. The hybrid cathode of claim 1, wherein the first concentration of the intercalation compound has an electrical conductivity greater than approximately $10^{-6}$ S·cm$^{-1}$ and an ionic conductivity greater than approximately $10^{-8}$ S·cm$^{-1}$.

3. The hybrid cathode of claim 2, wherein the first concentration of the intercalation compound has an electrical conductivity greater than approximately $10^{-3}$ S·cm$^{-1}$ and an ionic conductivity greater than approximately $10^{-5}$ S·cm$^{-1}$.

4. A lithium-sulfur (Li—S) battery comprising the hybrid cathode of claim 3.

5. The hybrid cathode of claim 1, wherein the intercalation compound has a material density of greater than 5 grams per cubic centimeter (g/cm$^3$).

6. The hybrid cathode of claim 5, wherein:

the intercalation compound includes a Chevrel phase material; and the Chevrel phase material includes molybdenum (Mo).

7. The hybrid cathode of claim 6, wherein the Chevrel phase material includes $Mo_6S_8$.

8. The hybrid cathode of claim 1, wherein the intercalation compound includes a Chevrel phase material.

9. The hybrid cathode of claim 8, wherein the Chevrel phase material has the composition $M_xM'_6X_{8-y}$, wherein:

M is selected from the group consisting of lead (Pb), tin (Sn), barium (Ba), silver (Ag), copper (Cu), an alkali metal element and a lanthanide series element (Ln);

M' is selected from the group consisting of ruthenium (Ru), molybdenum (Mo) and rhenium (Rh);

X is selected from the group consisting of sulfur (S), selenium (Se), and tellurium (Te); and x is greater than or equal to zero and less than or equal to 4; and y is greater than or equal to zero and less than or equal to 2.

10. The hybrid cathode of claim 9, wherein M' is molybdenum (Mo).

11. The hybrid cathode of claim 10, wherein:

M is the lanthanide series element (Ln); and

X is selenium (Se).

12. The hybrid cathode of claim 10, wherein the Chevrel phase material includes $Mo_6S_8$.

13. The hybrid cathode of claim 12, wherein the first concentration of the intercalation compound comprising the Chevrel-phase material including $Mo_6S_8$ is sufficiently electrically conductive and ionically conductive so as to enable the third concentration of C to be less than approximately 20 wt %.

14. A lithium-sulfur (Li—S) battery comprising the hybrid cathode of claim 13.

15. A hybrid cathode comprising:

an electrode;

a cathode material, electrically coupled to the electrode, the cathode material comprising:

a first concentration of Chevrel-phase $Mo_6S_8$;

a second concentration of sulfur (S); and a third concentration of carbon (C); and a liquid electrolyte, disposed, at least in part, in the cathode material, to transport at least one of lithium ions or sulfur ions, wherein:

the second concentration is greater than the first concentration; and the hybrid cathode has a liquid electrolyte-to-active material ratio less than approximately 3 $\mu L \cdot mg^{-1}$.

16. The hybrid cathode of claim 15, wherein the first concentration of Chevrel-phase $Mo_6S_8$ has an electrical conductivity greater than approximately 10'S cm$^{-1}$ and an ionic conductivity greater than approximately $10^{-8}$ S·cm$^{-1}$.

17. The hybrid cathode of claim 15, wherein the first concentration of Chevrel-phase $Mo_6S_8$ is sufficiently electrically conductive and ionically conductive so as to enable the third concentration of C to be less than approximately 30 wt %.

18. The hybrid cathode of claim 15, wherein the cathode material has a porosity less than approximately 70 vol %.

19. The hybrid cathode of claim 15, wherein the third concentration of C is less than approximately 30 wt %.

20. The hybrid cathode of claim 15, wherein C is from at least one of a carbon nanotube (CNT) or a graphene sheet.

21. The hybrid cathode of claim 15, further comprising: one of a carbon nanotube (CNT) or a graphene sheet.

22. The hybrid cathode of claim 15, wherein the cathode material has sufficient affinity to lithium polysulfide intermediates (LiPS) so as to reduce unwanted transport of sulfur ions from the hybrid cathode to an anode in a lithium sulfur battery.

23. A lithium sulfur battery comprising the hybrid cathode of claim 22.

24. A hybrid cathode, comprising:

a current collector; and a cathode material, electrically coupled to the current collector, configured to transport both monovalent cations and multivalent cations, the cathode material having a uniformly distributed porosity less than approximately 70 vol %, the cathode material comprising:

a first concentration of an intercalation compound, the intercalation compound comprising Chevrel-phase $Mo_6S_8$;

a second concentration of sulfur (S); and a third concentration of carbon (C), wherein the intercalation compound is included in the cathode material as a plurality of particles having dimensions of at least several hundreds of nanometers.

25. A lithium-sulfur (Li—S) battery comprising the hybrid cathode of claim 24.

26. The hybrid cathode of claim 24, wherein:

the first concentration of the intercalation compound is X wt %, wherein X is in a range of between 10 to 75;

the second concentration of sulfur (S) is Y wt %, wherein Y is in a range of between 10 to 75; and the third concentration of carbon (C) is Z wt %, wherein:

Z is greater than or equal to 5 and less than or equal to 20; and the sum of X, Y, and Z equals 100.

27. The hybrid cathode of claim 24, wherein the intercalation compound contributes to a capacity of the battery within a voltage window of 1.7 Volts to 2.8 Volts.

28. The hybrid cathode of claim 27, wherein the first concentration of the intercalation compound is sufficiently electrically conductive and ionically conductive so as to enable the third concentration of C to be less than approximately 30 wt %.

29. The hybrid cathode of claim 28, wherein the first concentration of the intercalation compound has an electrical conductivity greater than approximately $10^{-3}$ S·cm$^{-1}$ and an ionic conductivity greater than approximately $10^{-5}$ S·cm$^{-1}$.

30. The hybrid cathode of claim 29, wherein the intercalation compound has a material density of greater than 5 grams per cubic centimeter (g/cm$^3$).

31. The hybrid cathode of claim 1, wherein the intercalation compound includes lithium iron phosphate (LiFePO$_4$).

32. A cathode for a lithium sulfur battery, the cathode comprising:
   a conductive foil; and
   a uniform dispersion disposed on the conductive foil, the uniform dispersion comprising carbon, sulfur, and Mo$_6$S$_8$,
   wherein the Mo$_6$S$_8$ is included in the uniform dispersion as a plurality of particles having dimensions of at least several hundreds of nanometers.

33. The cathode of claim 32, wherein the sulfur has a loading substantially equal to or greater than 10 mg·cm$^{-2}$.

34. The cathode of claim 32, wherein Mo$_6$S$_8$ has a loading substantially equal to or greater than 10 mg·cm$^{-2}$.

35. The cathode of claim 32, wherein the carbon has a weight percentage substantially equal to or less than 10 wt % in the uniform dispersion.

* * * * *

UNITED STATES PATENT AND TRADEMARK OFFICE
CERTIFICATE OF CORRECTION

PATENT NO. : 11,990,607 B2
APPLICATION NO. : 16/390599
DATED : May 21, 2024
INVENTOR(S) : Weijiang Xue, Liumin Suo and Ju Li Page 1 of 1

It is certified that error appears in the above-identified patent and that said Letters Patent is hereby corrected as shown below:

In the Claims

In Claim 16, Column 28, Line 14, replace "10'Scm–1" with --$10^{-6}$ S·cm$^{-1}$--

Signed and Sealed this
Thirty-first Day of December, 2024

Derrick Brent
*Acting Director of the United States Patent and Trademark Office*